(12) United States Patent
Schlager et al.

(10) Patent No.: US 8,149,112 B2
(45) Date of Patent: *Apr. 3, 2012

(54) MULTI-HAZARD ALARM SYSTEM USING SELECTABLE POWER-LEVEL TRANSMISSION AND LOCALIZATION

(75) Inventors: Dan Schlager, Tiburon, CA (US); William B. Baringer, Oakland, CA (US)

(73) Assignee: MOSAID Technologies Incorporated, Ottawa, CA (US)

( * ) Notice: Subject to any disclaimer, the term of this patent is extended or adjusted under 35 U.S.C. 154(b) by 36 days.
This patent is subject to a terminal disclaimer.

(21) Appl. No.: 11/493,935

(22) Filed: Jul. 25, 2006

(65) Prior Publication Data
US 2007/0030156 A1    Feb. 8, 2007

Related U.S. Application Data

(63) Continuation of application No. 10/695,560, filed on Oct. 27, 2003, now abandoned, which is a continuation-in-part of application No. 10/216,033, filed on Aug. 10, 2002, now abandoned, which is a continuation-in-part of application No. 10/010,971, filed on Dec. 4, 2001, now abandoned, which is a continuation-in-part of application No. 09/728,167, filed on Dec. 1, 2000, now Pat. No. 6,518,889, which is a continuation-in-part of application No. 09/325,030, filed on Jun. 3, 1999, now Pat. No. 6,198,390, which is a continuation of application No. 08/849,998, filed as application No. PCT/US96/17473 on Oct. 28, 1996, now Pat. No. 5,963,130, which is a continuation-in-part of application No. 08/330,901, filed on Oct. 27, 1994, now Pat. No. 5,461,365.

(51) Int. Cl.
*G08B 1/08*    (2006.01)

(52) U.S. Cl. ............. 340/539.13; 340/573.1; 340/573.2; 340/573.6; 340/7.5; 340/7.58; 340/8.1

(58) Field of Classification Search .................. 340/540, 340/539.13, 573.1–574, 989, 990, 7.5, 7.58, 340/8.1; 342/126, 357, 450, 457
See application file for complete search history.

(56) References Cited

U.S. PATENT DOCUMENTS 3,588,858 A    6/1971    Demuth
(Continued)

FOREIGN PATENT DOCUMENTS

EP    0 545 636 A1    6/1993
(Continued)

OTHER PUBLICATIONS

Supplemental Expert Report of Prof. Lawrence R. Weill, *Zoltar* v. *Snaptrack et al.*, Case 5:01-cv-20291-JW, U.S. District Court, Northern District of California, pp. 1-20.

(Continued)

*Primary Examiner* — Daniel Wu
*Assistant Examiner* — Son M Tang
(74) *Attorney, Agent, or Firm* — Don Mollick

(57) ABSTRACT

A personal alarm system includes a monitoring base station and one or more remote sensing units in two-way radio communication. An electronic handshake between the base station and each remote unit is used to assure system reliability. The remote units transmit at selectable power levels. In the absence of an emergency, a remote unit transmits at a power-conserving low power level. Received field strength is measured to determine whether a remote unit has moved beyond a predetermined distance from the base station. If the distance is exceeded, the remote unit transmits at a higher power level. The remote unit includes sensors for common hazards including water emersion, smoke, excessive heat, excessive carbon monoxide concentration, and electrical shock. The base station periodically polls the remote units and displays the status of the environmental sensors. The system is useful in child monitoring, for use with invalids, and with employees involved in activities which expose them to environmental risk. Alternative embodiments include a panic button on the remote unit for summoning help, and an audible beacon on the remote unit which can be activated from the base station and useful for locating strayed children. In another embodiment, the remote unit includes a Global Positioning System receiver providing location information for display by the base station.

16 Claims, 28 Drawing Sheets

U.S. PATENT DOCUMENTS

| | | |
|---|---|---|
| 3,626,416 A | 12/1971 | Rabow |
| 3,711,856 A | 1/1973 | Adrian et al. |
| 3,784,842 A | 1/1974 | Kremer |
| 3,804,984 A | 4/1974 | Yachabach |
| 3,932,709 A | 1/1976 | Hoff et al. |
| 4,008,380 A | 2/1977 | LaBorde |
| 4,011,414 A | 3/1977 | Warren |
| 4,058,802 A | 11/1977 | Meyers |
| 4,243,845 A | 1/1981 | Feinberg et al. |
| 4,324,954 A | 4/1982 | Taylor |
| 4,589,132 A | 5/1986 | Botbol et al. |
| 4,593,273 A | 6/1986 | Narcisse |
| 4,598,272 A | 7/1986 | Cox |
| 4,651,157 A | 3/1987 | Gray et al. |
| 4,656,463 A | 4/1987 | Anders et al. |
| 4,659,042 A | 4/1987 | Friddle, II et al. |
| 4,665,385 A | 5/1987 | Henderson |
| 4,675,656 A | 6/1987 | Narcisse |
| 4,685,385 A | 8/1987 | Rich |
| 4,731,814 A | 3/1988 | Becker et al. |
| 4,736,404 A | 4/1988 | Anglikowski et al. |
| 4,761,823 A * | 8/1988 | Fier .................. 455/90.3 |
| 4,777,478 A | 10/1988 | Hirsch et al. |
| 4,785,291 A | 11/1988 | Hawthorne |
| 4,796,190 A * | 1/1989 | Cummings ............... 701/200 |
| 4,819,860 A | 4/1989 | Hargrove et al. |
| 4,833,477 A | 5/1989 | Tendler |
| 4,850,031 A * | 7/1989 | Allsop et al. ............ 455/500 |
| 4,891,650 A | 1/1990 | Sheffer |
| 4,899,135 A | 2/1990 | Ghahariiran |
| 4,918,425 A | 4/1990 | Greenberg et al. |
| 4,952,928 A | 8/1990 | Carroll et al. |
| 4,953,198 A | 8/1990 | Daly et al. |
| 4,980,836 A * | 12/1990 | Carter et al. ............... 713/322 |
| 5,014,206 A * | 5/1991 | Scribner et al. ............ 701/207 |
| 5,025,247 A | 6/1991 | Banks |
| 5,043,702 A | 8/1991 | Kuo |
| 5,043,736 A * | 8/1991 | Darnell et al. ............ 342/357.1 |
| 5,047,750 A | 9/1991 | Hector |
| 5,081,667 A | 1/1992 | Drori et al. |
| 5,086,391 A | 2/1992 | Chambers |
| 5,097,502 A | 3/1992 | Suzuki et al. |
| 5,105,189 A | 4/1992 | Murai |
| 5,115,223 A | 5/1992 | Moody |
| 5,119,341 A | 6/1992 | Youngberg |
| 5,144,323 A | 9/1992 | Yonkers |
| 5,172,110 A | 12/1992 | Tiefengraber |
| 5,189,400 A | 2/1993 | Schultz |
| 5,193,215 A | 3/1993 | Olmer |
| 5,202,829 A | 4/1993 | Geier |
| 5,218,344 A | 6/1993 | Ricketts |
| 5,223,844 A | 6/1993 | Mansell et al. |
| 5,225,842 A | 7/1993 | Brown et al. |
| 5,235,633 A | 8/1993 | Dennison et al. |
| 5,274,359 A | 12/1993 | Adams |
| 5,299,132 A | 3/1994 | Wortham |
| 5,301,368 A | 4/1994 | Hirata |
| 5,311,197 A | 5/1994 | Sorden et al. |
| 5,319,698 A | 6/1994 | Glidewell et al. |
| 5,334,974 A | 8/1994 | Simms et al. |
| 5,343,493 A | 8/1994 | Karimullah |
| 5,345,244 A | 9/1994 | Gildea et al. |
| 5,355,140 A | 10/1994 | Slavin et al. |
| 5,365,226 A | 11/1994 | Morishima |
| 5,365,450 A | 11/1994 | Schuchman et al. |
| 5,367,306 A | 11/1994 | Hollon et al. |
| 5,379,224 A | 1/1995 | Brown et al. |
| 5,381,129 A | 1/1995 | Boardman |
| 5,388,147 A | 2/1995 | Grimes |
| 5,392,052 A | 2/1995 | Eberwine |
| 5,408,238 A | 4/1995 | Smith |
| 5,414,432 A * | 5/1995 | Penny et al. ............ 342/357.16 |
| 5,418,537 A * | 5/1995 | Bird .................... 342/357.09 |
| 5,420,592 A | 5/1995 | Johnson |
| RE34,976 E | 6/1995 | Helferich et al. |
| 5,422,814 A | 6/1995 | Sprague et al. |
| 5,422,816 A | 6/1995 | Sprague et al. |
| 5,432,841 A | 7/1995 | Rimer |
| 5,434,787 A | 7/1995 | Okamoto et al. |
| 5,438,337 A | 8/1995 | Aguado |
| 5,440,491 A | 8/1995 | Kawano et al. |
| 5,450,344 A | 9/1995 | Woo et al. |
| 5,461,365 A | 10/1995 | Schlager et al. |
| 5,461,390 A | 10/1995 | Hoshen |
| 5,475,597 A | 12/1995 | Buck |
| 5,479,482 A | 12/1995 | Grimes |
| 5,497,148 A * | 3/1996 | Oliva ..................... 340/905 |
| 5,497,149 A * | 3/1996 | Fast ...................... 340/988 |
| 5,504,482 A | 4/1996 | Schreder |
| 5,504,491 A | 4/1996 | Chapman |
| 5,515,043 A * | 5/1996 | Berard et al. ............... 340/988 |
| 5,515,285 A | 5/1996 | Garrett, Sr. et al. |
| 5,519,403 A | 5/1996 | Bickley et al. |
| 5,534,851 A | 7/1996 | Russek |
| 5,551,285 A | 9/1996 | Gannon et al. |
| 5,552,772 A | 9/1996 | Janky et al. |
| 5,555,286 A | 9/1996 | Tendler |
| 5,555,289 A | 9/1996 | Hashimoto |
| 5,557,254 A | 9/1996 | Johnson et al. |
| 5,559,520 A | 9/1996 | Barzegar et al. |
| 5,592,173 A * | 1/1997 | Lau et al. ............... 342/357.12 |
| 5,594,425 A | 1/1997 | Ladner et al. |
| 5,600,706 A * | 2/1997 | Dunn et al. ............... 455/456.2 |
| 5,630,206 A | 5/1997 | Urban et al. |
| 5,650,785 A * | 7/1997 | Rodal ................... 342/357.12 |
| 5,663,734 A | 9/1997 | Krasner |
| 5,673,305 A | 9/1997 | Ross |
| 5,686,910 A | 11/1997 | Timm et al. |
| 5,703,598 A | 12/1997 | Emmons |
| 5,712,619 A | 1/1998 | Simkin |
| 5,712,899 A | 1/1998 | Pace, II |
| 5,717,738 A | 2/1998 | Gammel |
| 5,719,771 A | 2/1998 | Buck et al. |
| 5,731,785 A | 3/1998 | Lemelson et al. |
| 5,731,786 A | 3/1998 | Abraham et al. |
| 5,742,233 A | 4/1998 | Hoffman et al. |
| 5,742,666 A | 4/1998 | Alpert |
| 5,748,147 A | 5/1998 | Bickley et al. |
| 5,748,148 A | 5/1998 | Heiser et al. |
| 5,752,976 A | 5/1998 | Duffin et al. |
| 5,754,136 A * | 5/1998 | Kojima et al. ........... 342/357.07 |
| 5,782,878 A | 7/1998 | Morgan et al. |
| 5,796,365 A | 8/1998 | Lewis |
| 5,797,091 A | 8/1998 | Clise et al. |
| 5,798,733 A | 8/1998 | Ethridge |
| 5,835,907 A | 11/1998 | Newman |
| 5,838,237 A | 11/1998 | Revell et al. |
| 5,848,373 A | 12/1998 | DeLorme et al. |
| 5,852,401 A | 12/1998 | Kita |
| 5,859,628 A | 1/1999 | Ross et al. |
| 5,874,914 A | 2/1999 | Krasner |
| 5,905,461 A | 5/1999 | Neher |
| 5,914,675 A | 6/1999 | Tognazzini |
| 5,963,130 A * | 10/1999 | Schlager et al. ............... 340/540 |
| 5,979,829 A | 11/1999 | Nance et al. |
| 5,982,324 A | 11/1999 | Watters et al. |
| 6,052,604 A | 4/2000 | Bishop, Jr. et al. |
| 6,067,045 A | 5/2000 | Castelloe et al. |
| 6,083,248 A | 7/2000 | Thompson |
| 6,087,983 A | 7/2000 | Ho et al. |
| 6,121,922 A | 9/2000 | Mohan |
| 6,278,884 B1 | 8/2001 | Kim |
| 6,292,698 B1 | 9/2001 | Duffin et al. |
| 6,334,070 B1 | 12/2001 | Nova et al. |
| 6,373,430 B1 | 4/2002 | Beason et al. |
| 6,373,946 B1 | 4/2002 | Johnston |
| 6,430,416 B1 | 8/2002 | Loomis |
| 6,477,464 B2 | 11/2002 | McCarthy et al. |
| 6,518,889 B2 | 2/2003 | Schlager et al. |
| 6,538,601 B2 | 3/2003 | Bruno et al. |
| 6,545,060 B1 | 4/2003 | Ruhman et al. |
| 6,545,606 B2 | 4/2003 | Piri et al. |
| 6,606,561 B2 | 8/2003 | Flick |
| 6,636,740 B1 | 10/2003 | Ramesh |
| 7,312,709 B2 | 12/2007 | Kingston |
| 2003/0025602 A1 | 2/2003 | Medema et al. |
| 2005/0048945 A1 | 3/2005 | Porter |

FOREIGN PATENT DOCUMENTS

| | | |
|---|---|---|
| EP | 0559074 A1 | 9/1993 |
| EP | 0 851 628 A1 | 7/1998 |
| GB | 2274188 A | 7/1994 |
| GB | 2 276 479 A | 9/1994 |
| GB | 2 285 135 A | 6/1995 |
| GB | 2 313 749 A | 12/1997 |
| JP | 3-171400 A | 7/1991 |
| JP | 5-080141 | 4/1993 |
| JP | 6-223273 A | 8/1994 |
| JP | 6-249939 | 9/1994 |
| JP | 7-177080 | 7/1995 |
| JP | 7-234982 | 9/1995 |
| WO | WO 87/06748 A1 | 11/1987 |
| WO | WO 93/04425 A1 | 3/1993 |
| WO | 93/06531 | 4/1993 |
| WO | 94/15412 | 7/1994 |
| WO | 96/13819 | 5/1996 |
| WO | 97/26634 | 7/1997 |

OTHER PUBLICATIONS

Counterclaimants' (Qualcomm's) Final Invalidity Contentions in Case No. C-01-20291-JW, U.S. District Court, Northern District of California.
Transcript of Proceedings [Technological Tutorial] Mar. 22, 2002 in Case No. C-01-20291-JW, U.S. District Court, Northern District of California.
Transcript of Proceedings [Markman Hearing] Mar. 29, 2002 in Case No. C-01-20291-JW, U.S. District Court, Northern District of California.
Transcript of Proceedings [Markman Hearing] Jan. 23, 2003 in Case No. C-01-20291-JW, U.S. District Court, Northern District of California.
Transcript of Proceedings [Hearing on Motions] Jul. 21, 2003 in Case No. C-01-20291-JW, U.S. District Court, Northern District of California.
Defendants' Amendment to Preliminary Invalidity Contentions, Zoltar v. Motorola et al. in Case No. C 06-00044-JW, U.S. District Court, Northern District of California.
Defendants' Second Amendment to Preliminary Invalidity Contentions, Zoltar v. Motorola et al. in Case No. C 06-00044-JW, U.S. District Court, Northern District of California, 3 pages.
ARROW presentation prepared by Motorola Inc., GEG, Feb. 1993, 15 pages.
International Search Report for International application No. PCT/US95/13823 mailed Feb. 23, 1996.
Written Opinion for International application No. PCT/US95/13823 mailed Dec. 6, 1996.
International Search Report for International application No. PCT/US96/17473 mailed Jan. 13, 1997.
Office Action for Japanese Patent Application No. 8-514724 dated Apr. 30, 2002.
Office Action for Canadian Patent Application No. 2,202,779 dated May 9, 2005.
Office Action for Japanese Patent Application No. 9-521537 dated Feb. 8, 2006.
Expert Report of Prof Lawrence R. Weill, Zoltar v. Snaptrack et al., pp. 1-219 plus attachments.
Documents referenced in Counterclaims' (Qualcomm's) Final Invalidity Contentions.
Exhibit A-66, Motorola Hook 112 System Prior Art Invalidity Chart, 18 Pages.
Exhibit A-67, Motorola Soldier 911 System Prior Art Invalidity Chart, 19 Pages.
Exhibit A-68, Motorola Korea 911 System Prior Art Invalidity Chart, 20 Pages.
Docket Report for case No. 5:01-cv-20291-JW.
Docket Report for case No. 5:99-cv-20442-JW.
Docket Report for case No. 5:06-cv-00044-JW.
Docket Report for case No. 2:05-cv-0215-LED.
Litigation documentation related to Motorola Hook 112 System, (MOTZ 71368-71818).
Litigation documentation related to Motorola Korea 911 System, (MOTZ 071819-72631).
Litigation documentation related to Motorola Soldier 911 System, (MOTZ 072632-073105).
Written Opinion, mailed Aug. 25, 1997 in PCT/US96/17473.
PCT/US95/13823 ISR dated Feb. 23, 1996.
Raab et al., "An Application of the Global Positioning System to Search and Rescue and Remote Tracking" Nav. Journal of Inst. of Navig. Fall 1997, vol. 24, No. 3.
Cameron et al., "Use of Commercial GIS and GPS for Emerg. Location and Dispatch"; 51st Annual Mtng of Inst. of Navigation, Jun. 1995.
Driscoll, "Finding the Fleet: Vehicle Location Systems and Technologies" GPS World; Apr. 1994, pp. 66-70.
Masters, et al., "GPS/GIS and Space Time Data" Presented at the Institute of Navigation, Sep. 1994.
OMNITRACS Technical Overview, QUALCOMM Ind. 80/6462.
Executive Summary, CAE-Link's CPLS and LinkTrak Systems, Copyright 1993, CAE-Link.
Linktrak User's Guide, Rev. 00, CAE-Link Corp., LinkTrak Version 1.0, Mar. 18, 1994.
Maywald Dennis, "Product Description LinkTrak Roadside Assistance System", Mar. 4, 1994.
Linktrak'S Regional Mobile Emergency Response Coord. System Operation, Oct. 22, 1993.
CPLS Cellular Position Location System, LINKTRAK Security System, CAE-Link Corp. 1993.
Brown, A; "A Low Cost Vehicle Location and Tracking System", IEEE Plans; Mar. 1992; California USA.
Brown, A; A Low Cost GPS Sensor for Tracking Applications, ION Satellite Div. Int'l Technical Meeting, Sep. 1993, Salt Lake City, UT, USA.
Kijan et al., "GPS to the Rescue—Mayday for Motorists;" ION Satellite Div. Int'l Technical Meeting, Sep. 1993, Salt Lake City, UT, USA.
Brown et al., "GPS Receivers—TIDGET-PLUS: Urban Navigation with Stand-Alone GPS"; ION Satellite Div. Int'l Technical Meeting, Sep. 1994, Salt Lake City, UT, USA.
Brown, A. et al. "TIDGET Mayday System for Motorists," IEEE Position, Location and Nav. Symposium, Apr. 1994, Revised Aug. 1995.
Brown, A. et al. "An Operational Test of a Vehicle Emergency Location Service in Colorado"; Winter 1994-1995; Paper received Jun. 1994, Revised Aug. 1995.
Cameron, "A Mayday System fir Rural Highway Travel"; ITS America Annual Conf., Mar. 1995, Washington, DC USA.
"Intelligent Transportation System Mayday Becomes a Reality"; NAECON Nat'l Aerospace Elec. Conf., May 1995, Dayton, OH USA.
Use of Commercial GIS and GPS for Emergency Location and Dispatch, ION 51st Annual Meeting, Jun. 1995, Colorado Springs, CO USA.
"Strategic Plan for Intelligent Vehicle Highway Systems" Report No. IVHS-AMER-92-3, IVHS America, May 20, 1993.
ITS Architecture Development Program, Phase 1, Summary Report, ITS America, Nov. 1994.
JHK Assoc.; "Advanced Traveler Information Systems for Rural Areas"; Jan. 1995.
Gerald Pierce, "Calling for a PCN Emergency Services Standard"; Telephony, Dec. 21, 1992.
Swales, Maloney & Stevenson, "Locating Mobile Phones & US Wireless E-911 Mandate;" IEEE, 1999.
French, Driscoll; "Location Technologies for ITS Emergency Notification and E911".
Gloeckler, Van Dierendonck, Hatch; "Proposed Rev. to TRCM SC-104, Recom. Standards of Differential NAVSTAR/GPS Service for Carrier Phase Appin;" Proceedings of ION, GPS93; 1992.
Bertiger, Bas-Sever, Haines, Ibanez-Meier, Muellerschoen, Munson, Rim, Wu, Abusali; Schutz, Willis, "The 1st Low Earth Orbiter w/Precise GPS Pos. Topex/Posedon" ION-GPS93:1992.
Technical Proposal for the GPS Demo. Receiver Subsystem vol. 1, Sep. 23, 1986.

RTCM Rec. Standards for Differential NAVSTAR GPS Serv., Jan. 3, 1994.
French, Robert J., "Automobile Navigation: Where is it Going?"; IEEE AES Magazine May 1987; 6-12.
Krakiwsky, Edward J., "GPS and Vehicle Location and Navigation"; GPS World; May 1991; 50-53.
"Automatic Vehicle Location System"; Advertisement in GPS World, Aug. 1992, Dallas, TX USA.
Kiljan, John P. et al.; GPS to the Rescue-Mayday for Motorists; ION-GPS 93, Sep. 1993; Salt Lake City, Utah USA.
Sushko, M., Kensington & Icknield, Ltd.; "Navigating the Earth and Beyond;" 1994 Nat. Tech Mtng Proceedings, Catamaran Rsrt Hotel; Jan. 24-26, 1994; 261-275; San Diego, CA USA.
Krakiwsky, Edward J., "Innovations in Vehicle Tracking and Navigation"; GPS World Feb. 1994; 42-45.
Auto Trac, Vehicle Tracking System, GPS World Magazine, Feb. 1994.
Marks, Peter; "For a few lucky motorists, guidance by satellite"; New York Times, Apr. 2, 1994; 1, 16.
Brown, Alison, and Silva; "TIDGET Mayday System for Motorists;" IEEE Plans; Apr. 1994, Las Vegas, NV USA.
Driscoll, Clement; "Finding the Fleet; Vehicle Location Systems and Technologies"; BPS World; Apr. 1994, 66-70.
http://www.mobilecomms-technology.com/contractors/gisservices/ms/.
ETE Inc., Communication Peripheral, Advertisement in GPS World, Aug. 1994; 58.
Ewan Masters, Bernd Mirsch, and Ken Wong; "GPS/GIS and Space Time Data"; ION-GPS; Sep. 1994.
GPS World; Avis to the Rescue; GPS World, Nov. 1994.
Krakiwsky, Edward J. and Harris Clyde; "Communications for AVLN Systems"; GPS World; Nov. 1994; 42-50.
Mann, Steve; "ETE Communicator Finally Shipping"; PDA Developers; Jan./Feb. 1995; 1-2.
Trimble; "Trimble Introduces New Lines of Wireless Communications Products"; News Release; Feb. 1, 1995.
GPS World; "Firms Sign Agreement on GPS/Cellular Standards"; Notes, Feb. 1995; 57.
Krakiwsky, Edward and McLellan, J.F.; "Making GPS Even Better with Auxiliary Devices"; GPS World; Mar. 1995; 46-53.
Motorola: "Motorola Cellular Positioning and Emergency Messaging Unit"; picture and description; undated.
ATTN; "Trimbles's Trackers Go Wireless"; Advanced Transportation Technology News; Mar. 1995.
Cameron, Max et al.; "A Mayday System for Rural Highway Travel"; ITS America Annual Conference; Mar. 1995; Washington, DC USA.
Cameron, Max and Brown A.; Intelligent Transportation System Mayday Becomes a Reality; NAECON; May 1995; Dayton, OH USA.
Sushko. M; Cellular Data Serv. for Vehicular Tracking, Control and Information Systems; Meeting Proceedings Celebr. 50th Anniv. of ION; Jun. 5-7, 1995; Colo. Springs, CO USA.
Law, Alex; "Lincoln Tracking System Plus Help a Button Away"; Toronto Star, Jun. 1995; H14.
Highway Master; "Cellular Communications System", GPS World Advertisement; Aug. 1995.
GPS World Newsletter; Cellular and Location Determination: Texas Agency Sets GPS 911 Trial; GPS World Newsletter; Sep. 12, 1995.
Lacey, Neil and Cameron, Max; Mayday in the Rockies: Colorado's GPS-Based Emergency Vehicle Location System; GPS World, Oct. 1995; 40.
GPS World; "Texas Adds GPS to Cellular E911 Trials", GPS World Global View; Oct. 1995; 19.
ATTN; "Secure-Track Secures Vehicle Safety"; Advanced Transportation Technology News; Nov. 1995.
Auto-Trac; "Cellular-based Vehicle Tracking Unit"; GPS World advertisement; Dec. 1995.
Shampain, Shon; "GPS Phone an Integrated GPS/Cellular Handset"; ION GPS, Sep. 1997; Kansas City, MO USA.
Hayashi, Wantanabe, Saekine, Yokoi; Search and Rescue System Utilizing GPS and a Geostationary Meteorological Satellite; Proceedings of ION GPS 1993.
Yang and Yip; "Integration of Vehicular Navigation and Mobitex Wireless Pocket Data Network"; Proceedings of National Technical Meeting, 1994.
Pinkard; "Combat Survivor Evader Locator (CSEL), A New Method for Locating Survivor"; 1994.
Moeglein, Hakayama, Hammer, and Blackwell; "Options for PPS Space Segment Accuracy Requirements"; Proceedings of National Technical Meeting; Jan. 22-24, 1996.
French and Driscoll; Location Technologies for ITS Emergency Notification and E911; 1996.
RAJPO Tutorial, Oct. 1990.
Differential GPS I—ION GPS—95 Tutorial; Sep. 12, 1995.
GPS World Showcase; "Open-ended AVL"; Dec. 1994.
GPS World Showcase; "Portable AVL"; Aug. 1995.
GPS World; "XT Oncore, Arrow Cellular Positioning and Messaging Product"; GPS World, Jun. 1995.
GPS World Showcase; "AVL System"; GPS World Showcase, Aug. 1994.
Driscoll; "If you build it will they come? Location-based Communications and the Consumer" GPS World, Nov. 1996.
SIRF Navigations 1996.
Rockwell Pro 2000, Mobile Communications Systems, 1995.
DR Reports; "The Global Positioning System"; Nov. 1991.
Tracking Products, Inc.
GPS World Newsletter; "Start-up Goes After GPS Chips"; Sep. 13, 1996.
Yoshuda; "GPS in Consumer Orbit"; Electronic Engineering Times; Aug. 21, 1995.
Mobile Virtual Presence (MVP-R2 Remote); MVP-R2 Remote Technical Specification; May 21, 1997.
New Media Corporation Business Plan, Dec. 10, 1997.
The Institute of Navigation; National Technical Meeting; Jan. 24-26, 1994.
Durst, Fowler, and McAlexander; "Mobile Object Locator"; May 22, 2001/Jul. 28, 1999.
Wireless Insider; "Life Vests Keep GPS Afloat in Phones"; Oct. 18, 1999.
Power Loc Technologies, Inc., Personal Location Devices (PLD).
AIS Conference; "Wireless Emergency Services"; May 13-14, 1997; San Francisco, CA USA.

* cited by examiner

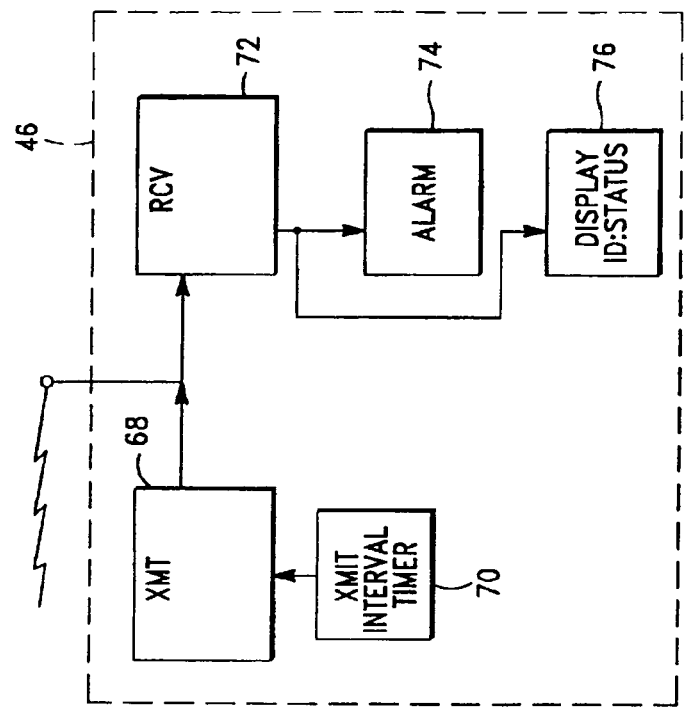
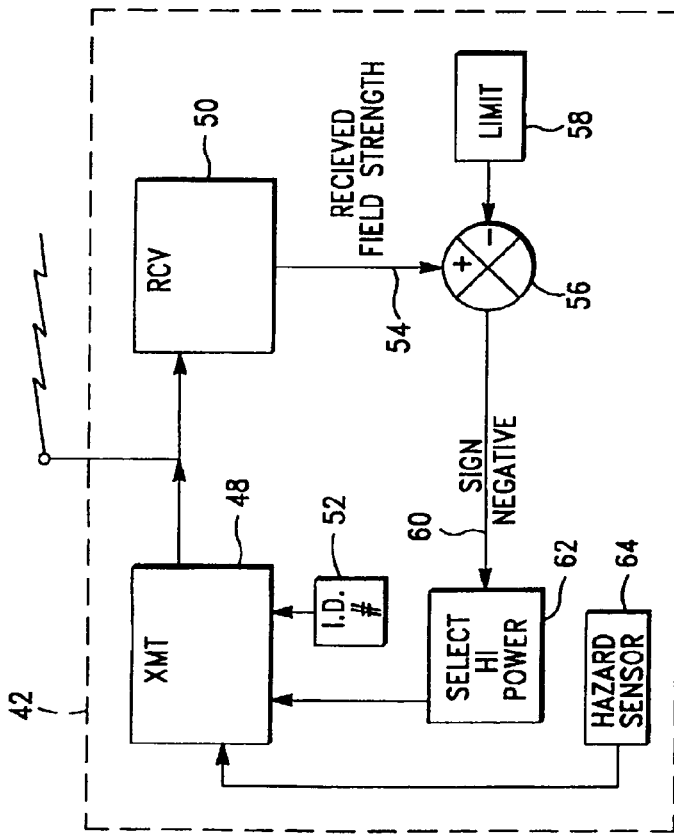
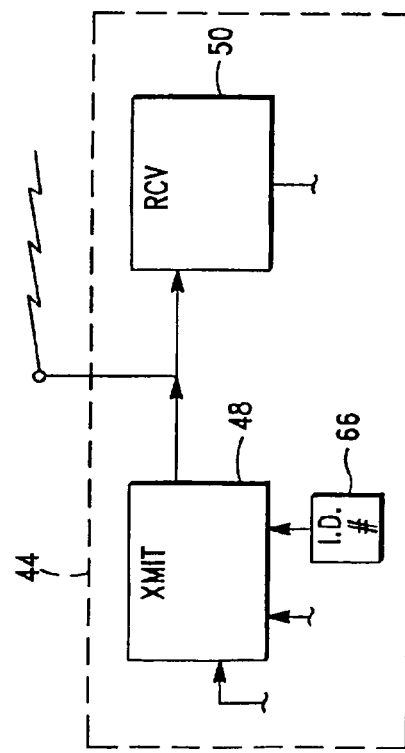
FIG.-2

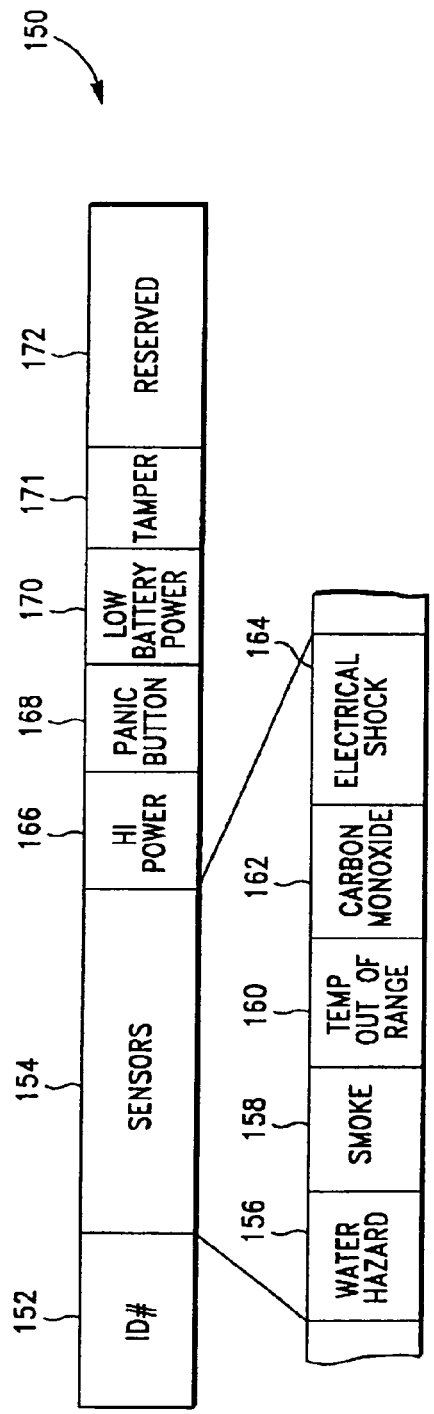
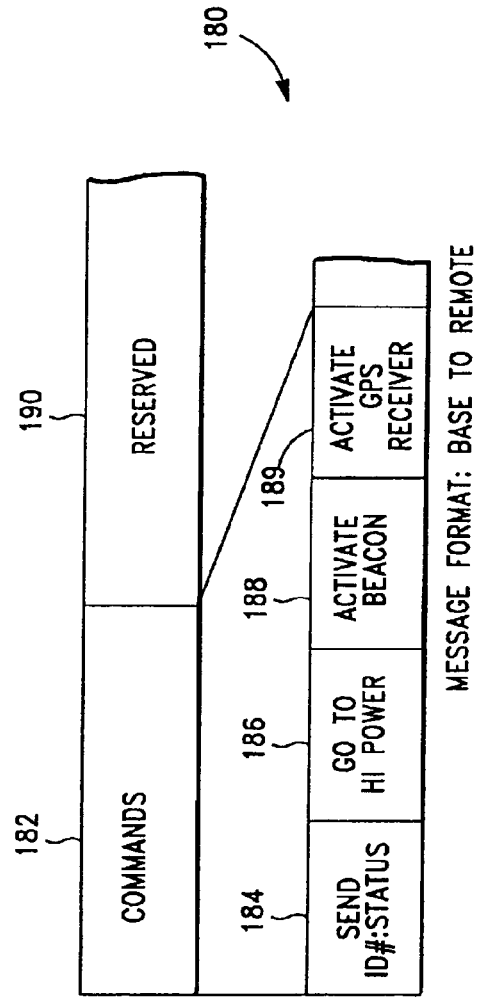
FIG.-4 MESSAGE FORMAT: REMOTE TO BASE
FIG.-5 MESSAGE FORMAT: BASE TO REMOTE

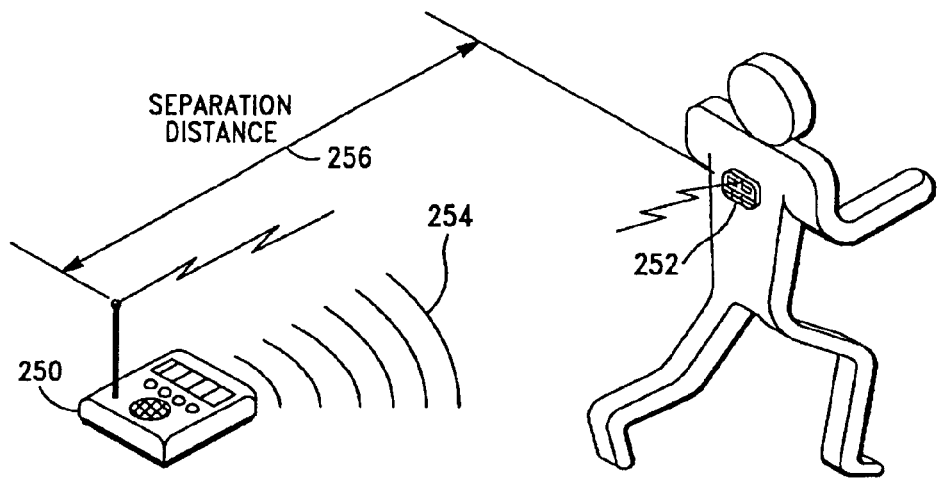
FIG.-7
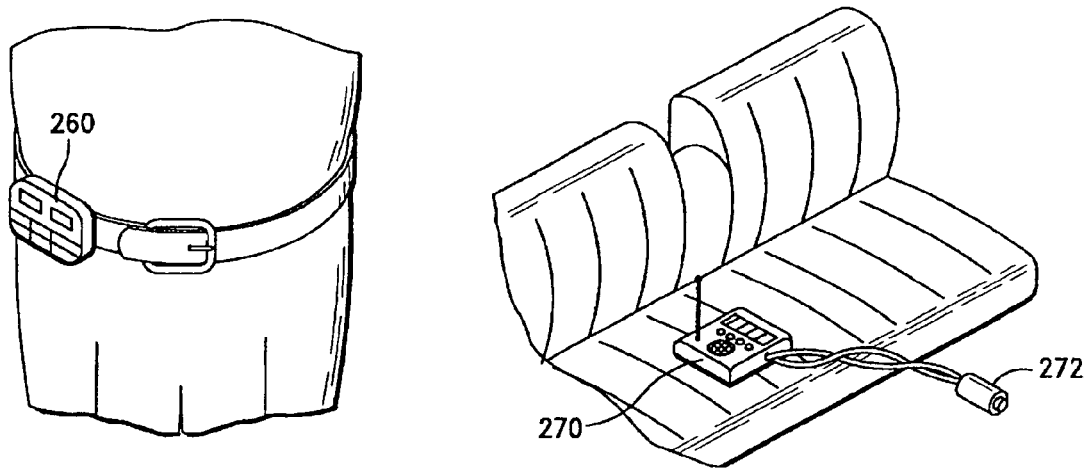
FIG.-8
FIG.-9
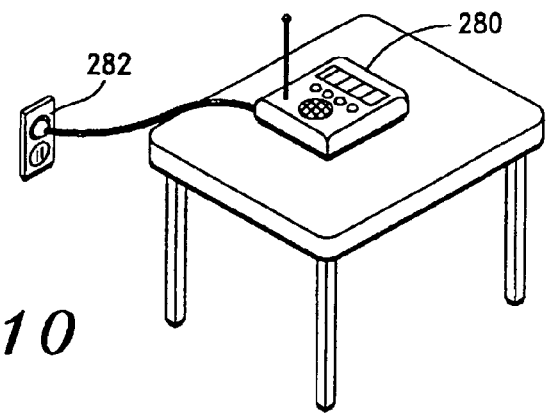
FIG.-10

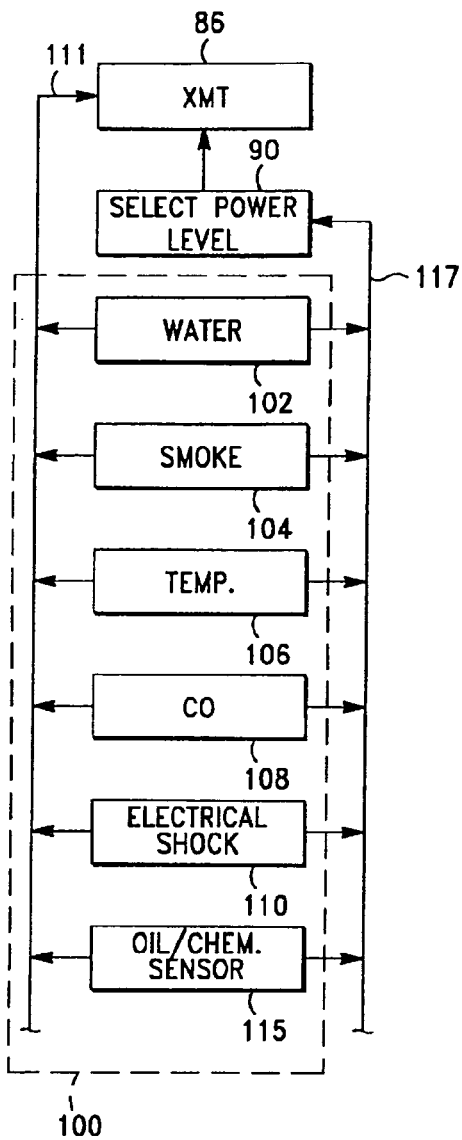
FIG.-29
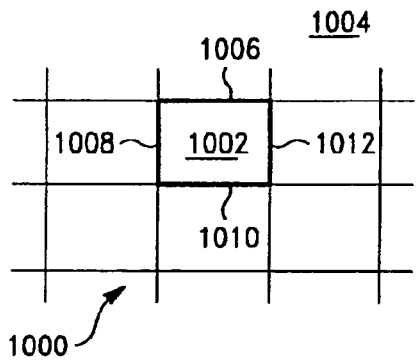
FIG.-25
| | TIME | |
|---|---|---|
| LOCATION | 8PM-7PM | 7PM-8PM |
| HOME | OK | OK |
| NOT-HOME | ALARM | OK |
FIG.-26
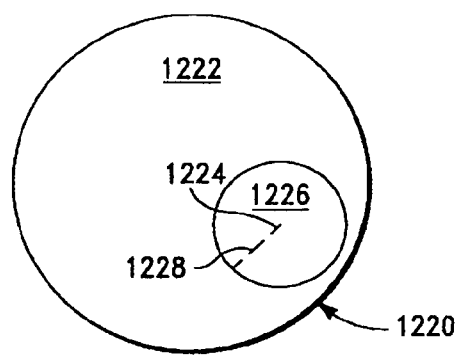
FIG.-35
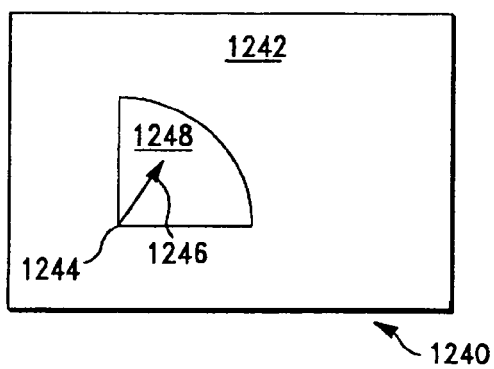
FIG.-36

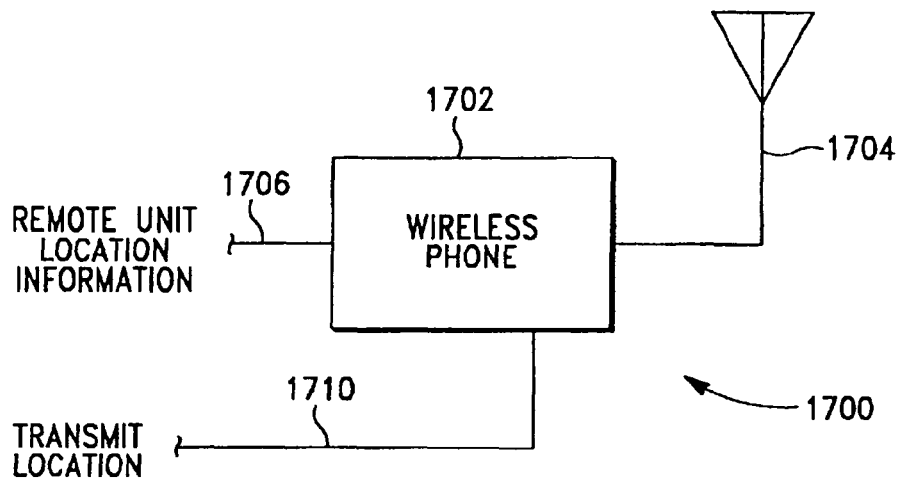
FIG.–48
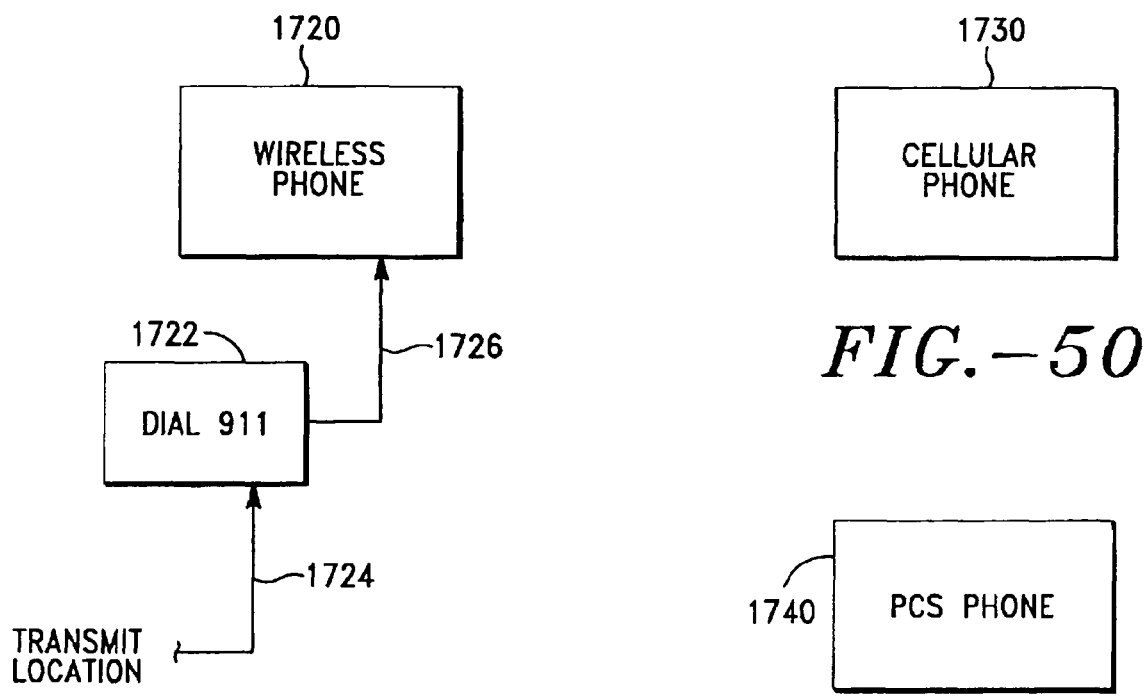
FIG.–49
FIG.–50
FIG.–51

MULTI-HAZARD ALARM SYSTEM USING SELECTABLE POWER-LEVEL TRANSMISSION AND LOCALIZATION

RELATED APPLICATIONS

This application is a continuation application that claims the benefit under 35 U.S.C. §120 of U.S. application Ser. No. 10/695,560, entitled "SELF-LOCATING ALARM SYSTEM EQUIPPED PARACHUTE," filed on Oct. 27, 2003, which is a continuation-in-part of U.S. application Ser. No. 10/216,033, entitled "PORTABLE, SELF-LOCATING SMART DEFRIBILLATOR SYSTEM," filed on Aug. 10, 2002, which is a continuation-in part of U.S. application Ser. No. 10/010,971, entitled "SELF-LOCATING ALARM SYSTEM EQUIPPED PARACHUTE," filed on Dec. 4, 2001, which is a continuation-in-part of U.S. application Ser. No. 09/728,167, entitled "VOICE-ACTIVATED PERSONAL ALARM", filed on Dec. 1, 2000, which is a continuation-in-part of U.S. application Ser. No. 09/325,030, entitled "SELF-LOCATING REMOTE MONITORING SYSTEMS," filed on Jun. 3, 1999, which is a continuation of U.S. application Ser. No. 08/849,998, entitled "SELF-LOCATING REMOTE MONITORING SYSTEMS," filed on Jul. 6, 1998, which is a U.S. National stage entry of PCT/US96/17473, filed on Oct. 28, 1996, which is a continuation-in-part of U.S. application Ser. No. 08/330,901, entitled "MULTI-HAZARD ALARM SYSTEM USING SELECTABLE POWER-LEVEL TRANSMISSION AND LOCALIZATION," filed on Oct. 27, 1994, of which U.S. application Ser. No. 08/547,026, entitled "SELF-LOCATING REMOTE MONITORING SYSTEMS," filed on Oct. 23, 1995, is a continuation-in-part. Each of these above-referenced patent applications are herein incorporated by reference in their entirety.

BACKGROUND OF INVENTION

1. Field of Invention

This invention relates to personal alarm systems and in particular to such systems transmitting at a higher power level during emergencies.

2. Discussion of Related Art

Personal alarm systems are well known in the art (see for example U.S. Pat. Nos. 4,777,478, 5,025,247, 5,115,223, 4,952,928, 4,819,860, 4,899,135, 5,047,750, 4,785,291, 5,043,702, and 5,086,391). These systems are used to maintain surveillance of children. They are used to monitor the safety of employees involved in dangerous work at remote locations. They are even used to find lost or stolen vehicles and strayed pets.

These systems use radio technology to link a remote transmitting unit with a base receiving and monitoring station. The remote unit is usually equipped with one or more hazard sensors and is worn or attached to the person or thing to be monitored. When a hazard is detected, the remote unit transmits to the receiving base station where an operator can take appropriate action in responding to the hazard.

The use of personal alarm systems to monitor the activities of children has become increasingly popular. A caretaker attaches a small remote unit, no larger than a personal pager, to an outer garment of a small child. If the child wanders off or is confronted with a detectable hazard, the caretaker is immediately notified and can come to the child's aid. In at least one interesting application, a remote unit includes a receiver and an audible alarm which can be activated by a small hand-held transmitter. The alarm is attached to a small child. If the child wanders away in a large crowd, such as in a department store, the caretaker actives the audible alarm which then emits a sequence of "beeps" useful in locating the child in the same way one finds a car at a parking lot through the use of an auto alarm system.

A number of novel features have been included in personal alarm systems. Hirsh et al., U.S. Pat. No. 4,777,478, provide for a panic button to be activated by the child, or an alarm to be given if someone attempts to remove the remote unit from the child's clothing. Banks, U.S. Pat. No. 5,025,247, teaches a base station which latches an alarm condition so that failure of the remote unit, once having given the alarm, will not cause the alarm to turn off before help is summoned. Moody, U.S. Pat. No. 5,115,223, teaches use of orbiting satellites and triangulation to limit the area of a search for a remote unit which has initiated an alarm. In U.S. Pat. No. 4,952,928 to Carroll et al., and in U.S. Pat. No. 4,819,860 to Hargrove et al., the apparatus provides for the remote monitoring of the vital signs of persons who are not confined to fixed locations.

Ghahariiran, U.S. Pat. No. 4,899,135, teaches a child monitoring device using radio or ultra-sonic frequency to give alarm if a child wanders out of range or falls into water. Hawthorne, U.S. Pat. No. 4,785,291, teaches a distance monitor for child surveillance in which a unit worn by the child includes a radio transmitter. As the child moves out of range, the received field strength, of a signal transmitted by the child's unit, falls below a limit and an alarm is given.

Clinical experience in the emergency rooms of our hospitals has taught that a limited number of common hazards account for a majority of the preventable injuries and deaths among our toddler age children. These hazards include the child's wandering away from a safe or supervised area, water emersion, fire, smoke inhalation, carbon monoxide poisoning and electrical shock. Child monitoring devices, such as those described above, have been effective in reducing the number of injuries and deaths related to these common preventable hazards.

However, considering the importance of our children's safety, there remains room for improvement of these systems. One such area for improvement relates to increasing the useful life of a battery used to power the remote unit of these toddler telemetry systems, as they have come to be called.

The remote unit is typically battery operated and, in the event of an emergency, continued and reliable transmission for use in status reporting and direction finding is of paramount importance. In other words, once the hazard is detected and the alarm given, it is essential that the remote unit continue to transmit so that direction finding devices can be used to locate the child.

The remote unit of most child monitoring systems is typically quite small and the available space for a battery is therefore quite limited. Despite recent advances in battery technology, the useful life of a battery is typically related to the battery size. For example, the larger "D" cell lasting considerably longer than the much smaller and lighter "AAA" cell. Though the use of very low power electronic circuits has made possible the use of smaller batteries, a battery's useful life is still very much a factor of its physical size, which, as stated above, is limited because of the small size of a typical remote unit. Therefore, additional efforts to reduce battery drain are important.

Given that much reliance is placed on the reliability of any child monitoring system, it would be desirable for the remote unit to transmit at a low power or not at all when no danger exists. In this way battery life is increased and system reliability is improved overall, since the hazards are usually the exception rather than the rule.

SUMMARY OF INVENTION

It is an object of the present invention to provide a personal alarm system in which the battery operated remote unit normally transmits at low power and switches to a higher power when the distance between the remote unit and base station exceeds a predetermined limit.

It is also an object of the present invention to provide such a system which includes sensors for the hazardous conditions typically confronting young children.

It is a further object of the present invention to provide such a personal alarm system which includes a periodic handshake exchange between the remote unit and base station to demonstrate that the system continues to be operational.

In accordance with the above objects and those that will become apparent below, a personal alarm system is provided, comprising:
a remote unit including radio transmitting means and radio receiving means;
the remote unit transmitting means being able to transmit at more than one power level and defining a higher power level;
a base station including radio transmitting means and radio receiving means;
the remote unit and the base station being in radio communication and defining a separation distance between the remote unit and the base station;
measuring means for determining whether the separation distance exceeds a predetermined limit;
means responsive to the measuring means for causing the remote unit transmitting means to transmit at the higher power level when the separation distance exceeds the limit; and
alarm means for indicating when the separation distance exceeds the limit.

In one embodiment of the invention, the base station transmits a periodic polling signal and the remote unit monitors the field strength of the received polling signal. If the received field strength falls below a limit, corresponding to some maximum distance between the two devices, the remote unit transmits at high power. The signal transmitted at high power includes an indication that transmission is at high power. When this signal is received by the base station, an alarm is given. The remote unit also is equipped to detect one or more hazards.

In another embodiment of the invention, there are multiple remote units each able to identify itself by including a unit identification number in its transmitted signal. The remote unit is equipped to detect one or more hazards and to identify detected hazards in its transmission. The base station is able to display the transmitting unit identification number and the type of any detected hazard.

In another embodiment, the base station, rather than the remote unit, measures the field strength of the received remote unit transmission and instructs the remote unit to transmit at high power when the received field strength falls below a preset limit.

In another embodiment, the remote unit includes both visual and audible beacons which can be activated by the base station for use in locating the child.

In another embodiment, the remote unit includes a panic button which the child or concerned person can use to summon help.

In another embodiment, the base station includes the ability to initiate a phone call via the public telephone system, for example by initiating a pager message to alert an absent caretaker.

In another embodiment, the remote unit includes a global positioning system ("GPS") receiver which is activated if a hazard is detected or if the child wanders too far from the base station. The remote unit then transmits global positioning coordinates from the GPS receiver. These coordinates are received by the base station and used in locating the child. In an alternative embodiment, the remote unit is attached to a child, pet or vehicle and the GPS receiver is activated by command from the base station. The global positioning coordinates are then used by the base station operator to locate the remote unit.

In another embodiment, the remote unit is worn by an employee doing dangerous work at a remote location such as an electrical power lineman repairing a high voltage power line. The remote unit is equipped with a GPS receiver and an electrical shock hazard sensor and the remote unit will instantly transmit the workman's location in the event of electrical shock. The device will permit an emergency medical crew to rapidly find and give aid to the injured workman and possibly save a life.

It is an advantage of the present invention to periodically test system integrity by exchanging an electronic handshake and giving an alarm in the event of failure.

It is also an advantage of the present invention to prolong the remote unit battery life by transmission at low power in the absence of a defined emergency.

It is also an advantage of the present invention that the system is able to detect and give alarm for a number of common and dangerous hazards.

It is a further advantage of the present invention to permit rapid and precise location of the remote unit which is equipped with a GPS receiver.

BRIEF DESCRIPTION OF DRAWINGS

For a further understanding of the objects, features and advantages of the present invention, reference should be had to the following description of the preferred embodiment, taken in conjunction with the accompanying drawing, in which like parts are given like reference numerals and wherein:

FIG. 2 is a block diagram of another embodiment of the personal alarm system illustrated in FIG. 1 including multiple remote units.

FIG. 4 is a pictorial diagram illustrating a preferred message format used by the personal alarm system illustrated in FIG. 2.

FIG. 5 is a pictorial diagram illustrating another preferred message format used by the personal alarm system illustrated in FIG. 2.

FIG. 7 is a pictorial diagram illustrating a base station and remote unit of the personal alarm system of FIG. 1, in a typical child monitoring application.

FIG. 8 is a pictorial diagram illustrating a remote unit in accordance with the present invention being worn at the waist.

FIG. 9 is a pictorial diagram illustrating a mobile base station in accordance with the present invention for operation from a vehicle electrical system.

FIG. 10 is a pictorial diagram illustrating a base station in accordance with the present invention being operated from ordinary household power.

FIG. 25 is a pictorial diagram illustrating geographical regions for an invisible fence system.

FIG. 26 is a table defining a curfew for an invisible fence system.

FIG. 29 is a partial block diagram illustrating an alarm system including an oil/chemical sensor, and all sensors activating transmission at a higher power level.

FIG. 35 is a pictorial diagram representing a specific embodiment of a weather region.

FIG. 36 is a pictorial diagram illustrating another specific embodiment of a weather region.

FIG. 48 is a partial block diagram that illustrates the use of a wireless phone within a personal alarm system remote unit according to a specific embodiment of the present invention.

FIG. 49 is a partial block diagram illustrating the wireless phone of FIG. 48 and including a circuit that automatically dials "911" for transmitting the remote unit location.

FIG. 50 is a partial block diagram that illustrates the use of a cellular telephone for transmitting the remote unit location and for two-way radio communication.

FIG. 51 is a partial block diagram that illustrates the use of a PCS telephone for transmitting the remote unit location and for two-way radio communication.

DETAILED DESCRIPTION

Figure 1:
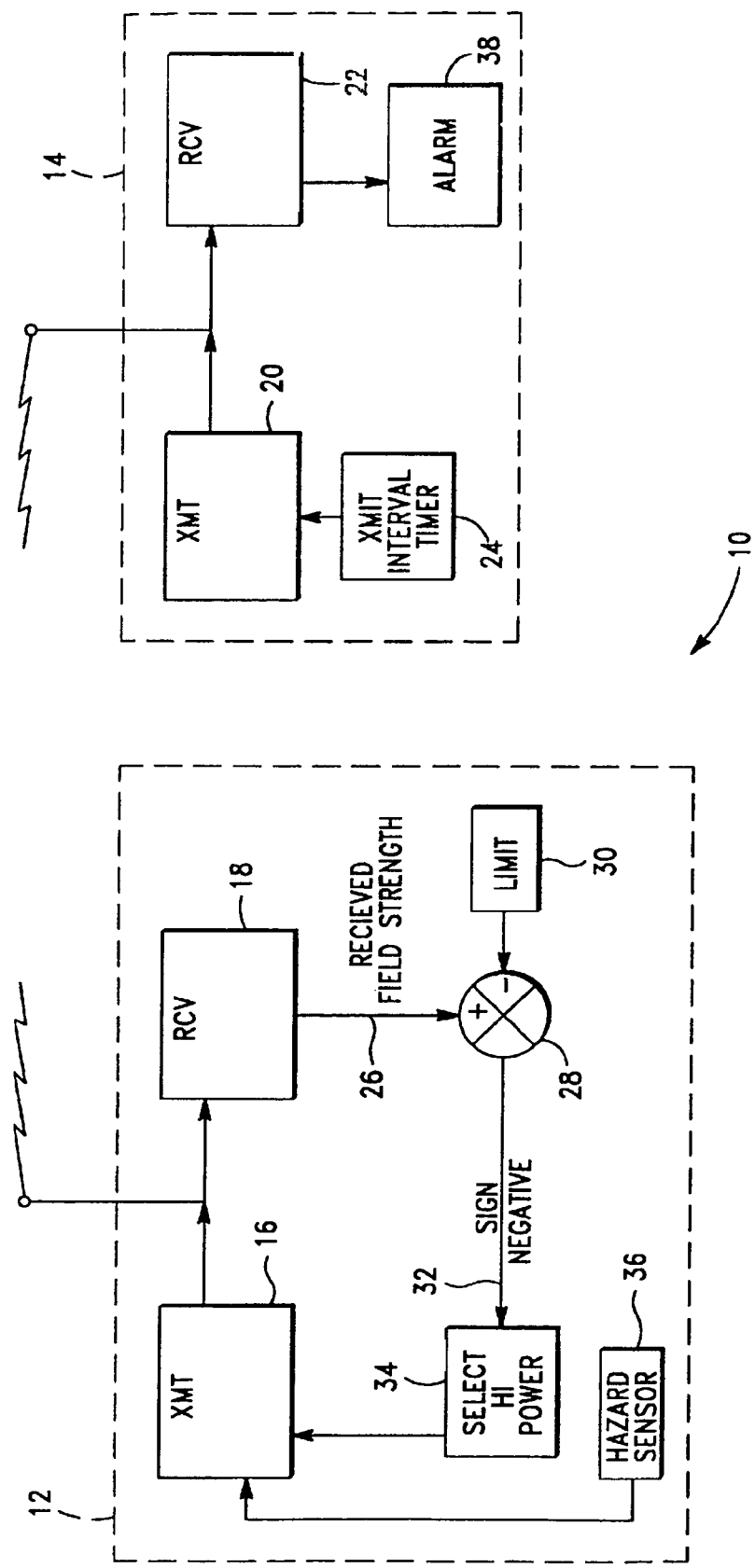
FIG. 1 is a block diagram of a personal alarm system in accordance with one embodiment of the present invention and transmitting at selectable power levels.

With reference to FIG. 1, there is shown a block diagram of a personal alarm system according to one embodiment of the present invention and depicted generally by the numeral 10. The personal alarm system 10 includes a remote unit 12 and a base station 14. The remote unit 12 has a radio transmitter 16 and a receiver 18, and the base station 14 has a radio transmitter 20 and a receiver 22. The transmitters 16, 20 and receivers 18, 22 are compatible for two-way radio communication between the remote unit 12 and the base station 14.

In a preferred embodiment, the base station 14 includes an interval timer 24 which causes the transmitter 20 to transmit at predetermined intervals. The receiver 18 of the remote unit 12 receives the signal transmitted by the base station 14 and causes the transmitter 16 to transmit a response to complete an electronic handshake.

The remote unit transmitter 16 is capable of transmitting at an energy conserving low-power level or at an emergency high-power level. When the distance between the remote unit 12 and the base station 14 exceeds a predetermined limit, the remote unit responds at the higher power level.

To accomplish the shift to the higher power level, the remote unit receiver 18 generates a signal 26 which is proportional to the field strength of the received signal, transmitted by the base station 14. The remote unit 12 includes a comparitor 28 which compares the magnitude of the field strength signal 26 with a predetermined limit value 30 and generates a control signal 32.

The remote unit transmitter 16 is responsive to a circuit 34 for selecting transmission at either the low-power level or at the high-power level. The circuit 34 is connected to the control signal 32 and selects transmission at the low-power level when the received field strength equals or exceeds the limit value 30, and at the higher power level when the received field strength is less than the limit value 30. Alternatively, the remote unit transmitter 16 transmits at one of a selectable plurality of transmission power levels. In another alternative embodiment, transmission is selectable within a continuous range of transmission power levels.

Within an operating range of the personal alarm system 10, the field strength of the base station 14 transmitted signal when received at the remote unit 12 is inversely proportional to the fourth power (approximately) of the distance between the two units.

This distance defines a 'separation distance,' and the predetermined limit value 30 is selected to cause transmission at the higher power level at a desired separation distance within the operating range.

In another embodiment, the remote unit 12 includes a hazard sensor 36 which is connected to the transmitter 16. The hazard sensor 36 is selected to detect one of the following common hazards, water immersion, fire, smoke, excessive carbon monoxide concentration, and electrical shock. In one embodiment, a detected hazard causes the remote unit 12 to transmit a signal reporting the existence of the hazardous condition at the moment the condition is detected. In another embodiment, the hazardous condition is reported when the response to the periodic electronic handshake occurs.

In one embodiment, the base station 14 includes an audible alarm 38 which is activated by the receiver 22. If the remote unit fails to complete the electronic handshake or reports a detected hazard or indicates it is out of range by sending an appropriate code, the base station alarm 38 is activated to alert the operator.

FIG. 2 is a block diagram illustrating another embodiment of the personal alarm system of the present invention. The alarm system is indicated generally by the numeral 40 and includes a first remote unit 42, a second remote unit 44 and a base station 46. The first remote unit 42 includes a transmitter 48, a receiver 50, an identification number 52, a received field strength signal 54, a comparitor 56, a predetermined limit value 58, a control signal 60, a power level select circuit 62 and a hazard sensor 64.

The second remote unit 44 includes a separate identification number 66, but is otherwise identical to the first remote unit 42.

The base station 46 includes a transmitter 68, an interval timer 70, a receiver 72, an alarm 74 and an ID-Status display 76.

In one embodiment of the invention illustrated in FIG. 2, the radio transmission between the first remote unit 42 and the base station 46 includes the identification number 52. The transmission between the second remote unit 44 and the base station 46 includes the identification number 66. It will be understood by those skilled in the art that the system may include one or more remote units, each having a different identification number 52.

It will also be understood that each remote unit 42 may have a different predetermined limit value 58. The limit value 58 defines a distance between the remote unit 42 and the base station 46 beyond which the remote unit will transmit at its higher power level. If a number of remote units are being used to monitor a group of children, in a school playground for example, the limit values of each remote unit may be set to a value which will cause high power transmission if the child wanders outside the playground area. In other applications, the limit value 58 of each remote unit 42 may be set to a different value corresponding to different distances at which the individual remote units will switch to high power transmission.

In one embodiment, the base station 46 will provide an alarm 74 whenever a remote unit transmits at high power or reports the detection of a hazard. The identification number of the reporting remote unit and an indication of the type of hazard is displayed by the base station on the ID-Status display 76. This information can be used by the operator, for example a day-care provider, to decide what response is appropriate and whether immediate caretaker notification is required. If a child has merely wandered out of range, the provider may simply send an associate out to get the child and return her to the play area. On the other hand, a water immersion hazard indication should prompt immediate notification of caretakers and emergency personnel and immediate action by the day-care employees.

In another embodiment, the remote unit receiver 50 determines that the separation distance between the remote unit 42 and the base station 46 exceeds the predetermined threshold. The remote unit transmitter 48 transmits a code or status bit to indicate that fact.

In an embodiment illustrated in FIG. 1, the polling message transmitted periodically by the base station 14 is an RF carrier. The carrier frequency is transmitted until a response from the remote unit 12 is received or until a watchdog timer (not illustrated) times out, resulting in an alarm The information contained in the remote unit response must include whether transmission is at low power or at high power, and whether a hazard has been detected, since the base station provides an alarm in either of these instances.

In an embodiment illustrated in FIG. 2, however, additional information must be reported and the advantages of a digitally formatted remote unit response will be apparent to those possessing an ordinary level of skill in the art.

Figure 3:
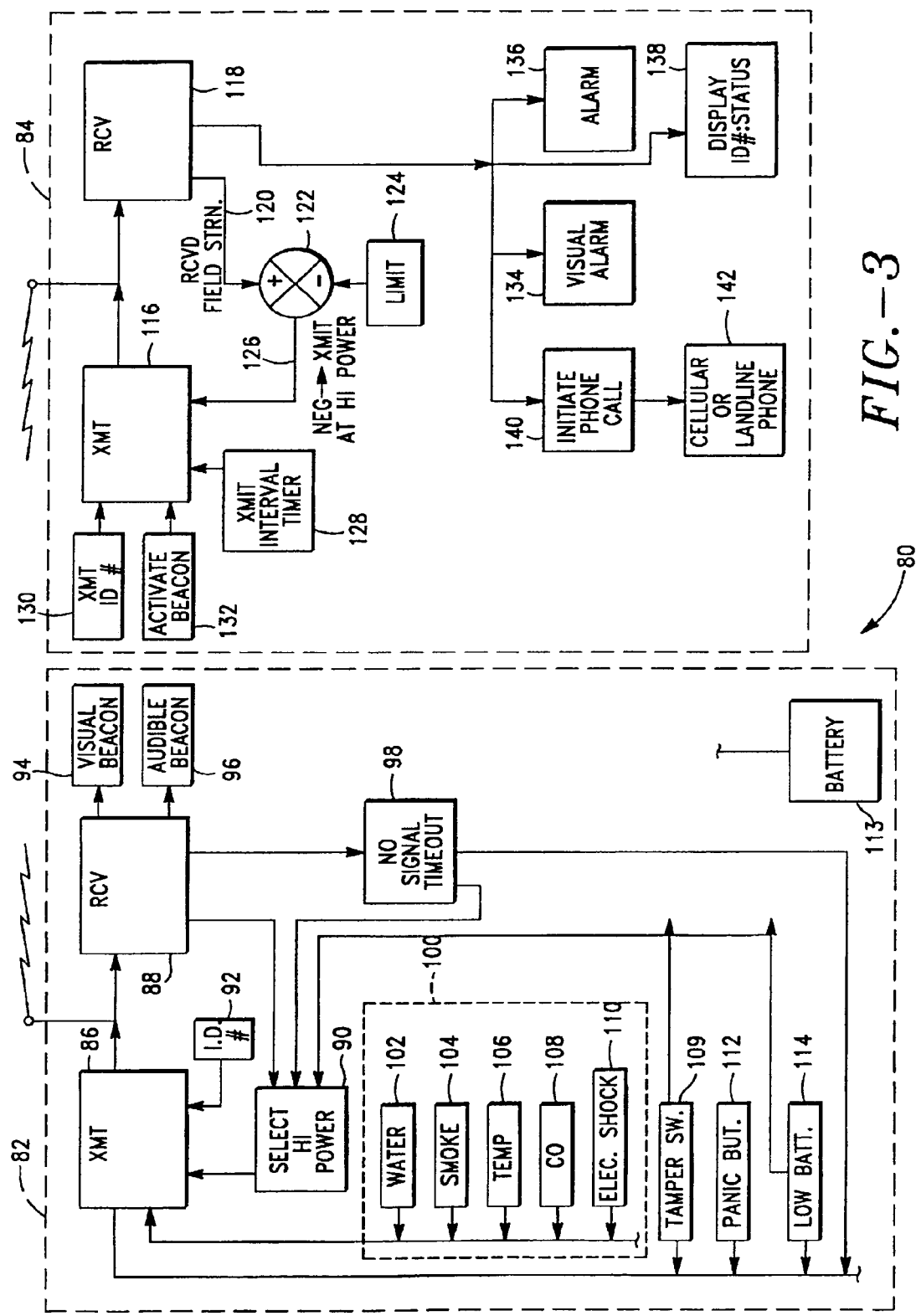
FIG. 3 is a block diagram illustrating another embodiment of the personal alarm system in accordance with the present invention.

FIG. 3 is a block diagram illustrating another embodiment of the personal alarm system in accordance with the present invention and generally indicated by the numeral 80. Personal alarm system 80 includes a remote unit 82 and a base station 84.

The remote unit 82 includes a transmitter 86, a receiver 88, a power level select circuit 90, an ID number 92, a visual beacon 94, an audible beacon 96, a watchdog timer 98, a plurality of hazard sensors 100 including a water immersion sensor 102, a smoke sensor 104, a heat sensor 106, a carbon monoxide sensor 108, a tamper switch 109, and an electrical shock sensor 110, an emergency switch ("panic button") 112, a battery 113, and a 'low battery power' sensor 114.

The base station 84 includes a transmitter 116, a receiver 118 which produces a received field strength signal 120, a comparitor 122, a predetermined limit value 124, a comparitor output signal 126, an interval timer 128, control signals 130 and 132, a visual alarm 134, an audible alarm 136, an ID and Status display 138, a circuit 140 for initiating a phone call and a connection 142 to the public telephone system.

The base station 84 and a plurality of the remote units 82 illustrated in the embodiment of FIG. 3 communicate using a digitally formatted message. One message format is used by the base station 84 to command a specific remote unit 82, and a second message format is used by a commanded remote unit 82 to respond to the base station 84. These message formats are illustrated in FIGS. 5 and 4, respectively.

With reference to FIG. 4 there is shown a pictorial diagram of a preferred digital format for a response from a remote unit in a personal alarm system in accordance with the present invention, indicated generally by the numeral 150. The digital response format 150 includes a remote unit ID number 152, a plurality of hazard sensor status bits 154 including a water immersion status bit 156, a smoke sensor status bit 158, a heat sensor status bit 160, an excessive carbon monoxide concentration status bit 162, and an electrical shock status bit 164. The response 150 also includes a high power status bit, 166, a panic button status bit 168, a low battery power detector status bit 170, a tamper switch status bit 171, and bits reserved for future applications 172.

Figure 6:
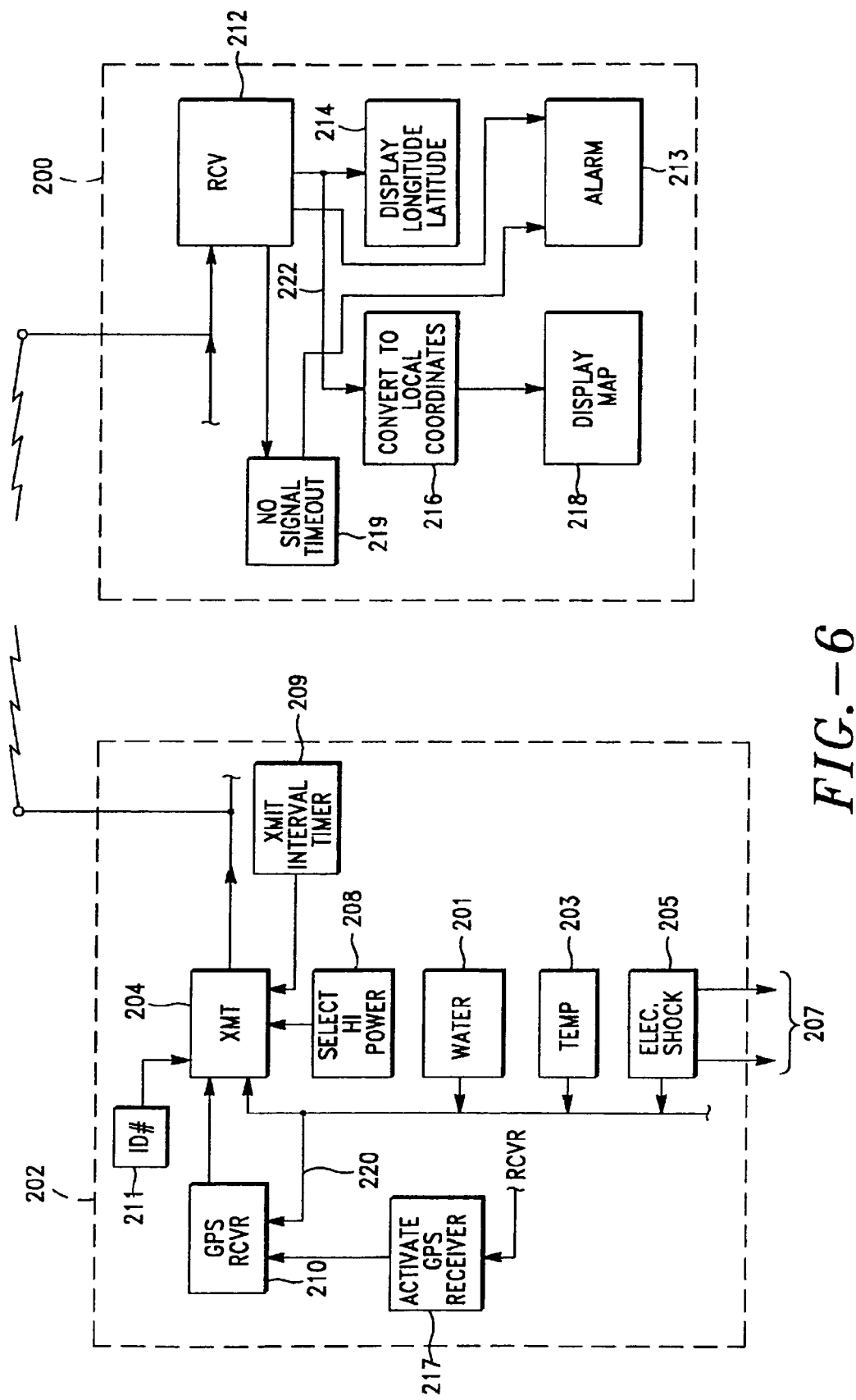
FIG. 6 is a block diagram illustrating an embodiment of the personal alarm system of the present invention using the Global Positioning System to improve remote unit location finding.

FIG. 5 is a pictorial diagram of a preferred digital format for a base station to remote unit transmission, generally indicated by the numeral 180. The digital message format 180 includes a command field 182 and a plurality of unassigned bits 190 reserved for a future application. The command field 182 includes a coded field of bits 184 used to command a specific remote unit to transmit its response message (using the format 150). The command field 182 also includes a single bit 186 used to command a remote unit, such as the embodiment illustrated in FIG. 3, to transmit at high power. The command field 182 includes command bit 188 used to command a remote unit to activate a beacon, such as the visual beacon 94 and the audible beacon 96 illustrated in FIG. 3. The command field 182 also includes command bit 189, used to command a remote unit to activate a GPS receiver, such as illustrated in FIG. 6.

In an alternative embodiment, the remote unit transmitter is adapted to transmit at one of a plurality of transmission power levels and the single command bit 186 is replaced with a multi-bit command sub-field for selection of a power level. In another embodiment, the remote unit transmitter is adapted to transmit at a power level selected from a continuum of power levels and a multi-bit command sub-field is provided for the power level selection.

Again with respect to FIG. 3, the Base station 84 periodically polls each remote unit 82 by transmitting a command 180 requiring the remote unit 82 to respond with message format 150. The polling is initiated by the interval timer 128 which causes the base station transmitter 116 to transmit the outgoing message 180. The numerals 150 and 180 are used to designate both the format of a message and the transmitted message. A specific reference to the format or the transmitted message will be used when necessary for clarity. As is common in the communications industry, the message win sometimes be referred to as a 'signal,' at other times as a 'transmission,' and as a 'message;' a distinction between these will be made when necessary for clarity.

The message 180 is received by all remote units and the remote unit to which the message is directed (by the coded field 184) responds by transmitting its identification number 152 and current status, bits 154-170. The remote unit identification number 92 is connected to the transmitter 86 for this purpose.

In the embodiment illustrated in FIG. 3, the function of measuring received field strength to determine whether a predetermined separation distance is exceeded is performed in the base station 84. The base station receiver 118 provides a received field strength signal 120 which is connected to the comparitor 122. The predetermined limit value 124 is also connected to the comparitor 122 which provides a comparitor output signal 126. If the received field strength 120 is less than the limit value 124, the comparitor output signal 126 is connected to assert the "go-to-high-power" command bit 186 in the base unit 84 outgoing message 180. The limit value 124 is selected to establish the predetermined separation distance beyond which transmission at high power is commanded.

In one embodiment, the selection of the limit value 124 is accomplished by the manufacturer by entering the value into a read-only memory device. In another embodiment, the manufacturer uses manually operated switches to select the predetermined limit value 124. In another embodiment, the manufacturer installs jumper wires to select the predetermined limit value 124. In yet another embodiment, the user selects a predetermined limit value 124 using manually operated switches.

The remote unit transmitter 86 is capable of transmitting at a power-conserving lower power level and also at an emergency higher power level. Upon receiving a message 180 including the remote unit identification number 184, the remote unit receiver passes the "go-to-high-power" command bit 186 to the power level select circuit 90 which is connected to command the remote unit transmitter 86 to transmit a response 150 at the higher power level. The response 150 includes status bit 166 used by the remote unit 82 to indicate that it is transmitting at high power.

In one embodiment, the remote unit includes the watchdog timer 98 (designated a 'No Signal Timeout') which is reset by the receiver 88 each time the remote unit 82 is polled. If no polling message 180 is received within the timeout period of the watchdog timer 98, the remote unit transmitter 86 is commanded to transmit a non-polled message 150.

In one embodiment of the invention, the remote unit 82 includes a manually operated switch ("panic button") 112 which is connected to the transmitter 86 to command the transmission of a non-potted message 150. The panic button status bit 168 is set in the outgoing message 150 to indicate to the base station 84 that the panic button has been depressed. Such a button can be used by a child or invalid or other concerned person to bring help.

In another embodiment, the remote unit includes a tamper switch 109 which is activated if the remote unit is removed from the child, or is otherwise tampered with. The activation of the tamper switch 109 causes the remote unit to transmit a code or status bit to the base unit to identify the cause of the change of status ('Tamper' status bit 171 illustrated in FIG. 4). In one related alternative, the remote unit transmits at the higher power level when the switch is activated by removal of the remote unit from the child's person.

In another embodiment, the remote unit 82 includes a circuit 114 which monitors battery power. The circuit 114 is connected to initiate a non-polled message 150 if the circuit determines that battery power has fallen below a predetermined power threshold. The message 150 will include the "low-battery-power" status bit 170. In an alternative embodiment, a low battery power level will initiate a remote unit transmission at the higher power level (see FIG. 3).

In the embodiment illustrated in FIG. 3, the remote unit 82 includes several hazard sensors 100. These sensors are connected to report the detection of common hazards and correspond to the sensor status bits 154 in the remote unit response message 150.

In another embodiment of the present invention, the base station receiver 118 is connected to a visual alarm 134 and an audible alarm 136 and will give an alarm when a message 150 is received which includes any hazard sensor report 154 or any of the status bits 166-170.

The base station 84 also includes the status and ID display 138 used to display the status of all remote units in the personal alarm system 80.

In another embodiment of the personal alarm system 80, the base station 84 includes a circuit 140 for initiating a telephone call when an emergency occurs. The circuit 140 includes the telephone numbers of persons to be notified in the event of an emergency. A connection 142 is provided to a public landline or cellular telephone system. The circuit 140 can place calls to personal paging devices, or alternatively place prerecorded telephone messages to emergency personnel, such as the standard "911" number.

FIG. 6 is a partial block diagram illustrating an embodiment of the invention having a base station 200 and at least one remote unit 202. The partially illustrated remote unit 202 includes a transmitter 204, hazard sensors 201, 203, 205, a circuit 208 for causing the transmitter to transmit at a higher power level, a transmit interval timer 209, and a Global Positioning System ('GPS') receiver 210. The partially illustrated base station 200 includes a receiver 212, an alarm 213, a display 214 for displaying global positioning coordinates of longitude and latitude, a circuit 216 for converting the global positioning coordinates into predefined local coordinates, a map display 218 for displaying a map in the local coordinates and indicating the location of the remote unit 202, and a watchdog timer 219.

In a preferred embodiment of the alarm system, the remote unit transmitter 204 is connected to receive the global positioning coordinates from the GPS receiver 210 for transmission to the base station 200.

The GPS receiver 210 determines its position and provides that position in global positioning coordinates to the transmitter 204. The global position coordinates of the remote unit 202 are transmitted to the base station 200. The base station receiver 212 provides the received global positioning coordinates on line 222 to display 214 and to coordinate converter 216. The display 214 displays the global coordinates in a world-wide coordinate system such as longitude and latitude.

In one embodiment of the alarm system, the coordinate converter 216 receives the global positioning coordinates from line 222 and converts these into a preferred local coordinate system A display 218 receives the converted coordinates and displays the location of the remote unit 202 as a map for easy location of the transmitting remote unit 202.

In another embodiment of the alarm system the GPS receiver 210 includes a low power standby mode and a normal operating mode. The GPS receiver 210 remains in the standby mode until a hazard is detected and then switches to the normal operating mode.

In another embodiment of the alarm system, the GPS receiver 210 remains in the standby mode until commanded by the base station 200 to enter the normal operating mode (see command bit 189 illustrated in FIG. 5).

In another embodiment of the alarm system, the remote unit transmitter 204 is connected to the hazard sensors 201-205 for transmission of detected hazards. The base station receiver 212 is connected to activate the alarm 213 upon detection of a hazard.

In one embodiment, a conventional electrical shock sensor 205 includes a pair of electrical contacts 207 which are attached to the skin of a user for detection of electrical shock.

In another embodiment, the remote unit 202 includes a transmit interval timer 209 and an ID number 211. The timer 209 is connected to cause the remote unit to transmit the ID number at predetermined intervals. The base station 200 includes a watchdog timer 219 adapted to activate the alarm 213 if the remote unit fails to transmit within the prescribed interval.

In another embodiment of the alarm system, the remote unit 202 includes a carbon monoxide concentration sensor (see 108 of FIG. 3) having an output signal connected to activate a sensor status bit (see 162 of FIG. 4) for transmission to the base station 200.

FIGS. 7-10 are pictorial illustrations of alternative embodiments of the personal alarm system of the present invention. FIG. 7 illustrates a base station 250 in two-way radio communication with a remote unit 252 worn by a child. The child is running away from the base station 250 such that the separation distance 256 has exceeded the preset threshold. The base station has determined that an alarm should be given, and an audible alarm 254 is being sounded to alert a responsible caretaker. FIG. 8 illustrates a remote unit worn at the waist of a workman whose location and safety are being monitored. FIG. 9 illustrates a mobile base station 270 equipped with a cigarette lighter adapter 272 for operation in a vehicle. FIG. 10 illustrates a base station 280 adapted for operation from ordinary household current 282.

Figure 11:
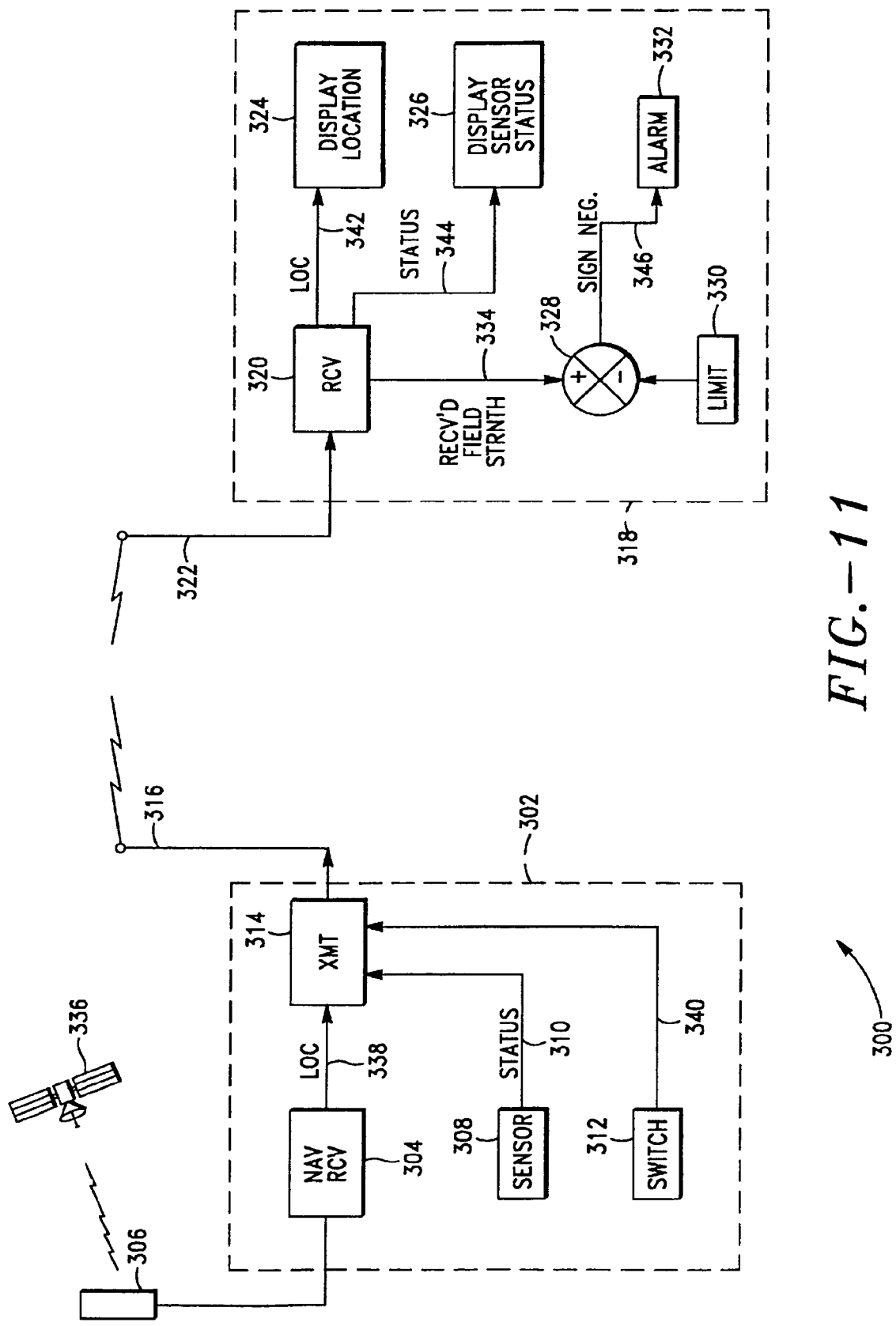
FIG. 11 is a block diagram illustrating a man-over-board alarm system in accordance with one aspect of the present invention.

FIG. 11 is a block diagram which illustrates a man-overboard system in accordance with one aspect of the present invention, and designated generally by the numeral 300.

The man-over-board system 300 includes a remote unit 302, having a navigational receiver 304 and antenna 306 for receiving navigational information, a sensor 308, having an output signal 310, a manually operated switch 312, a radio transmitter 314 having an antenna 316. The man-over-board system 300 also includes a base station 318 having a radio receiver 320 connected to an antenna 322 for receiving radio transmissions from the remote unit 302. The base station 318 also includes a display 324 for displaying the navigational location of the remote unit 302, a display 326 for displaying the status of the sensor 308, a circuit 328 for comparing the field strength of the received radio transmission with a predetermined limit 330, and an alarm 332 which is activated when the received field strength 334 falls below the value of the limit 330.

In use, the remote unit 302 is worn by a user and an alarm will be given if the user falls over board and drifts too far from the boat. The navigational receiver 304 receives navigational information, as for example from global positioning satellites 336. The navigational receiver 304 converts the navigational information into a location of the remote unit 302 and outputs the location 338 to the radio transmitter 314 for transmission to the base station 318.

The sensor 308 provides an output signal 310 and defines a sensor status. The output signal 310 is connected to the radio transmitter 314 for transmitting the sensor status to the base station 318.

The manually operated switch 312 includes an output 340 which is connected to the radio transmitter 314 and permits the user to signal the base station 318 by operating the switch 312. In a preferred embodiment, the manually operated switch 312 defines a panic button.

The radio receiver 320 provides three outputs, the received location 342 of the remote unit 302, the received sensor status 344, and an output signal 334 proportional to the field strength of the received radio transmission. As described above with respect to FIGS. 1-3, the remote unit 302 and the base station 318 define a separation distance which is inversely proportional to the received field strength. The comparitor circuit 328 compares the received field strength 334 with a predetermined limit 330 and produces an output signal 346 if the sign of the comparison is negative, indicating that the field strength of the received signal is less than the limit 330. If the user drifts beyond a separation distance from the boat defined by the limit 330, the alarm 332 is activated to alert the user's companions, who can then take appropriate action.

In heavy seas or poor visibility, the base station 318 displays the current location of the remote unit 302 on a suitable display 324. This is done in some appropriate coordinate system, such as standard longitude and latitude. This feature permits the base station to maintain contact with the man-over-board despite failure to maintain direct eye contact.

Figure 12:
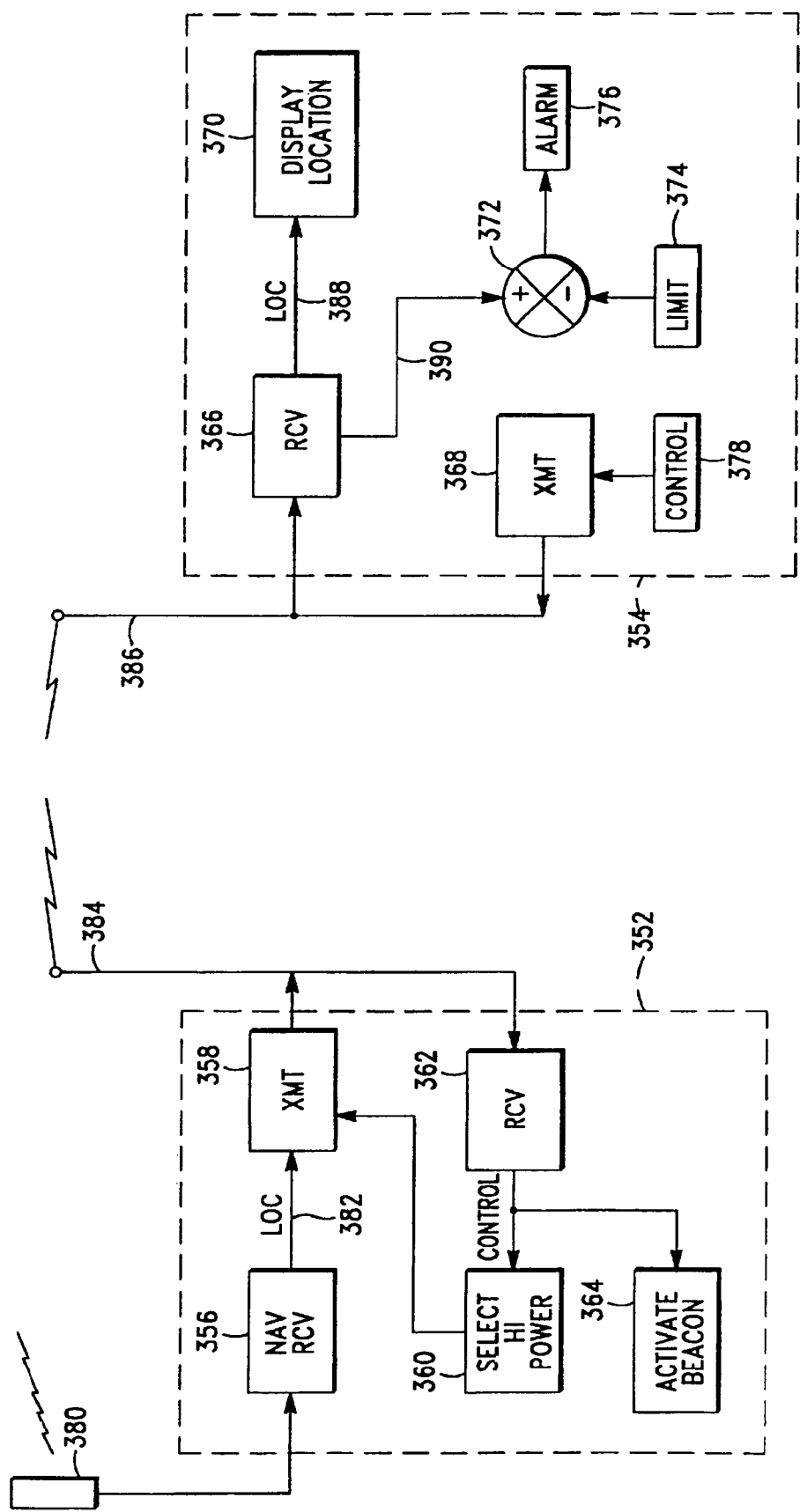
FIG. 12 is a block diagram illustrating another embodiment of the man-over-board alarm system.

FIG. 12 is a block diagram which illustrates a man-overboard system including a two-way radio communication link and designated generally by the numeral 350. The man-overboard system 350 includes a remote unit 352 and a base station 354.

The remote unit 352 includes a navigational receiver 356, a radio transmitter 358, a circuit 360 for causing the radio transmitter 358 to transmit at a high power level, a radio receiver 362, and circuits 364 for activating a beacon.

The base station 354 includes a radio receiver 366, a radio transmitter 368, a display 370 for displaying the location of the remote unit 352, a compactor circuit 372, a predetermined limit 374, an alarm 376, and control circuits 378 for activating the radio transmitter 368.

The navigational receiver 356 is connected to an antenna 380 for receiving navigational information, such as from global positioning system satellites (not shown). The receiver provides the location 382 of the remote unit 352 for radio transmission to the base station 354.

The remote unit radio transmitter 358 and radio receiver 362 are connected to an antenna 384 for communication with the base station 354. The base station radio receiver 366 and radio transmitter 378 are connected to an antenna 386 for communication with the remote unit 352.

The base station radio receiver 366 provides two outputs, the location 388 of the remote unit for display by the location display 370, and a signal 390 whose value is inversely proportional to the field strength of the signal received by the radio receiver 366.

The received field strength signal 390 and the predetermined limit 374 are compared by the comparitor circuit 372 to determine whether the remote unit 352 is separated from the base station 354 by a distance greater than the predetermined limit 374. An alarm 376 is given when the separation distance exceeds the limit.

The control circuits 378 are used to cause the radio transmitter 368 to send a control signal to the remote unit 352 for selecting high-power remote unit radio transmission, or activating a visual or audible beacon for use in locating the user in heavy seas or bad visibility.

Figure 13:
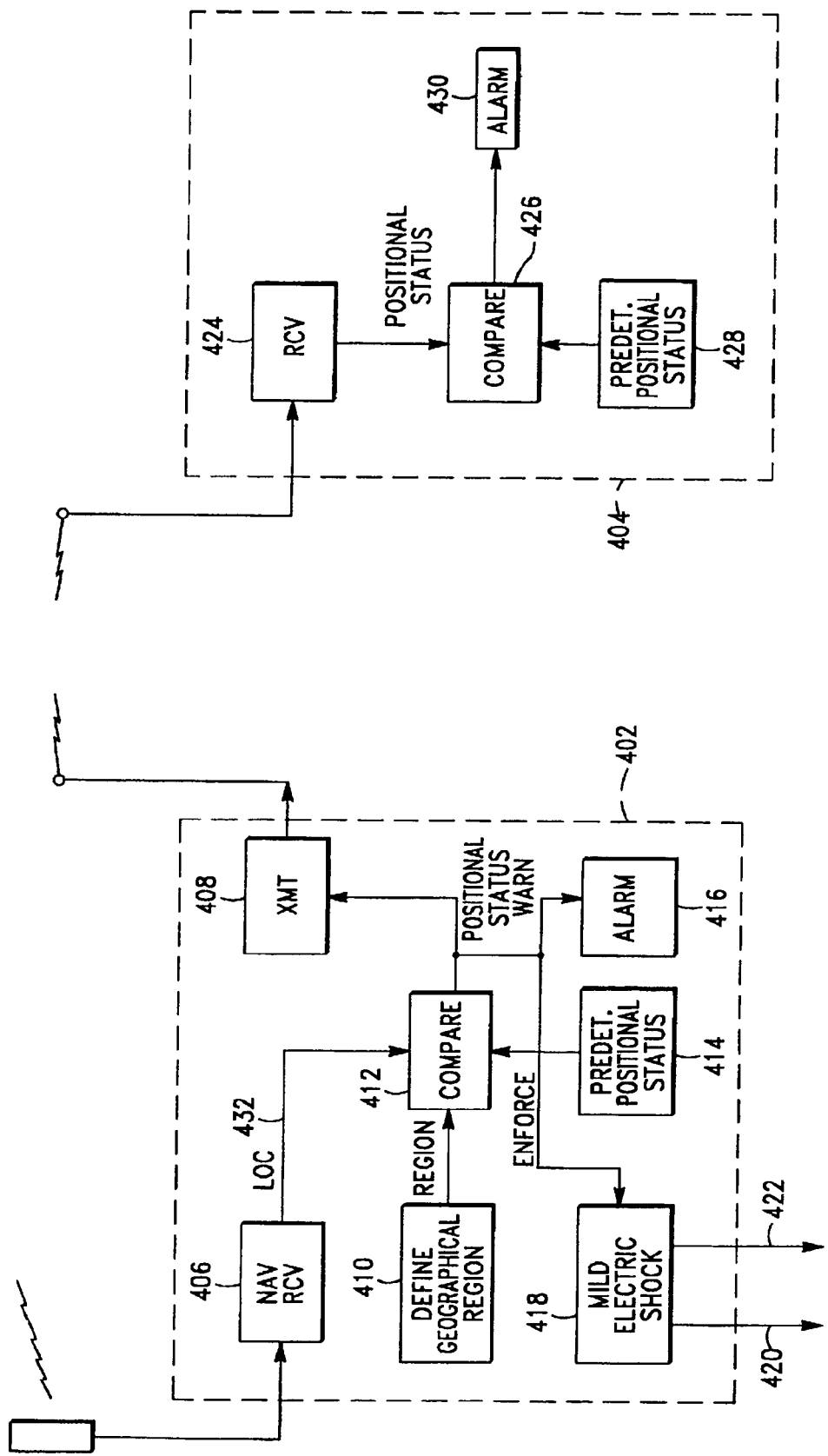
FIG. 13 is a block diagram illustrating an invisible fence monitoring system according to another aspect of the present invention.

FIG. 13 is a block diagram which illustrates an invisible fence for monitoring a movable subject and designated generally by the numeral 400. The invisible fence 400 includes a remote unit 402 and a base station 404 in one-way radio communication.

The remote unit 402 includes a navigational receiver 406, a radio transmitter 408, storage circuits 410 for storing information defining a geographical region, a comparitor 412, second storage circuits 414 for storing information defining a predetermined positional status, an alarm 416, and a circuit 418 and having a pair of electrical contacts 420, 422 for providing a mild electrical shock.

The base station 404 includes a radio receiver 424, a comparitor 426, storage circuits 428 for storing information defining a predetermined positional status, and an alarm 430.

In the embodiment illustrated in FIG. 13, the invisible fence 400 defines a geographical region, for example the outer perimeter of a nursing home in which elderly persons are cared for. If a particular patient tends to wander away from the facility, creating an unusual burden upon the staff the remote unit 402 is attached to the patient's clothing. If the patient wanders outside the defined perimeter, the base station 404 alerts the staff before the patient has time to wander too far from the nursing home.

Other applications are keeping a pet inside the yard, and applying a mild electrical shock to the pet if it wanders too close to a defined perimeter. Attaching the remote unit 402 to a child and alerting the caregiver in the event the child strays from a permitted area. Placing the remote unit around the ankle of a person on parole or probation and giving an alarm if the parolee strays from a permitted area. The invisible fence can also be used to monitor movement of inanimate objects whose locations may change as the result of theft.

The remote unit navigational receiver 406 provides the location 432 of the remote unit. In a preferred embodiment, the storage circuits 410 are implemented using ROM or RAM, as for example within an embedded microprocessor. Consideration of FIGS. 14-16 is useful to an understanding of how the invisible fence operates.

Figure 14:
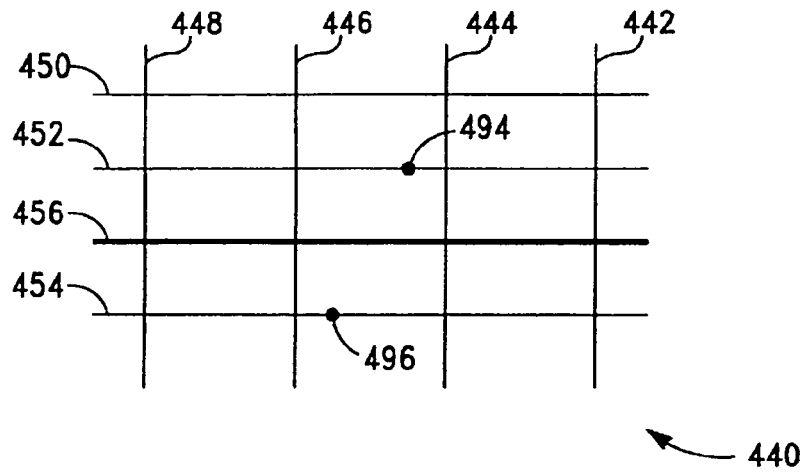
FIG. 14 is a pictorial diagram illustrating a boundary defining a geographical region for use with the invisible fence system of FIG. 13.
Figure 15:
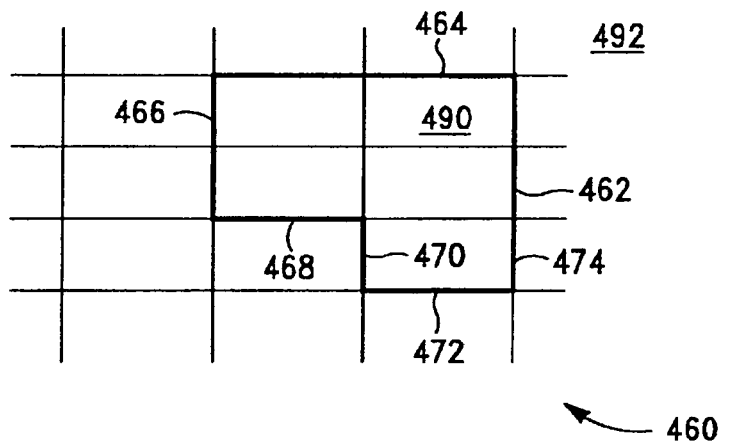
FIG. 15 is another pictorial diagram illustrating a defined region having a closed boundary.
Figure 16:
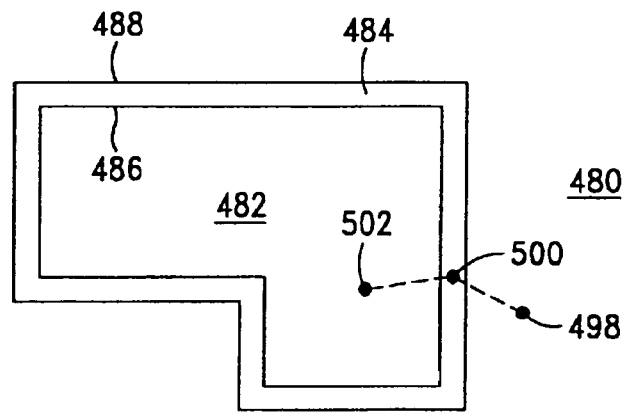
FIG. 16 is another pictorial diagram illustrating a defined region including defined subdivisions.

FIGS. 14, 15 and 16 are pictorial diagrams illustrating boundaries used to define geographical regions such as those used in a preferred embodiment of the invisible fence 400.

FIG. 14 shows a portion 440 of a city, including cross streets 442-454 and a defining boundary 456. The boundary 456 divides the map 440 into two portions, one portion above boundary 456, the other portion below.

FIG. 15 shows a portion 460 of a city, including cross streets (not numbered) and a closed boundary 462 made up of intersecting line segments 464, 466, 468, 470, 472 and 474. The boundary 462 divides the city map 460 into two subregions, one subregion defining an area 490 wholly within the boundary 462, and the other subregion defining an area 492 outside the boundary 462.

FIG. 16 shows a geographical region 480 which includes subregions 482 and 484. Subregion 482 is entirely surrounded by subregion 484, while subregion 484 is enclosed within a pair of concentric closed boundaries 486 and 488.

The information which defines these geographical regions and boundaries is stored in the storage circuits 410, and serve as one input to the comparitor 412 (FIG. 13). The comparitor 412 also receives the location output 432 from the navigational receiver 406. The comparitor 412 compares the location of the remote unit 402 with the defined geographical region and defines a relationship between the location and the defined region which is expressed as a positional status. The comparitor 412 also receives an input from the second storage circuits 414. These circuits store information defining a predetermined positional status.

Some examples will be useful in explaining how the positional status is used. Referring to FIG. 14, remote unit locations 494 and 496 are illustrated as dots, one location 494 being above the boundary 456, the other location 496 being below the boundary.

For the first example, assume that the location 494 is "within a defined geographical region," and that the location 496 is "outside the defined geographical region." Assume also that the predetermined positional status is that "locations within the defined region are acceptable." Next assume that the navigational receiver 406 reports the location 494 for the remote unit. Then the comparitor 412 will define a positional status that "the location of the remote unit relative to the defined region is acceptable." This positional status will be transmitted to the base station 404 and will not result in activation of the alarm 430.

For the next example, assume that the navigational receiver 406 reports the location of the remote unit to be the location 496, and that the other assumptions remain the same. Then the comparitor 412 will define a positional status that "the location of the remote unit relative to the defined region is not acceptable." This positional status will be transmitted to the base station 404 and will result in activation of the alarm 430.

For the next example refer to FIG. 16 which includes three successive locations 498, 500 and 502, shown linked by a broken line, as for example by movement of the remote unit 402 from location 498 to location 500 to location 502. Assume that the area outside the boundary 488 defines an "acceptable" subregion. Assume further that the area between the boundaries 488 and 486 defines a "warning" subregion. Also assume that the area 482 inside the boundary 486 defines a "prohibited" subregion. Finally, assume that the navigational receiver 406 provides three successive locations 498, 500 and 502.

In a preferred embodiment, and given these assumptions in the preceding paragraph, the comparitor 412 will determine that the location 498 is acceptable and will take no further action. The comparitor 412 will determine that the location 500 is within the warning subregion 484 and will activate the remote unit alarm 416 to warn the person whose movements are being monitored that he has entered a warning zone. When the remote unit 402 arrives at the location 502, the comparitor 412 will determine that the remote unit has entered a prohibited zone and will activate the mild electric shock circuit 418 which makes contact with the skin of the monitored person through the electrical contacts 420, 422. The positional status reported by the remote unit 402 for the successive locations 498, 500 and 502 is "acceptable," "warning given," and "enforcement necessary," respectively.

In another embodiment, no enforcement or warning are given by the remote unit 402. Instead, as when used to monitor the movements of children or elderly patients, the positional status is transmitted to the base station 404. There it is compared with a stored predetermined positional status and used to set an alarm 430 if the positional status is not acceptable. The predetermined positional status is stored in storage circuits 428 and the comparison is made by the comparitor 426.

The preferred embodiment for the storage and comparison circuits is the use of an embedded microprocessor.

Figure 17:
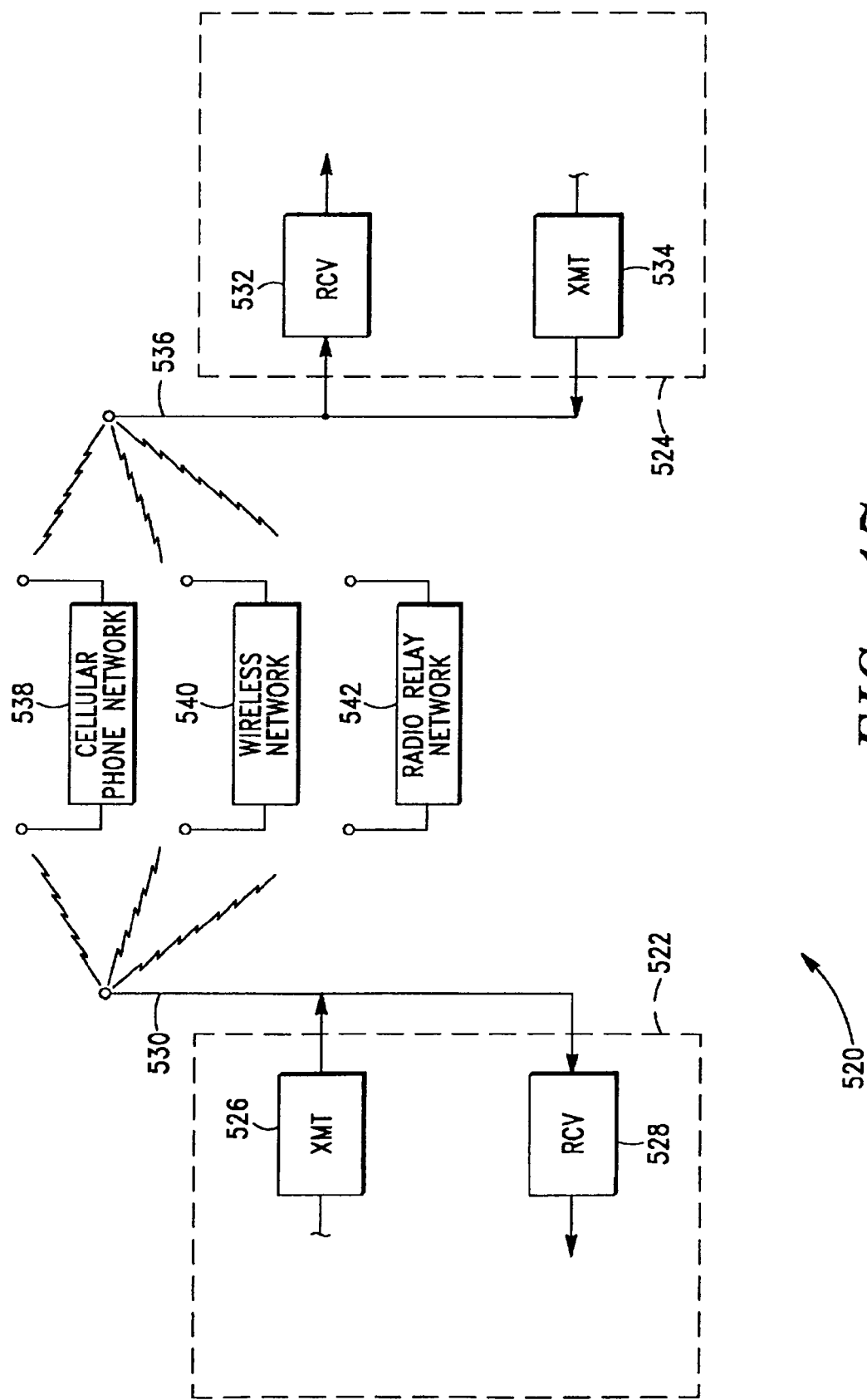
FIG. 17 is a block diagram illustrating another aspect of the invisible fence system.

FIG. 17 is a block diagram illustrating a personal alarm system such as the invisible fence of FIG. 13, and designated generally by the numeral 520. Personal alarm system 520 includes a remote unit 522 and a base station 524.

The remote unit 522 includes a radio transmitter 526 and a radio receiver 528 connected to a shared antenna 530. The base station 524 includes a radio receiver 532 and a radio transmitter 534 connected to a shared antenna 536 and defining a two-way communication link with the remote unit 522.

In one preferred embodiment, the communication link is direct between the respective transmitters 526, 534 and the corresponding receivers 528, 532. Other embodiments include access to existing commercial and private communications networks for completing the communication link between the remote unit 522 and the base station 524. Typical networks include a cellular telephone network 538, a wireless communications network 540, and a radio relay network 542.

Figure 18:
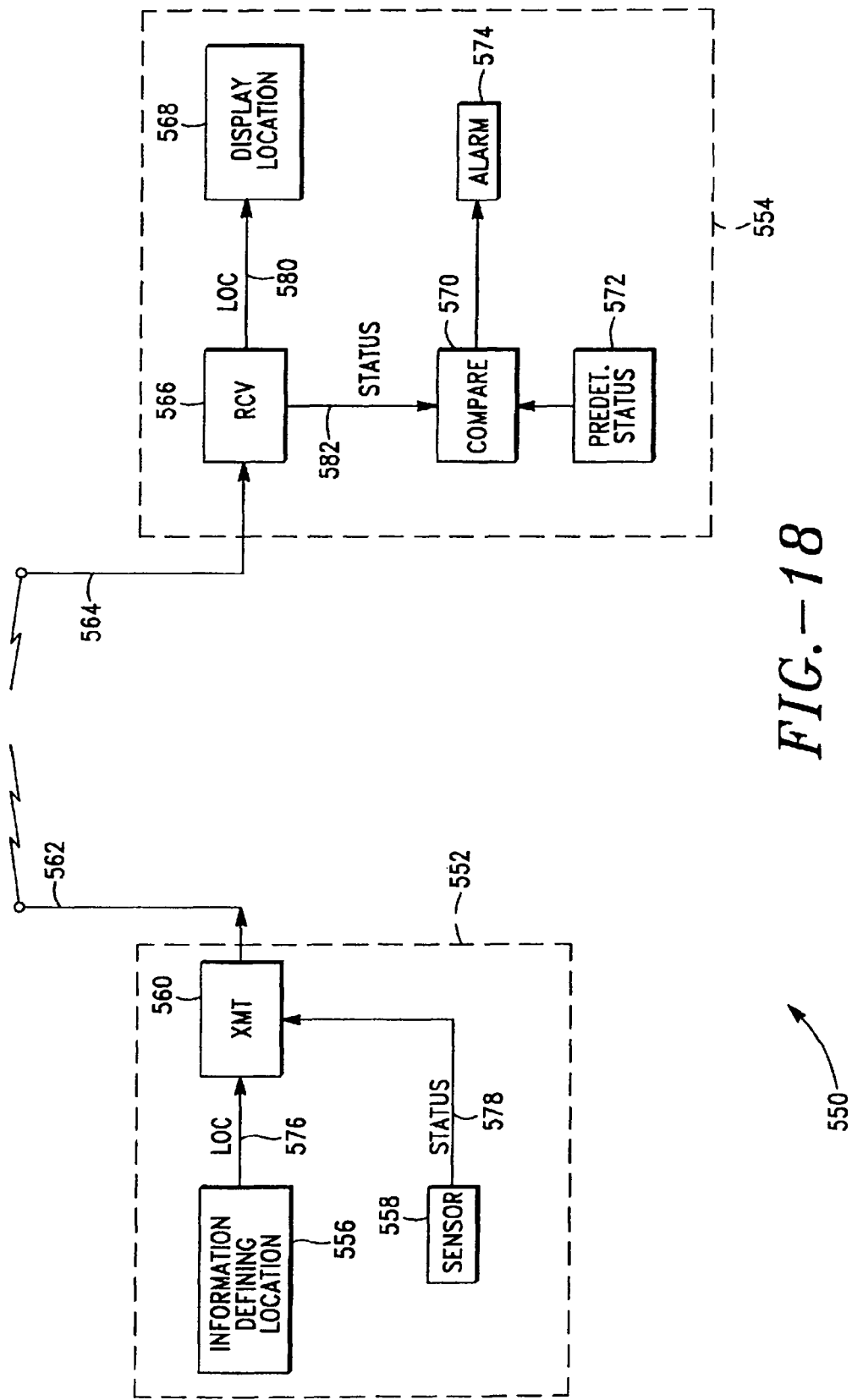
FIG. 18 is a block diagram showing a fixed-location environmental sensing system according to another aspect of the present invention.

FIG. 18 is a block diagram showing an environmental monitoring system for use in fixed locations, designated generally by the numeral 550. The environmental monitoring system 550 includes a remote unit 552 and a base station 554.

The remote unit 552 includes storage circuits 556 for storing information defining the location of the remote unit 552, at least one sensor 558, a radio transmitter 560, and an antenna 562.

The base station 554 includes an antenna 564, a radio receiver 566, a display 568 for displaying the location of the remote unit 552, a comparitor 570, storage circuits 572 for storing information defining a predetermined sensor status, and an alarm 574.

The environmental monitoring system 550 is useful for applications in which the remote unit 552 remains in a fixed location which can be loaded into the storage circuits 556 when the remote unit 552 is activated. Such applications would include use in forests for fire perimeter monitoring in which the sensor 558 was a heat sensor, or in monitoring for oil spills when attached to a fixed buoy and the sensor 558 detecting oil. Other useful applications include any application in which the location is known at the time of activation and in which some physical parameter is to be measured or detected, such as smoke, motion, and mechanical stress. The environmental monitoring system 550 offers an alternative to pre-assigned remote unit ID numbers, such as those used in the systems illustrated in FIGS. 2 and 3.

The storage circuits 556 provide an output 576 defining the location of the remote unit 552. This output is connected to the radio transmitter 560 for communication with the base station 554. The sensor 558 provides an output signal 578 defining a sensor status. The output signal is connected to the radio transmitter 560 for communication of the sensor status to the base station 554.

The communications are received by the base station's radio receiver 566 which provides outputs representing both the location 580 of the remote unit 552 and the sensor status 582. The location 580 is connected to the display 568 so that the location of the remote unit 552 can be displayed. The comparitor 570 receives the sensor status 582 and the information defining the predetermined sensor status which is stored in the storage circuits 572. If the comparitor 570 determines that the sensor status indicates an alarm situation, it activates the alarm 574 to alert a base station operator.

Figure 19:
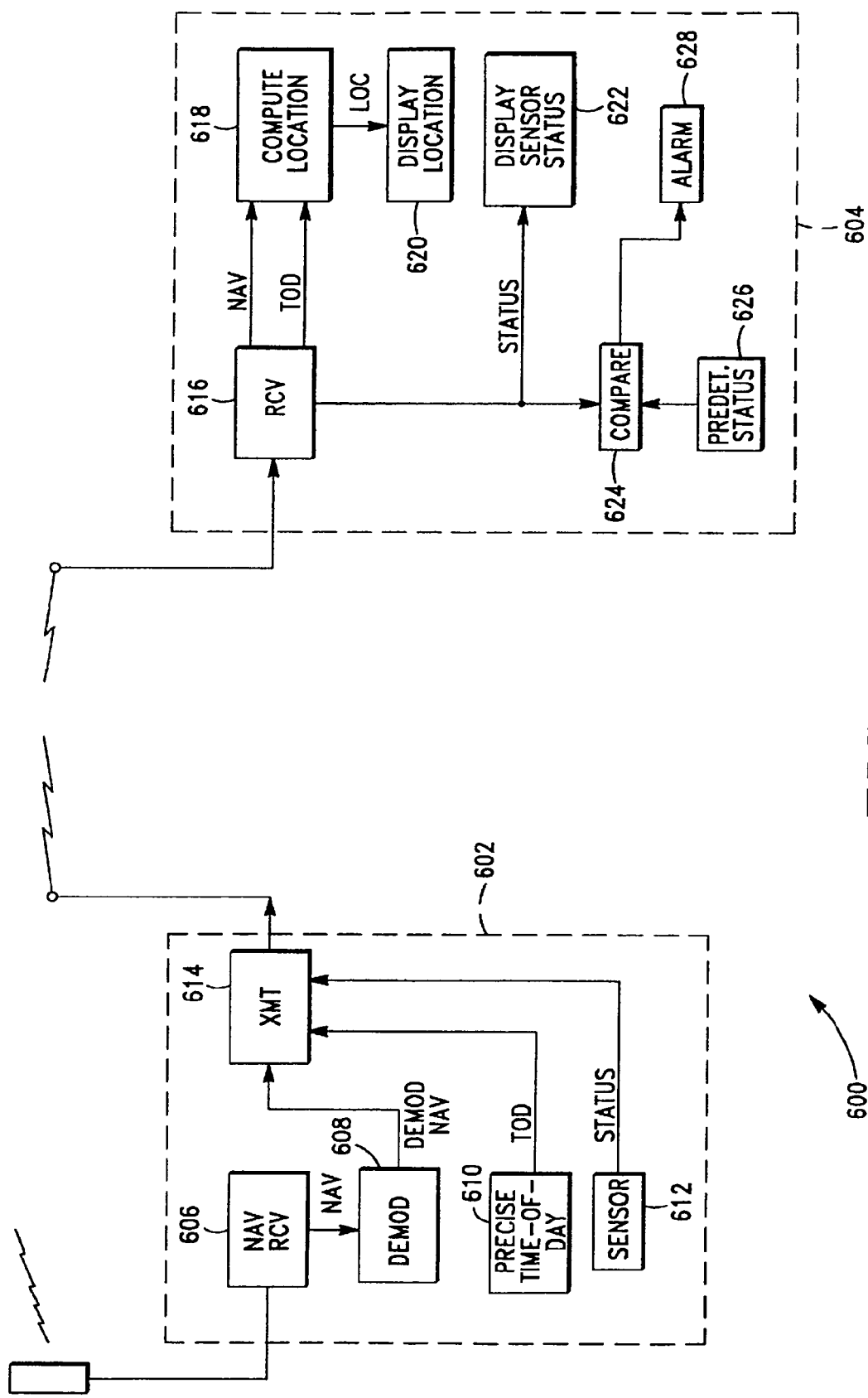
FIG. 19 is a block diagram of a personal alarm system including navigational location in which the geometric dilution of precision calculations are done at the base station.

FIG. 19 is a block diagram which illustrates an alternative embodiment of a personal alarm system in which the remote unit transmits demodulated navigational and precise time-of-day information to the base station, and the base station uses that information to compute the location of the remote unit. This alternative embodiment is designated generally by the numeral 600 and includes a remote unit 602 and a base station 604.

The remote unit 602 includes a navigational receiver 606, a demodulator circuit 608, a precise time-of-day circuit 610, a sensor 612, and a radio transmitter 614.

The base station 604 includes a radio receiver 616, computational circuits 618 for computing the location of the remote unit 602, a display 620 for displaying the computed location, a second display (can be part of the first display) 622 for displaying a sensor status, a comparitor 624, storage circuits 626 for storing information defining a predetermined sensor status, and an alarm 628.

In a preferred embodiment, the navigational receiver 606 receives navigational information from global positioning system satellites (not shown). In this embodiment, the raw navigational information is demodulated by the demodulator circuit 608 and the output of the demodulator 608 is connected to the radio transmitter 614 for communication to the base station 604.

The precise time-of-day circuits 610 provide the time-of-day information needed to compute the actual location of the remote unit based upon the demodulated navigational information. In the case of GPS navigational information, geometric dilution of precision computations are done at the base station 604 to derive the actual location of the remote unit 602.

The sensor 612 provides an output signal defining a sensor status. The demodulated navigational information, the precise time-of-day information and the sensor status are all connected to the radio transmitter 614 for communication to the base station 604.

At the base station 604, the radio receiver 616 provides the navigational and precise time-of-day information to the computation circuits 618 for determining the actual location. In a preferred embodiment, the computation is made using an embedded microprocessor. The computed location is displayed using the display 620.

The radio receiver 616 also provides the received sensor status which forms one input to the comparitor 624. Stored information defining a predetermined sensor status is provides by the storage circuits 626 as a second input to the comparitor 624. If the received sensor status and the stored sensor status do not agree, the comparitor 624 activates the alarm 628 to alert the base station operator.

Figure 20:
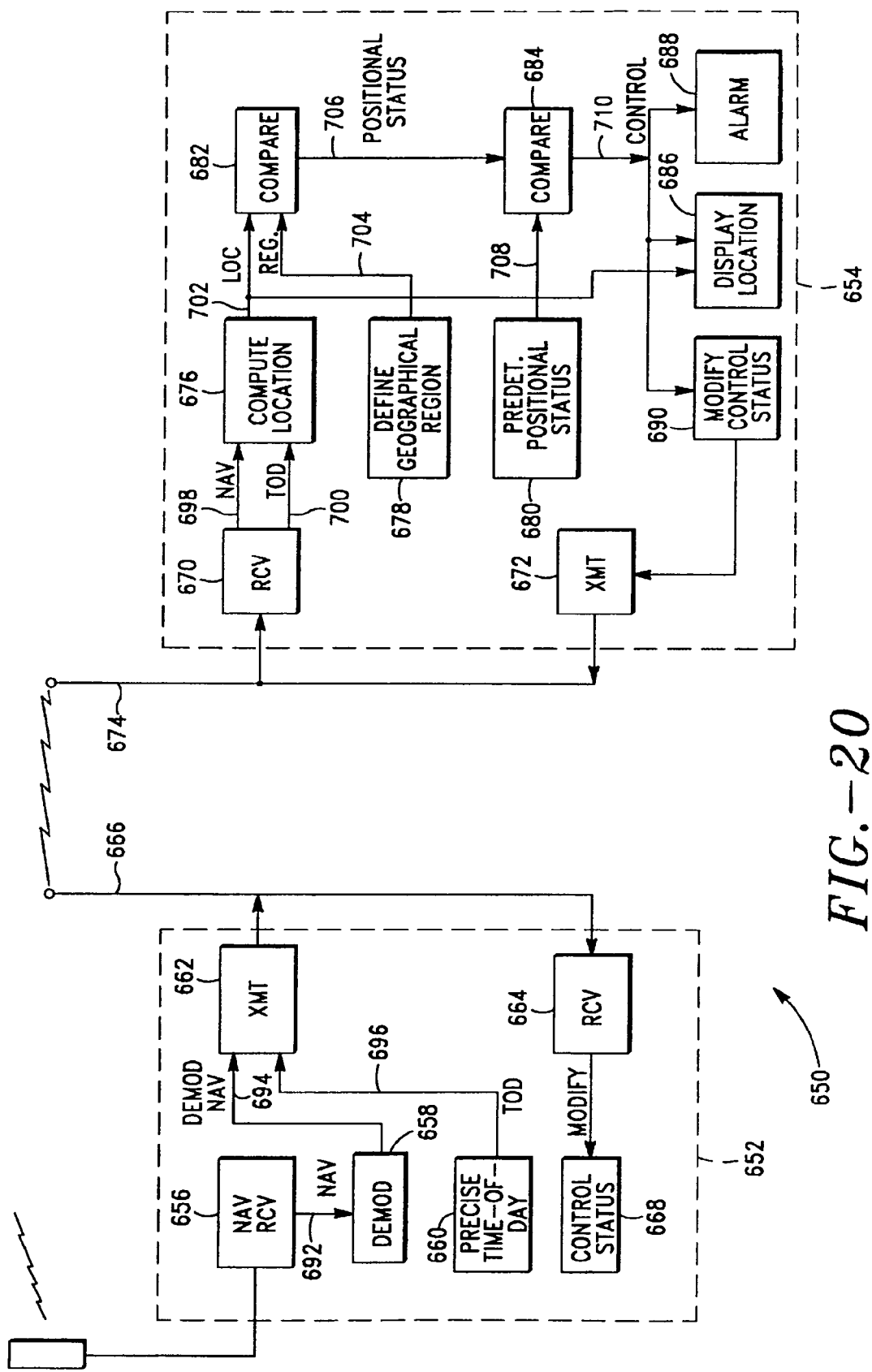
FIG. 20 is a block diagram showing an invisible fence alarm system in which the fence is stored and compared at the base station.

FIG. 20 is a block diagram which illustrates an alternative embodiment of the invisible fence system in which the base station computes the location of the remote unit, and in which the fence definitions are stored at the base station rather than in the remote unit. The alternative system is designated generally by the numeral 650 and includes a remote unit 652 and a base station 654.

The remote unit 652 includes a navigational receiver 656, a demodulator circuit 658, a precise time-of-day circuit 660, a radio transmitter 662, a radio receiver 664, a shared antenna 666, and control status circuits 668.

The base station 654 includes a radio receiver 670, a radio transmitter 672, a shared antenna 674, computation circuits 676, storage circuits 678, second storage circuits 680, a first comparitor 682, a second comparitor 684, a display 686, an alarm 688, and control circuits 690.

The navigational receiver 656 provides raw navigational information 692 to the demodulator circuit 658. The demodulator circuit 658 demodulates the raw navigational information and provides demodulated navigational information 694 to the radio transmitter 662 for communication to the base station 654. The precise time-of-day circuit 660 provides time-of-day information 696 to the radio transmitter 662 for communication to the base station 654.

The base station radio receiver 670 provides received navigational information 698 and received time-of-day information 700 to the computation circuits 676 for conversion to an actual location 702 of the remote unit 652. The storage circuits 678 store information defining a geographical region.

The first comparitor 682 receives the location 702 and the region defining information 704 and provides a positional status 706, as described above with respect to FIGS. 13-16.

The second storage circuits 680 store information 708 defining a predetermined positional status. The second comparitor 684 receives the positional status 706 and the predetermined positional status 708 and provides control output signals 710 based upon the results of the positional status comparison. When the location 702 is within a defined "warning" or "restricted" zone, the second comparitor 684 activates the alarm 688 and causes the location 702 to be displayed by the display 686.

In one preferred embodiment, the remote unit includes circuits 668 which provide a means by which the base station 654 can warn the remote unit user or enforce a restriction, as for example, by applying the mild electric shock of the embodiment shown in FIG. 13. The second comparitor 684 uses a control signal 710 to activate the control circuits 690 to send a command via the radio transmitter 672 to the remote unit 652 for modifying the remote unit control status. For example, if the remote unit location is within a restricted zone, the base station 654 will command the remote unit 652 to provide an electric shock to enforce the restriction.

Figure 21:
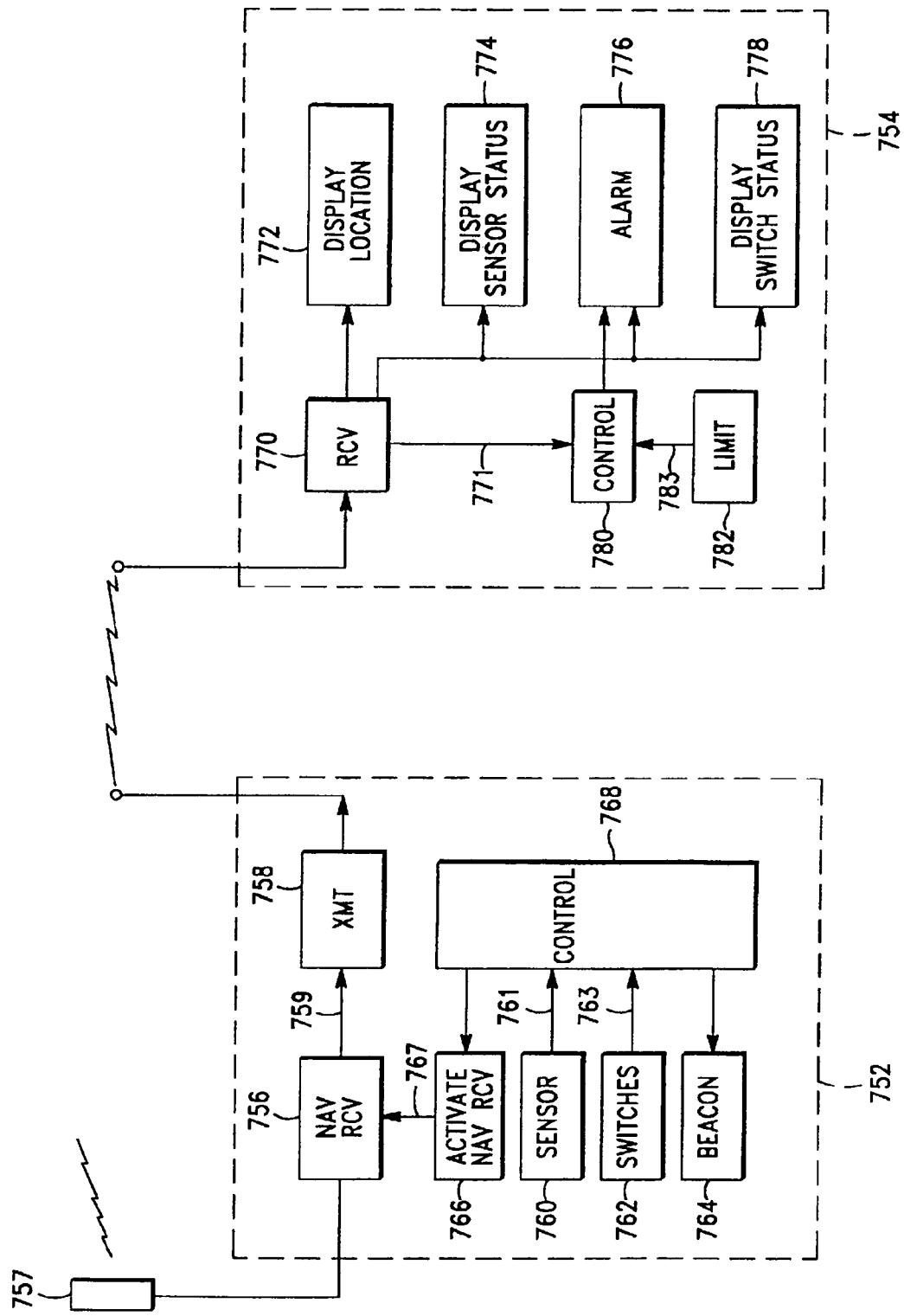
FIG. 21 is a block diagram illustrating a man-over-board alarm system.

FIG. 21 is a block diagram illustrating another embodiment of a man-over-board alarm system, designated generally by the numeral 750. The man-over-board alarm system 750 includes a remote unit 752 and a base station 754.

The remote unit 752 includes a navigational receiver 756, a radio transmitter 758, an environmental sensor 760, at least one manually operated switch 762, a beacon 764, a circuit 766 for activating the navigational receiver 756, and a control circuit 768.

The base station 754 includes a radio receiver 770, a remote-unit location display 772, a sensor status display 774, an alarm 776, a switch status display 778, a control circuit 780, and storage 782 for a predetermined limit value.

The navigational receiver 756 receives navigational information via an antenna 757 and provides a location 759 of the remote unit to the radio transmitter 758 for transmitting the remote unit location 759. The navigational receiver 756 has a normal operational mode and a low-power standby mode. In a preferred embodiment, the navigational receiver 756 is normally in the low-power standby mode, thereby conserving operating power which is normally supplied by batteries.

The circuit 766 is responsive to the control circuit 768 for selecting the operational mode and thereby "activating" the navigational receiver. In a specific embodiment, the control circuit 768 is responsive to a hazard sensor 760, such as a water-immersion sensor, for controlling the circuit 766 to activate the navigational receiver 756. In another embodiment, the control circuit 768 is responsive to a manually operated switch 762, such as a manually operated panic button, for activating the navigational receiver 756.

In a specific embodiment, the sensor 760 provides an output signal 761, and defines a sensor status. The manually operated switch 762 provides an output signal 763, and defines a switch status. The control circuit 768 receives the sensor output signal 761 and the switch output signal 763, and connects each to the radio transmitter 758 for communication of the sensor status and the switch status to the base station 754.

In another specific embodiment, the control circuit 768 is connected for activating the remote unit beacon 764 in response to a change in the sensor status 761. In another embodiment, the control circuit 768 activates the beacon 764 in response to a change in the switch status 763. In one embodiment, the beacon 764 is a visual beacon, such as a flashing light. In another embodiment, the beacon 764 is an audible beacon which emits a periodic sound. The beacon 764 aids searchers in locating a man-over-board.

In a specific embodiment, the control circuit 768 is implemented using a programmed micro-processor. In another specific embodiment, the control circuit 768 is implemented using an imbedded, programmed micro-processor. In another embodiment, the control circuit 768 is implemented using a programmed micro-controller.

The base-station radio receiver 770 receives the remote unit location 759, the sensor status, and the switch status. The radio receiver 770 is connected to the display 772 for displaying the received remote unit location, is connected to the display 774 for displaying the received sensor status, and is connected to the display 778 for displaying the switch status. In a specific embodiment, the radio receiver 770 is connected to the alarm 776 which is activated by a change in the sensor status, such as the detection of immersion in water. In another specific embodiment, the alarm is activated by a change in the switch status, such as a manual operation of the panic button.

The radio receiver 770 provides a signal 771 corresponding to a field strength of a received radio communication. The control circuit 780 compares the received field strength 771 with a predetermined limit value 783 provided by circuit 782. The control circuit 780 is connected to activate the alarm 776 when the received field strength is less than the predetermined limit value 783. The received field strength 771, the control circuit 780, and the predetermined limit value 783 define a separation distance between the remote unit 752 and the base station 754, as discussed above with respect to other embodiments of the invention.

In a specific embodiment, the control circuit 780 and the circuit 782 for providing the predetermined limit value 783 are implemented using a programmed micro-controller. In another specific embodiment, the circuit 780 and the circuit 782 are implemented using an embedded, programmed micro-controller. The functions performed by the circuits 780 and 782 are performed in different embodiments alternatively by discrete integrated circuits, by a programmed micro-controller, by an embedded, programmed micro-controller, by a programmed micro-processor, and by an embedded, programmed micro-processor.

In a specific embodiment of the man-over-board alarm system illustrated in FIG. 21, the sensor 760 includes a plurality of environmental, physiological and hazard sensors providing output signals and defining a sensor status vector. In another specific embodiment, the sensor 760 provides a plurality of output signals 761 defining another status vector. In another specific embodiment, the sensor 760 provides an analog output signal 761, and the control circuit 768 converts the analog signal 761 for radio transmission as a sensor status vector. The base station 754 displays the sensor status vector using the display 774.

In another specific embodiment of the man-over-board alarm system illustrated in FIG. 21, the manually operated switch 762 includes a plurality of manually operated switches providing multiple output signals 763. The multiple output signals 763 define a switch status vector which is connected to the control circuit 768 for radio transmission to the base station 754. The base station 754 displays the switch status vector using the display 778. In a specific embodiment, the remote unit manually operated switches 762 define a numeric keypad, and the base station 754 displays a manual entry made using the numeric keypad. In another specific embodiment, the manually operated switches 762 define an alpha numeric keypad, and the base station 754 displays manually entered alpha numeric information.

Figure 22:
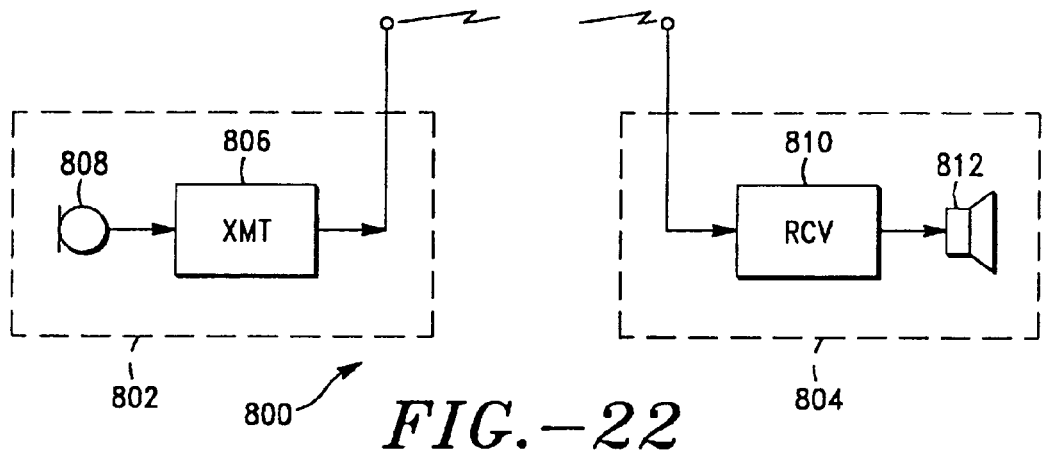
FIG. 22 is a partial block diagram illustrating a one-way voice channel on a man-over-board alarm system.

FIG. 22 is a partial block diagram of the man-over-board alarm system illustrated in FIG. 21, and designated generally by the numeral 800. The alarm system 800 includes a remote unit 802 and a base station 804. The remote unit 802 includes a radio transmitter 806 and a microphone 808. The base station 804 includes a radio receiver 810 and a speaker 812. In this embodiment of the alarm system 800, the microphone 808 is connected to the transmitter 806 for defining a one-way voice radio communication channel with the base station receiver 810 and speaker 812. In a specific embodiment, the radio transmitter 806 is also used to transmit the remote unit location, the sensor status vector, and the switch status vector as discussed above with respect to FIG. 21. In another specific embodiment, the radio receiver 810 is also used to receive the remote unit location, the sensor status vector, the switch status vector, and to provide the received signal strength signal.

Figure 23:
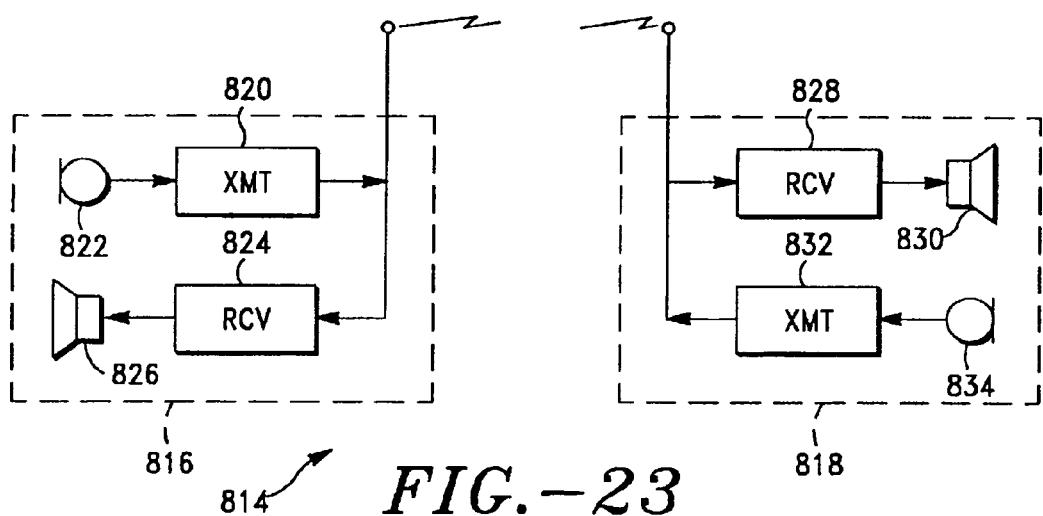
FIG. 23 is a partial block diagram illustrating a two-way voice channel on a man-over-board alarm system.

FIG. 23 is also a partial block diagram of the man-over-board alarm system shown in FIG. 21. The alarm system is designated generally by the numeral 814. The alarm system 814 includes a remote unit 816 and a base station 818. The remote unit 816 includes a radio transmitter 820, a microphone 822, a radio receiver 824 and a speaker 826. The base station 818 includes a radio receiver 828, a speaker 830, a radio transmitter 832 and a microphone 834. These elements are configured to provide a two-way voice communication channel between the remote unit 816 and the base station 818. In a specific embodiment, the radio transmitter 820 and radio receiver 828 are also used to communicate the remote unit location, the sensor status vector, and the switch status vector. In another specific embodiment, the radio receiver 828 also provides a received signal strength signal.

Figure 24:
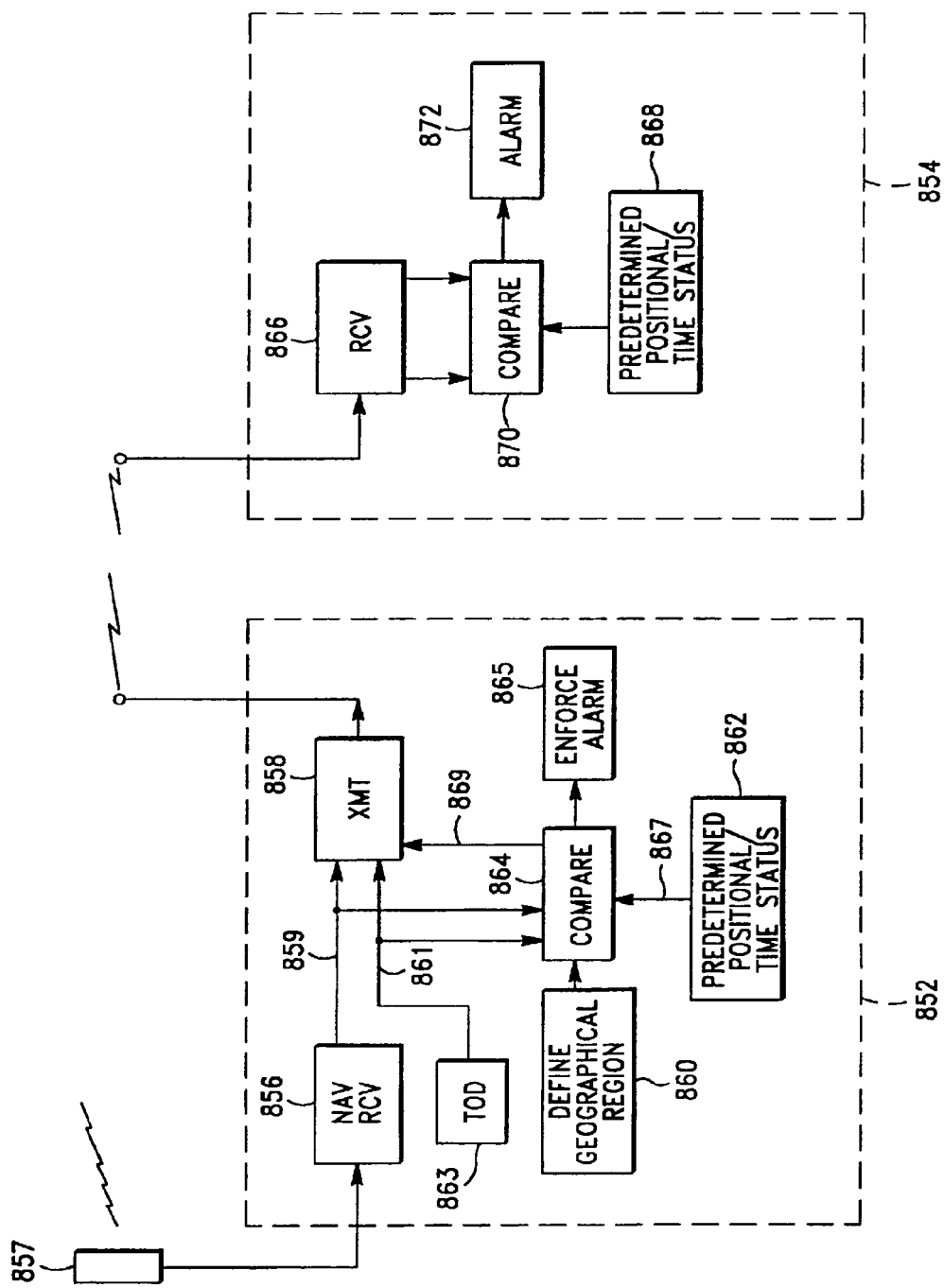
FIG. 24 is a block diagram illustrating an invisible fence system.

FIG. 24 is a block diagram illustrating another embodiment of an invisible fence system, designated generally by the numeral 850. The invisible fence system 850 includes a remote unit 852 and a base station 854.

The remote unit 852 includes a navigational receiver 856, a radio transmitter 858, a memory 860 for storing information defining a geographic region, a memory 862 for storing information defining a predetermined positional and time status, a circuit 863 for providing time-of-day information, a comparison circuit 864, and an enforcement and alarm circuit 865.

The base station 854 includes a radio receiver 866, a memory 868 for storing a predetermined positional and time status, a comparison circuit 870 and an alarm 872.

The invisible fence system illustrated in FIG. 24 differs from the embodiment of FIG. 13 by providing an alarm and enforcement based upon both time and location. The embodiment of FIG. 24 allows the defining of zones of inclusion, and alternatively zones of exclusion, which are defined in terms of location and time-of-day. For example, a parolee equipped with the remote unit 852 may be confined to, and alternatively excluded from, a defined region between the hours of 6 PM and 6 AM. If the parolee leaves the region of confinement, or enters the region of exclusion, between those two time limits, a radio transmission activates the alarm 872 at the base station 854, and simultaneously activates an alarm and enforcement process 865 at the remote unit 852. In a specific embodiment, the parolee is first warned that he has left a region of confinement at an unallowed time. If the violation continues, the parolee is given a mild electrical shock. If the violation continues, the intensity of the electrical shock is increased. The authorities are put on notice by the base station alarm 872 that the parolee has violated his defined restrictions.

FIG. 25 is a pictorial diagram illustrating boundaries used to define geographical regions such as those used in a preferred embodiment of the invisible fence system 850. FIG. 25 shows a portion 1000 of a city, including cross streets (not numbered) and a closed boundary made up of intersecting line segments 1006, 1008, 1010 and 1012. The boundary divides the city map 1000 into two subregions, one subregion defining an area 1002 wholly within the boundary, and the other subregion defining an area 1004 outside the boundary.

In a specific embodiment of an invisible fence system, such as that illustrated in FIG. 24, a memory 860 stores information defining a geographical region, for example the region 1002. In an example of the operation of the specific embodiment, assume the region 1002 represents a specific city block, surrounded by the city streets 1006, 1008, 1010 and 1012. Further assume that a parolee is wearing the remote unit 852, and that the parolee is required by the terms of his parole to remain within the city block 1002 between the hours of 8 PM and 7 AM, and that at all other times the parolee is permitted to be outside the region 1002.

FIG. 26 is a table defining a relationship between the location of the remote unit 852 (FIG. 24) and the time-of-day for use in understanding a curfew feature of a specific embodiment of the invisible fence system 850. Each row of the table represents a different location, and each column of the table represents a subdivision of the time-of-day. The relationship defined by the table represents an example of a curfew requiring the parolee (in the preceding example) to remain at home, i.e., within the city block 1002, between 8 PM and 7 AM. If the parolee leaves home during the interval from 8 PM to 7 AM, an alarm 872 is activated at the base station 854. The information represented by the table is stored in a memory 862 in the remote unit 852, and is referred to as a 'predetermined positional and time status.'

With respect to the specific embodiment illustrated in FIG. 24, the memory 860 stores information defining the geographical region 1002 (FIG. 25). The comparison circuit 864 receives the remote unit location 859, the time-of-day 861, the information defining the geographical region 1002, and the curfew defining information 867. The comparison circuit 864 compares the named items of information and provides a positional and time status 869 to the radio transmitter 858 for communication to the base station 854. In another embodiment of the invisible fence system 850, the transmitter 858 periodically transmits the remote unit location 859 and time-of-day 861. This information is received at the base station 854 where the predetermined positional and time status is stored in a memory 868. The base station 854 makes an independent determination of whether or not the curfew is violated. The positional and time status is compared by circuit 870 with the received location and time-of-day information. An alarm 872 is given if the remote unit violates the established curfew.

Figure 27:
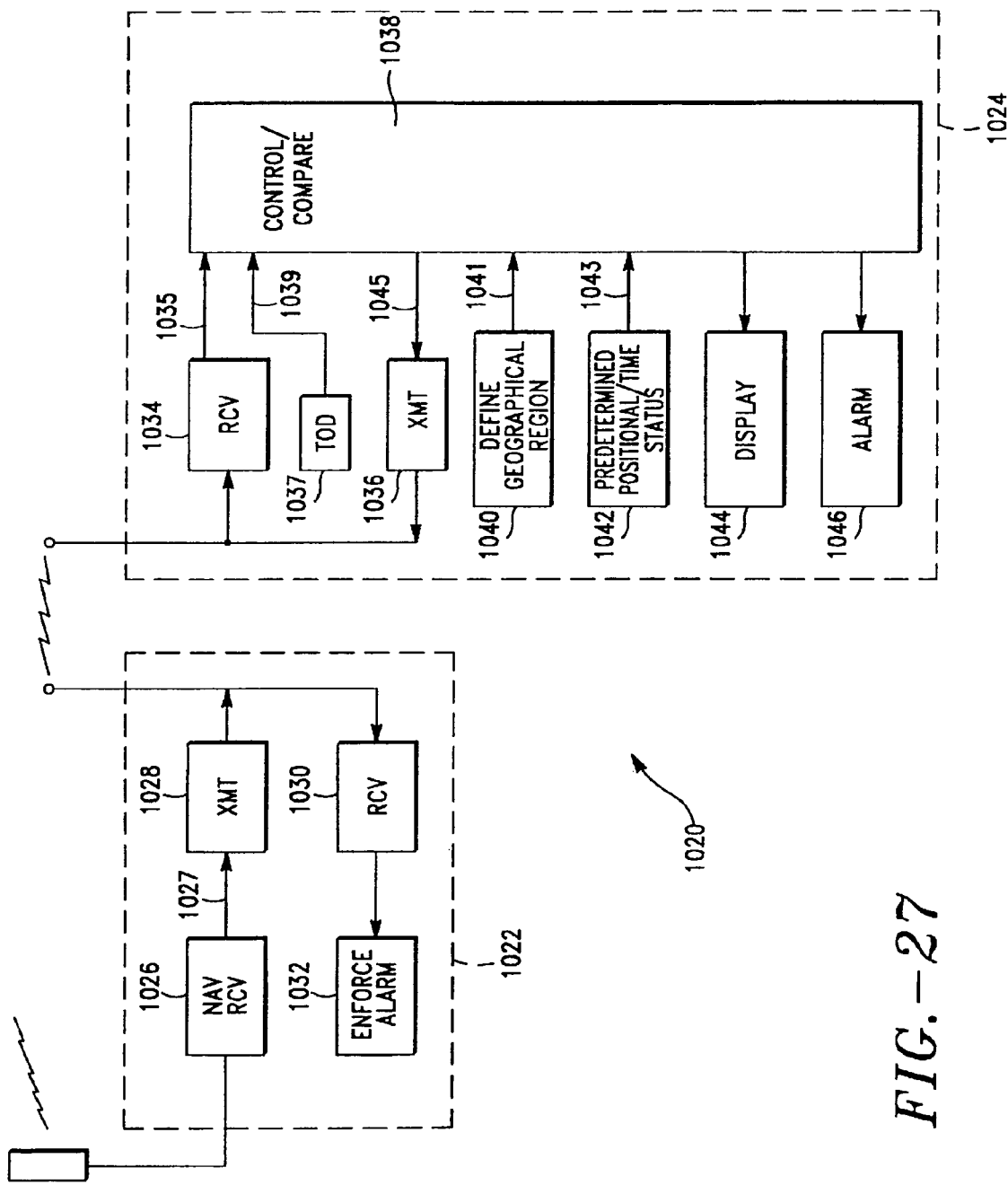
FIG. 27 is a block diagram illustrating another embodiment of an invisible fence system.

FIG. 27 is a block diagram illustrating another embodiment of an invisible fence system, designated generally by the numeral 1020. The invisible fence system 1020 includes a remote unit 1022 and a base station 1024. The remote unit 1022 includes a navigational receiver 1026, a radio transmitter 1028, a radio receiver 1030 and an enforcement and alarm circuit 1032. The base station 1024 includes a radio receiver 1034, a radio transmitter 1036, a memory 1040 for storing information defining a geographical region, a memory 1042 for storing information defining a predetermined positional and time status, a display 1044 and an alarm 1046.

The navigational receiver 1026 provides information 1027 defining a location of the remote unit 1022, and is connected to the remote unit radio transmitter 1028 for communicating the remote unit location to the base station 1024. The transmitted remote unit location is received by the base station radio receiver 1034 and provided on line 1035 to the control/compare circuit 1038. The base station includes a circuit 1037 for providing time-of-day information 1039 to the control/compare circuit 1038.

In a specific embodiment, the control/compare circuit 1038 is implemented as part of a programmed, imbedded micro-processor/micro-controller. A memory of the imbedded micro-processor provides the memory 1040 for storage of information 1041 defining a geographical region, and the memory 1042 for storage of information 1043 defining a predetermined positional and time status. The imbedded micro-processor implementation of the control/compare circuit 1038 receives the remote unit location 1035, the time-of-day 1039, the information 1041 defining a geographical region, and the information 1043 defining a predetermined positional and time status.

In the previous example, the defined geographical region corresponded to the region 1002 (FIG. 25), and the predetermined positional and time status corresponded to the relationship defined by the table in FIG. 26. The parolee was required to be within the region 1002 between the hours of 8 PM and 7 AM. The compare/control circuit 1038 compares the received information described above and determines whether the parolee is in violation of the defined curfew. The parolee is in violation of the curfew defined by the table in FIG. 26 when he is outside his home between the hours of 8 PM and 7 AM. In this example, the region 1002 (FIG. 25) corresponds to the parolee's home. Locations outside region 1002 are therefore outside his home. In this example, if the parolee is in violation of the curfew, the control/compare circuit 1038 generates a signal 1045, connected to the base station radio transmitter 1036 for activating an alarm/enforcement device 1032 at the remote unit 1022. Such a device and an alarm/enforcement protocol have been described above with respect to FIGS. 13 and 16.

In a specific embodiment of the invisible fence system shown in FIG. 27, the location of the remote unit is displayed 1044 at the base station 1024. In one embodiment, the control/compare circuit 1038 continuously displays the remote unit location. In another embodiment, the control/compare circuit 1038 provides and alarm 1046 and displays the remote unit location when the parolee has violated the curfew.

In a specific embodiment of the invisible fence system of FIG. 27, the time-o-day circuit 1037 is implemented as part of the imbedded micro-processor. When several remote units are transmitting their locations from different time zones, the base station time-of-day is adjusted at the base station to use the correct time-of-day for each transmitting remote unit. For a curfew type process, it is not necessary generally to use a precise time-of-day. However, when a precise time-of-day is required, the remote unit transmitter is connected to receive both a location and a precise time-of-day from the navigational receiver, or other precise time-of-day circuit, for transmission to the base station. Such arrangements are illustrated in FIGS. 19, 20, 34 and 36.

Figure 28:
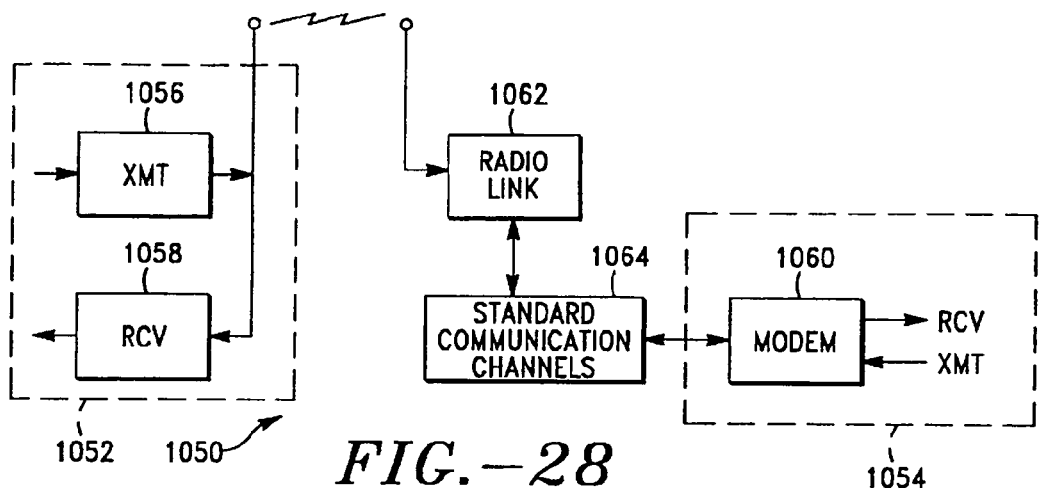
FIG. 28 is a partial block diagram illustrating a base station connected to a communication channel via a modem.

FIG. 28 is a partial block diagram illustrating an alarm system, designated generally by the numeral 1050. The alarm system 1050 includes a remote unit 1052 and a base station 1054 and is intended to be representative of many of the alarm systems in accordance with aspects of this invention. The remote unit 1052 includes a radio transmitter 1056 and a radio receiver 1058. The base station 1054 includes a modem 1060. Through its modem 1060, the base station 1054 is connected to a standard communications channel, designated 1064 and a two-way radio link 1062, permitting a two-way communication between the base station 1054 and the remote unit 1052.

Such an arrangement provides a radio link for communicating with the remote unit 1052 while not requiring the base station 1054 to include the necessary radio receiver and radio transmitter. In such a case, the base station includes a communications receiver and a communications transmitter which in one embodiment includes a radio communications facility and in another embodiment provides the modem capability. The modem 1060 permits the base station to be connected via standard land line communications, such as a commercial telephone network. Thus the standard communication channel 1064 includes a standard telephone network, communications satellites, relay type radio links and other common carrier technologies such as cellular telephone, wireless communications, and personal communications systems ("PCS").

FIG. 29 is a partial block diagram illustrating an alternative embodiment of the personal alarm system 80 as depicted in FIG. 3. Parts shown in FIG. 29 which correspond to parts shown in FIG. 3 have the same identification numerals.

FIG. 29 illustrates a radio transmitter 86, a circuit 90 for selecting a transmission power level for the transmitter 86. An oil/chemical sensor 113 is added to the hazard sensors 100.

Each sensor provides an output signal defining a sensor status. The sensor status of all sensors is connected via a line 111 to the transmitter 86 for transmission of the sensor status. The output of each sensor 100 is connected via line 117 to the selection circuit 90 for selecting a transmission power level. The transmitter 86 normally operates at a reduced power level to conserve battery power. When a hazard sensor 100 detects a hazardous condition, the line 117 communicates that fact to the circuit 90 which causes the transmitter 86 to transmit at a higher power level.

Figure 30:
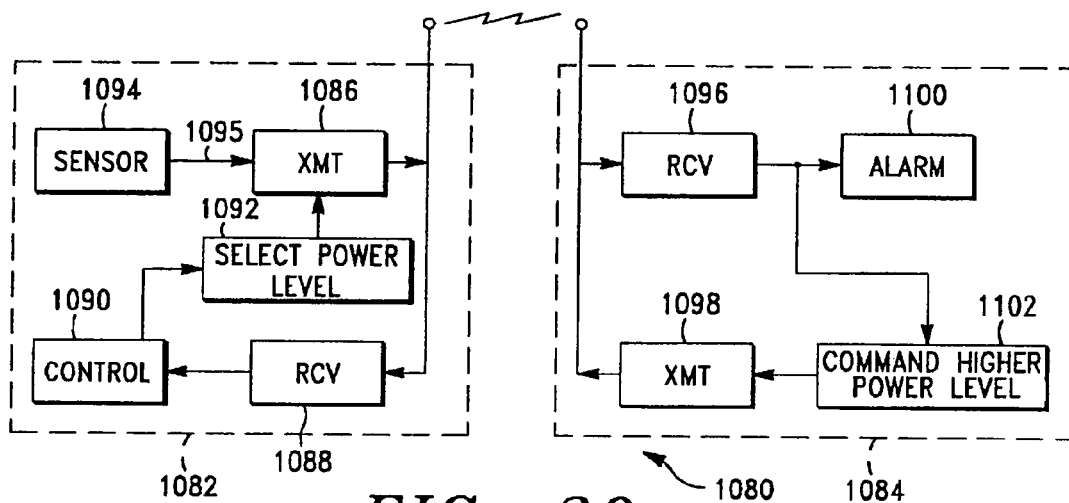
FIG. 30 is a block diagram illustrating another embodiment of a personal alarm system.

FIG. 30 is a block diagram illustrating a specific embodiment of a personal alarm system, designated generally by the numeral 1080, and including a remote unit 1082 and a base station 1084. The remote unit 1082 includes a radio transmitter 1086, a radio receiver 1088, a control circuit 1090, a transmission power level selection circuit 1092 and a sensor 1094. The base station 1084 includes a radio receiver 1096, a radio transmitter 1098, an alarm 1100 and a higher power level command circuit 1102.

FIG. 30 illustrates a system in which a sensor status 1095 is transmitted to the base station 1084 and generates an alarm 1100. The command circuit 1102 is responsive to the received sensor status and causes the base station transmitter 1098 to transmit a command to the remote unit 1082 causing the remote unit to transmit at a higher power level. The command is received by the remote unit receiver 1088 and is interpreted by the control circuit 1090 to select a higher power transmission level 1092.

Figure 31:
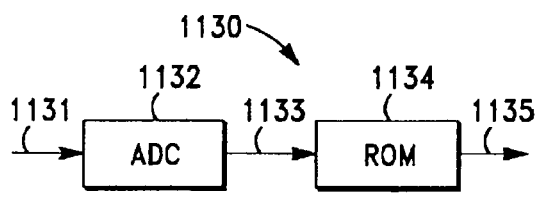
FIG. 31 is a partial block diagram illustrating specific circuits used to select a transmission power level.

FIG. 31 is a partial block diagram illustrating a circuit 1130 including an analog-to-digital converter 1132 and a read-only memory 1134. The analog-to-digital converter 1132 receives an analog input signal 1131 and provides digital output signals 1133. The digital output signals 1133 are connected to address input lines of the read-only-memory 1134. The read-only-memory provides digital output signals of stored information from an addressed memory location on output lines 1135.

The circuit shown in FIG. 31 is used to convert a received field strength signal such as signal 771 in the base station 754 of FIG. 21, to a predetermined digital output vector on lines 1135.

Figure 32:
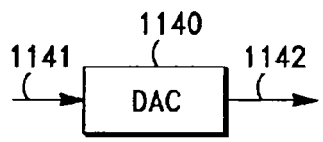
FIG. 32 is a partial block diagram illustrating other specific circuits used to select a transmission power level.

FIG. 32 is a partial block diagram illustrating a digital-to-analog converter 1140. The digital-to-analog converter 1140 receives digital input signals on lines 1141 and provides an analog output signal on line 1142.

Figure 33:
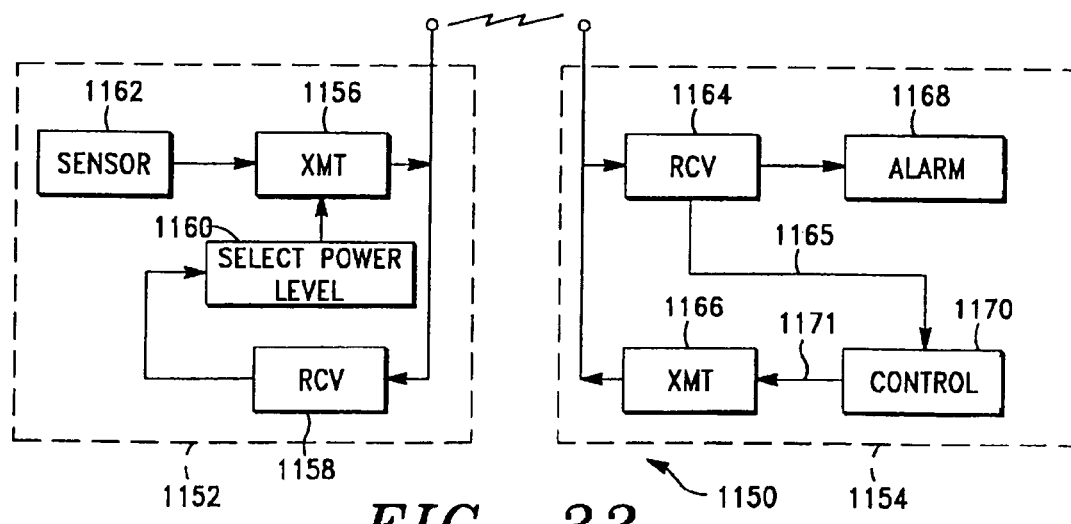
FIG. 33 is a block diagram illustrating a specific embodiment of a personal alarm system.

FIG. 33 is a block diagram illustrating an embodiment of a personal alarm system designated generally by the numeral 1150, and including a remote unit 1152 and a base station 1154. The remote unit 1152 includes a radio transmitter 1156, a radio receiver 1158, a circuit 1160 for selecting transmission power level and a sensor 1162. The base station 1154 includes a radio receiver 1164, a radio transmitter 1166, an alarm 1168 and a command control circuit 1170. The digital-to-analog converter illustrated in FIG. 32 is used in a specific embodiment of the circuit 1160 of FIG. 33 for selecting one of a plurality of transmission power levels, as commanded by the base station. The base station receiver 1164 provides a signal 1165 proportional to a received field strength. In a specific embodiment, the signal 1165 is an analog signal and is converted to a digital form using the conversion circuit 1130 of FIG. 31. The digital output signals 1135 are used by the command control circuit 1170 to generate a power-level command 1171 for transmission to the remote unit 1152. In one embodiment of the remote unit select power level circuit 1160, the received digital power-level command is used directly to control the power level of the remote unit transmitter 1156. In another embodiment, the received power-level command is converted to an analog signal which is used to control the power level of the remote unit transmitter 1156. In this manner, the alarm system is able to compensate for an increase in separation distance, low remote unit battery power or other conditions which cause the received signal strength 1165 to be reduced. The circuits are also able to command a reduction of the remote unit transmitting power level to conserve remote unit battery power.

Figure 34:
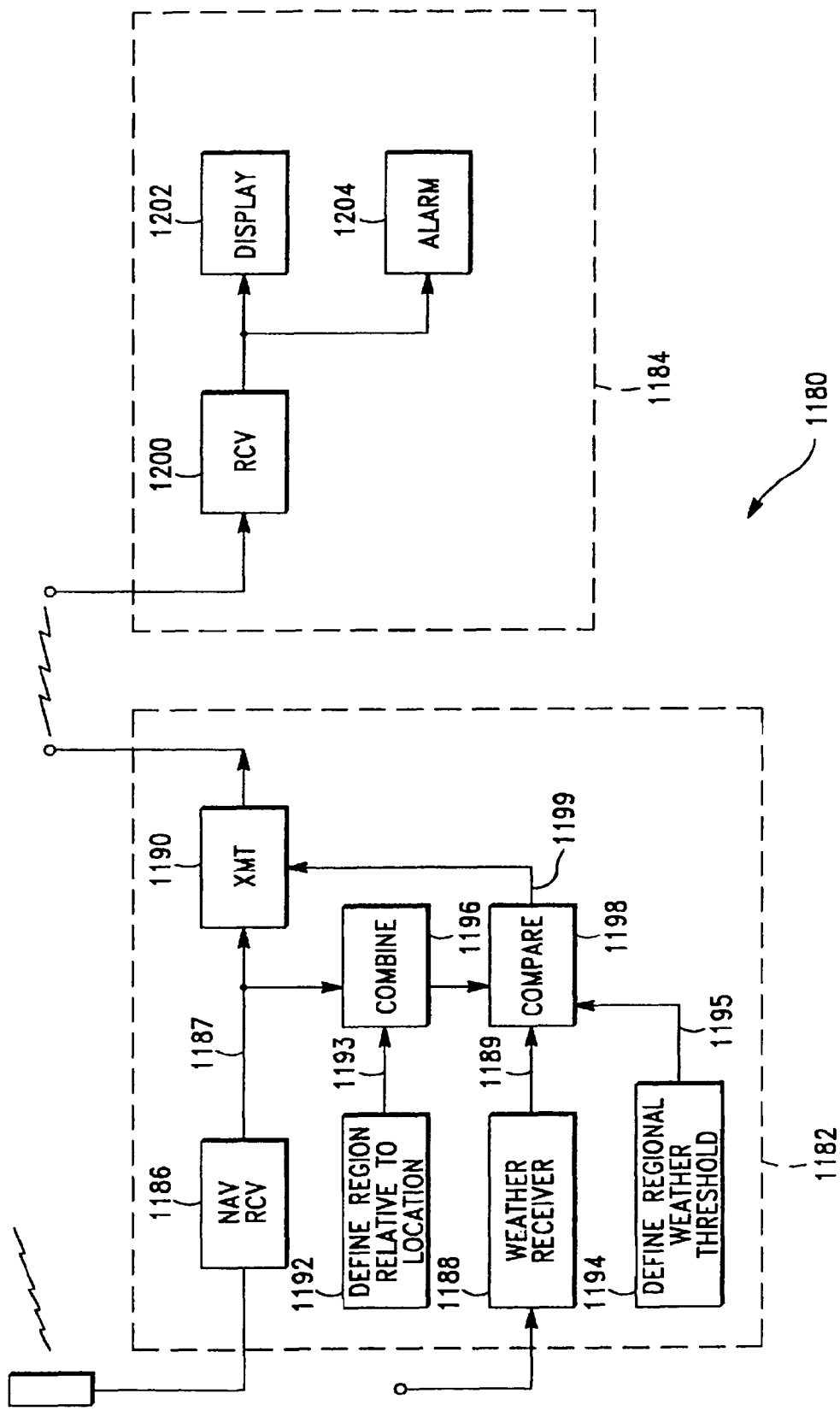
FIG. 34 is a block diagram illustrating a weather alarm system.

FIG. 34 is a block diagram illustrating a specific embodiment of a weather alarm system, designated generally by the numeral 1180. The weather alarm system 1180 includes a remote unit 1182 and a base station 1184.

The remote unit 1182 includes a navigational receiver 1186, a weather receiver 1188, a radio transmitter 1190, region defining circuits 1192, weather threshold defining circuits 1194, information combining circuits 1196, and information comparison circuits 1198.

The base station 1184 includes a radio receiver 1200, a display circuit 1202, and an alarm 1204.

The weather alarm system 1180 operates generally as follows, the remote unit 1182 is deployed in the field, such as in a small, private aircraft and is used to monitor the weather within a zone surrounding the aircraft. As the aircraft moves, the zone surrounding the aircraft moves also. A navigational receiver 1186 is used to determine the location of the aircraft at any point in time. A weather receiver 1188 receives weather parameters broadcast by a Weather Surveillance Radar System of the US Weather Service, providing up-to-date weather information for the United States. The remote unit is programmed to monitor specific weather parameters within the zone surrounding the aircraft and to compare those parameters with programmed limits. In the event that one or more of the monitored parameters exceeds the programmed limit, the remote unit transmitter 1190 is activated and transmits the location 1187 of the aircraft. In some embodiments, specific weather parameters are also transmitted. The base station 1184 receives the transmission, displays 1202 the location and any transmitted weather parameters, and, if appropriate, gives an alarm 1204.

FIG. 35 is a pictorial diagram illustrating an example of a weather region useful in understanding the operation of the weather alarm system 1180 and similar embodiments. The weather region is designated generally by the numeral 1220 and 1220 includes a region 1222 in which weather parameters are received from a weather surveillance radar system. Within the region 1222 is a weather alarm system remote unit at a moving location 1224 and surrounded by a moving zone 1226 having a constant radius 1228. It is perhaps more relevant to state that at any point in the contiguous 48 states of the lower continental United States the weather receiver 1188 receives weather parameters relevant to the current location 1224 of the weather alarm system remote unit 1182 (the aircraft, in our example above). The aircraft is surrounded by a moving zone 1226 and the remote unit is monitoring specified weather parameters within the moving zone, notifying the base station 1184 when any monitored parameter exceeds its programmed limit.

FIG. 36 is a pictorial diagram illustrating an example of another weather region, designated generally by the numeral 1240. In this example, the weather region 1240 includes an area of weather reporting 1242. The aircraft is located at point 1244 and is moving in a direction and at a velocity shown by a vector 1246. In this example, the defined zone of weather parameter monitoring is 1248.

With respect once again to FIG. 34, the remote unit circuits 1192 are used to define the zone (1226 in FIG. 35, and 1248 in FIG. 26) which is moving relative to the aircraft. In a specific embodiment, the circuits 1192 are a memory portion of a programmed micro-controller, and the zone is defined by information stored in the memory portion. The defined zone is designated by the numeral 1193.

The remote unit circuits 1194 define specific weather parameters to be monitored and also define specific threshold values, limits and ranges for use in monitoring the weather parameters. The defined values are designated generally by the numeral 1195 and in a specific embodiment are stored in a memory portion of a programmed micro-controller.

As the aircraft proceeds on its flight, the navigational receiver 1186 continues to provide a current location 1187, while the weather receiver 1188 continues to provide current weather information 1189. The location 1187 and the surrounding zone defining information 1193 are combined by circuits 1196 and define a zone relative to the weather reporting region (1222 in the example of FIG. 35, and 1242 in the example of FIG. 36). This relative zone is compared by circuits 1198 with the received weather parameters 1189 and the selected weather parameters and limit values 1195 to determine whether or not any monitored parameter within the moving zone exceeds it limit. The line 1199 is used to activate the remote unit transmitter 1190 for transmitting the current location 1187 and the result 1199 of the comparison.

Figure 37:
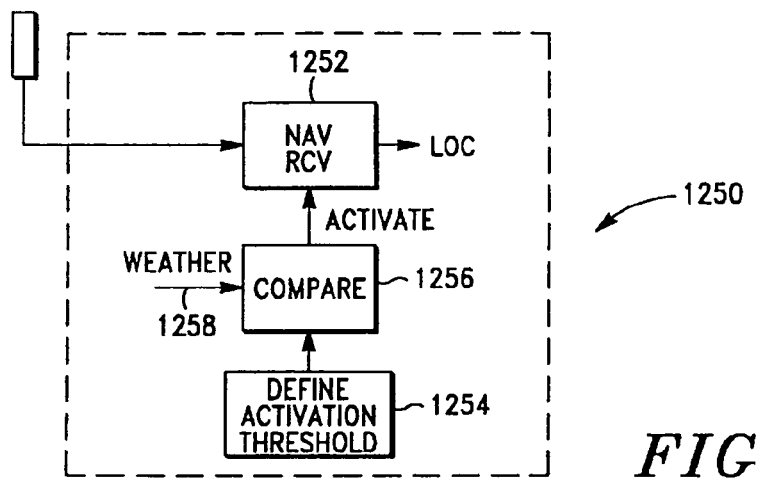
FIG. 37 is a partial block diagram illustrating a conditional activation of a navigational receiver for a weather alarm system.

FIG. 37 is a partial block diagram illustrating a specific embodiment of a remote unit for a weather alarm system. The portion of the remote unit is designated generally by the numeral 1250, and includes a navigational receiver 1252, a circuit 1254 for defining an activation threshold, and a comparison circuit 1256. In the embodiment illustrated here, received weather parameters 1258 are compared with limit values, threshold values and ranges stored in the circuit 1254. If any specified weather parameter exceeds its individual limit value, the comparison circuit 1256 activates the navigational receiver 11252 which has been operating in a standby mode. Since current location is not available until the navigational receiver is activated, the received weather parameters 1258 are not limited to a moving zone around the aircraft, but apply to the entire weather reporting region (1222 in the example of FIG. 35, and 1242 in the example of FIG. 36). In a specific embodiment, the circuits 1254 and 1256 are part of a programmed micro-controller.

Figure 38:
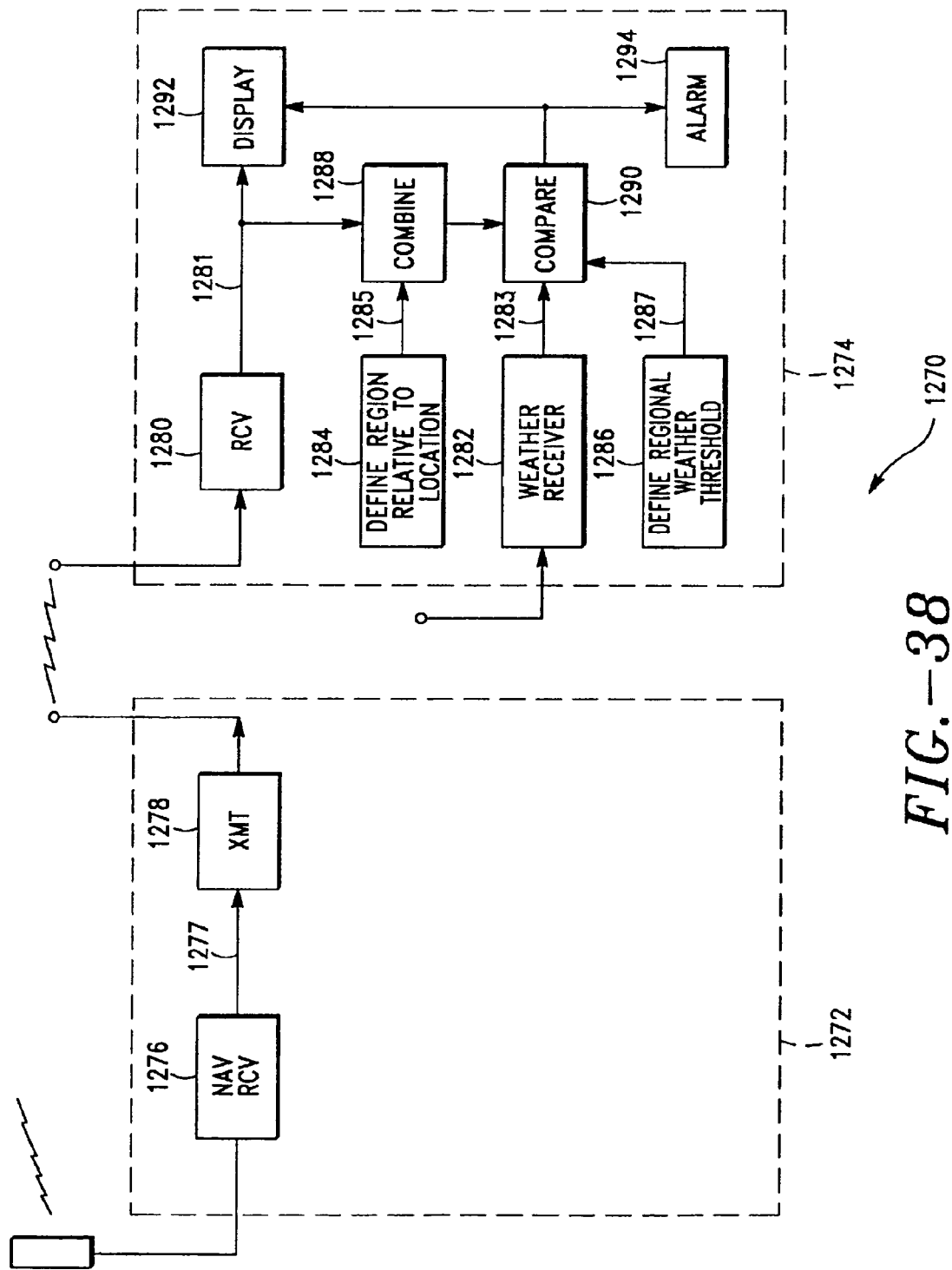
FIG. 38 is a block diagram illustrating another specific embodiment of a weather alarm system.

FIG. 38 is a block diagram of another specific embodiment of a weather alarm system, designated generally by the numeral 1270. The weather alarm system 1270 includes a remote unit 1272 and a base station 1274.

The remote unit 1272 includes only a navigational receiver 1276, providing a current location to a radio transmitter 1278 for transmission to a base station.

The base station 1274 includes a radio receiver 1280 for receiving the current location 1281, a weather receiver 1282 for receiving weather parameters, a region defining circuit 1284 for defining a zone relative to the current remote unit location, a weather threshold defining circuit 1286 for selecting specific weather parameters and for defining limits, thresholds, and ranges for the each selected weather parameter, an information combining circuit 1288 for combining the current location and the zone defining information, a comparison circuit 1290 for selecting the specified parameters within the zone relative to the current location, comparing the selected parameters within the zone with their individual limits, and activating an alarm 1294 and displaying 1292 the current location and comparison results when a monitored weather parameter within the defined distance of the remote unit exceeds its limit, falls below its defined threshold, and falls inside/outside of a defined range.

In the embodiment illustrated in FIG. 38 all the intelligence is placed into the base station 1274, including the weather receiver 1282. In a specific embodiment, the circuits 1284, 1286, 1288 and 1290 are part of a programmed micro-controller.

Figure 39:
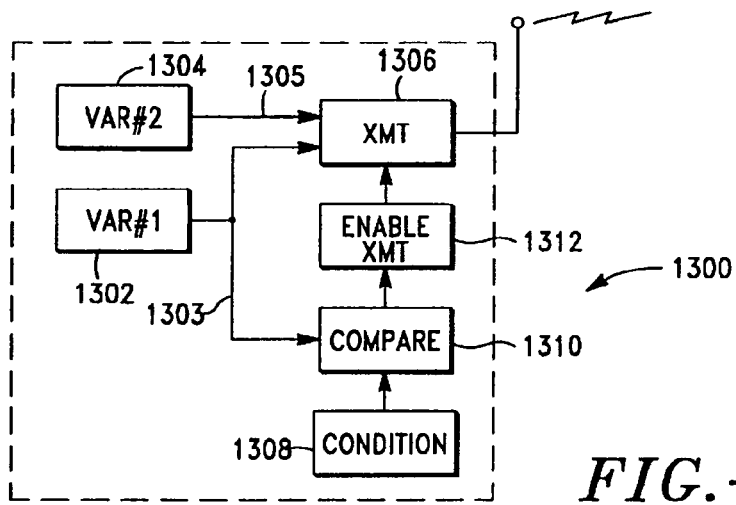
FIG. 39 is a block diagram illustrating a specific embodiment of a remote monitoring unit.

FIG. 39 is a block diagram illustrating a self-locating remote alarm unit designated generally by the numeral 1300. The remote unit 1300 includes a circuit 1302 defining a first variable and providing a value 1303 for the first variable, a circuit 1304 defining a second variable and providing a value 1305 for the second variable, a communications transmitter 1306, a circuit 1308 defining a condition and providing a value for the condition, a circuit 1310 for comparing the value of the first variable with the value of the condition, and a circuit 1312 responsive to the comparison for enabling the communications transmitter 1306 to transmit the value of the second variable and to transmit a function of the value of the first variable.

Though the description of FIG. 39 is very abstract, the figure represents the essence of the major embodiments of the present invention, as the following examples will illustrate.

In a simple man-over-board monitor as illustrated in FIG. 11, the value 310 of the first variable is provided by a sensor 308, the value 338 of the second variable is provided by a navigation receiver 304. When the sensor status 310 changes, a transmitter 314 transmits the remote unit location 338 and the sensor status 310.

In the same man-over-board monitor, when a panic button 312 is depressed, the transmitter 314 transmits the remote unit location 338 and the switch status 340.

In an environmental monitor illustrated in FIG. 18, the value of the first variable is a sensor status 578 for a monitored environmental parameter, while the value of the second variable is a location 576 of the remote unit stored in a memory. When the sensor 558 detects a predetermined change in the monitored environmental parameter, the transmitter 560 transmits the stored location of the remote unit and the sensor status 578. Alternatively, the remote unit 552 defines a patient monitor, and the value of the second variable is stored information 556 which identifies the patient, such as name, room and bed number, patient identification code. The value of the first variable is the output of a sensor 558 which monitors a physiological parameter, and defines a sensor status 578. When a predetermined change in the monitored physiological parameter occurs, the transmitter 560 is activated and transmits the patient identification information 576 as the value of the second variable and transmits and the sensor status 578 as the function of the first variable.

The circuits 1308, 1310 and 1312 of FIG. 39 find their equivalents in the man-over-board monitor, the patient monitor and in the environmental monitor in that a change in a sensor or switch status activates a transmission of the value of the second variable—dynamic location, patient ID, and static location, respectively—and a transmission of an appropriate function of the value of the first variable—sensor status.

In a man-over-board monitor 752 illustrated in FIG. 21, the value of the second variable is provided by a dynamic location determining device, in this case the navigational receiver 756. Alternative embodiments use the World-wide LORAN navigation system, a satellite navigational system such as the GPS system, and other alternative global and regional navigational systems for providing a value of the second variable which is the location of the remote unit 752.

Another example of a remote unit represented by the block diagram in FIG. 39 is a remote weather alarm 1182 illustrated in FIG. 34 in which the value of the second variable is a remote unit location 1187, and in which the function of the first variable is defined by a circuit 1198 to be the result 1199 of a comparison of a monitored weather parameter, within the defined zone relative to the weather alarm location 1187, with a defined weather threshold 1195.

Another example of the remote unit represented by FIG. 39 is an invisible fence monitor 852 as illustrated in FIG. 24. The value of the second variable is a location 859 provided by a navigational receiver 856, while the transmitted function of the first variable is a positional and time status 869, the result of a comparison by a circuit 864 of the location 859, a time-of-day 861 and a defined curfew 860, 862.

When a microphone 808 is connected to the remote unit transmitter 806, as shown in FIG. 22, the remote unit of FIG. 39 includes a one-way voice channel.

Figure 40:
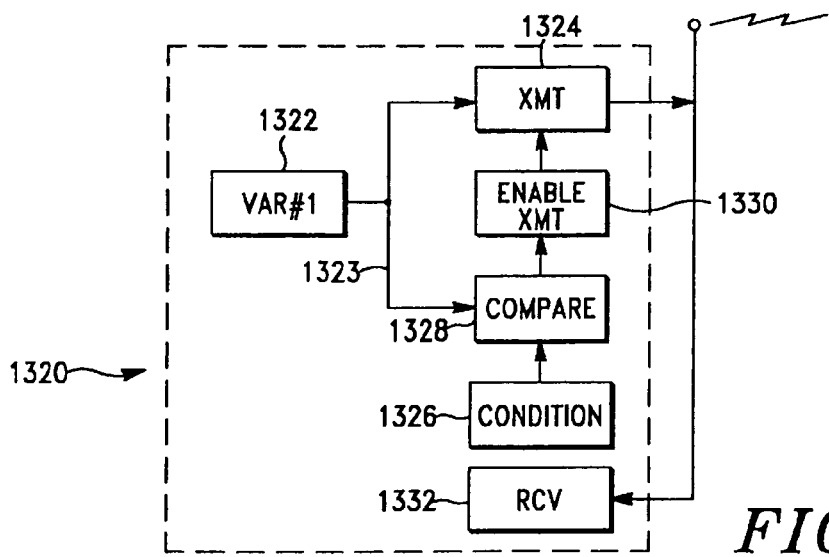
FIG. 40 is a block diagram illustrating another specific embodiment of a remote monitoring unit.

FIG. 40 is a block diagram illustrating a remote alarm unit designated generally by the numeral 1320. The remote unit 1320 includes a circuit 1322 defining a first variable and providing a value 1323 for the first variable, a communications transmitter 1324, a circuit 1326 defining a condition and providing a value for the condition, a circuit 1328 for comparing the value of the first variable with the value of the condition, and a circuit 1330 responsive to the comparison for enabling the communications transmitter 1324 to transmit a function of the value 1323 of the first variable. The remote unit 1320 also includes a communications receiver 1332 for defining a two-way communications link.

When the remote unit shown in FIG. 39 includes a communications receiver, such as the receiver 1332 of FIG. 40, the communications channel is alternatively one of direct radio contact such as illustrated in a variety of the figures, wireless, cellular, radio telephone, radio relay, to name a few representative communications channels as shown in FIGS. 17 and 28.

An example of a monitoring system such as illustrated in FIG. 40 is shown in FIGS. 3, 30 and 33. In each instance, one or more sensors and switches provide the value for the first variable and the transmitted function of the value of the first variable is alternatively the sensor value and the sensor/switch status. The circuits 1326, 1328 and 1330 find their equivalents in an activation of the transmitter upon a change of the sensor/switch status. The remote monitoring system illustrated in FIG. 3 includes both a remote unit 82 of the class shown in FIG. 40 and a compatible base station 84.

Figure 41:
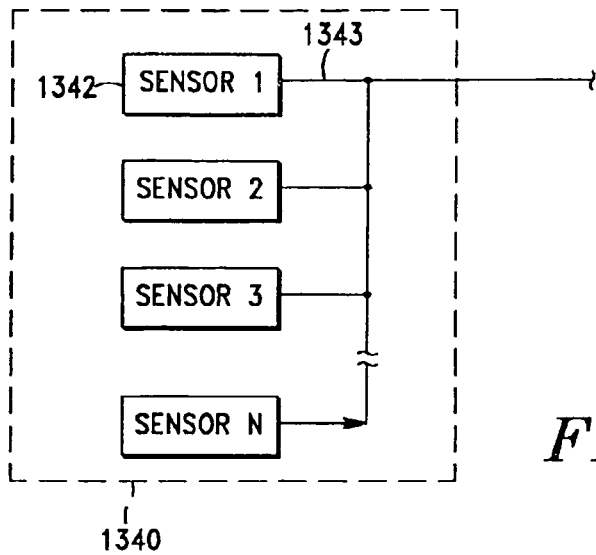
FIG. 41 is a partial block diagram illustrating a plurality of sensors in a specific embodiment of a remote monitoring unit.
Figure 42:
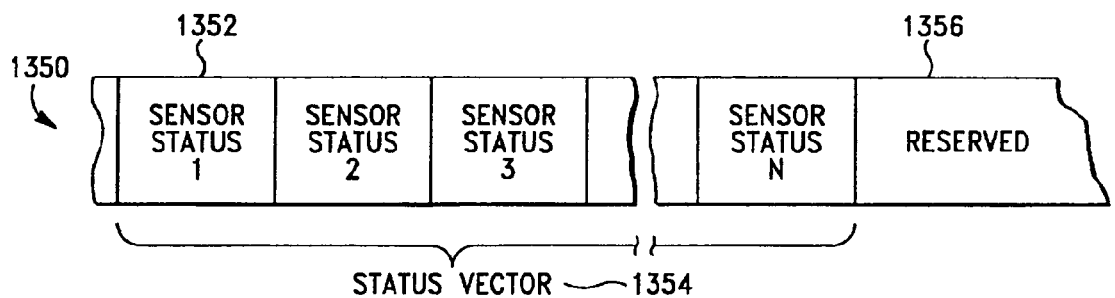
FIG. 42 is a partial pictorial diagram illustrating a typical status vector.

FIG. 41 is a partial block diagram which illustrates a plurality of sensor/switches designated by the numeral 1340. Each sensor/switch 1342 provides an output signal 1343 defining a sensor/switch status. A typical transmission format for a sensor/switch status and defining a sensor/switch vector is shown in the partial pictorial diagram of FIG. 42. The transmitted format is designated generally by the numeral 1350 and includes a plurality of sensor/switch status bits 1352 defining a status vector 1354. A portion 1356 of the transmitted format 1350 is unused and marked reserved.

Figure 43:
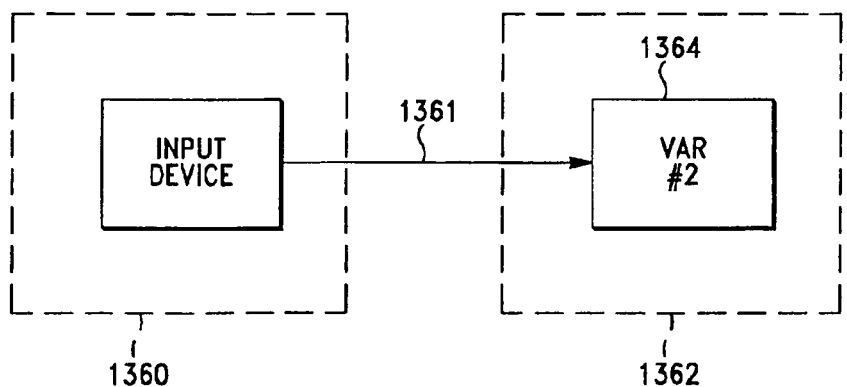
FIG. 43 is a partial block diagram illustrating an input device connected for providing the value of a second variable in a specific embodiment of the invention.

Finally, FIG. 43 is a partial block diagram illustrating the temporary connection of an input device to a remote monitor of the type providing a stored value for the second variable. The figure includes the removable input device 1350 temporarily connected to the remote monitor 1362. The remote monitor 1362 includes a circuit 1364 for storing a value for the second variable. The input device 1350 is connected to the remote monitor 1362 and supplies a value 1361 for storage in the circuit 1364. Once the value 1361 has been stored, the input device 1360 is disconnected from the remote monitor 1362, and the remote monitor uses the value stored by the circuit 1364 as the value of the second variable. The remote monitor 1362 corresponds to the self-locating remote alarm unit 1300 of FIG. 39, and the storage circuit 1364 of FIG. 43 corresponds to the circuit 1304 of FIG. 39.

The two examples that are provided above for a self-locating remote alarm unit which provides a stored value for the second variable are the environmental monitor of FIG. 18 and its other embodiment, the patient monitor. Both embodiments require that a value be provided for the second variable. A method for doing so is to connect an input device 1360 to the remote monitor 1362, to use the input device to load a value for the second variable into the storage circuit 1364 (1304 of FIG. 39, and 556 of FIG. 18), then to disconnect the input device and to monitor the specified environmental/physiological parameters. In one embodiment, the input device is a keypad of manually operated switches. The keypad is used to input an environmental monitor location, or, alternatively, a patient's ID information. In one embodiment of the procedure, a navigational receiver is used to provide a user with the environmental monitor location, which the user then enters by hand using the keypad input device 1360 attached to the environmental monitor 1362 (552 of FIG. 18). In another embodiment, the temporarily connected input device 1360 is a navigational receiver and the location 1361 is stored in the storage circuit 1364 (556 of FIG. 18, 1304 of FIG. 39). After the location has been stored in the storage circuit, the navigational receiver 1360 is disconnected and the environmental monitor left to do its job.

While the foregoing detailed description has described several embodiments of the personal alarm system in accordance with this invention, it is to be understood that the above description is illustrative only and not limiting of the disclosed invention. Thus, the invention is to be limited only by the claims as set forth below.

Figure 44:
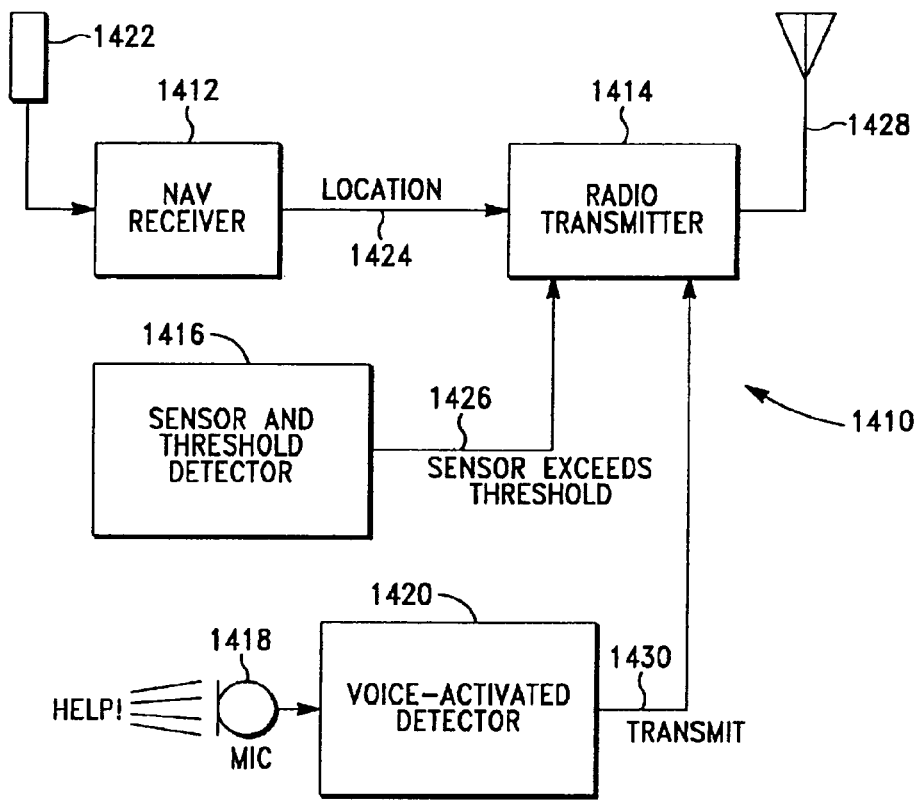
FIG. 44 is a block diagram illustrating a specific embodiment of a personal alarm system remote unit.

FIG. 44 is a block diagram illustrating a specific embodiment of a personal alarm system remote unit. The remote unit is designated generally by the reference numeral 1410, and includes a satellite global positioning receiver (navigational receiver) 1412, a radio transmitter 1414, a sensor and threshold detector 1416, a microphone 1418, and a voice-activated detector 1420.

The navigational receiver 1412 receives positioning information from geo-synchronous satellites via antenna 1422, and provides a global location 1424 of the remote unit for transmission by the radio transmitter 1414. The location 1424 is represented in appropriate coordinates.

The sensor and threshold detector 1416 provides an output signal 1426 that is activated when the sensor detects a condition that exceeds a predetermined threshold level. A variety of specific sensors is contemplated, including but not limited to the following: a glucose sensor for monitoring the blood-glucose level of a patient; an oxygen sensor for monitoring the oxygen level of the ambient air; a motion sensor for detecting movement in excess of a predetermined threshold; a light sensor for detecting ambient light in excess of a predetermined threshold; a liquid immersion sensor, a heat sensor for detecting temperature in excess of a predetermined threshold; a carbon-monoxide sensor; and a smoke detector.

The microphone 1418 and the voice-activated detector 1420 provide an output signal 1430 that becomes active when the voice-activated detector 1420 detects a predetermined spoken distress phrase such as "HELP!"

In a specific embodiment of the personal alarm system remote unit 1410, no sensor and threshold detector are included. In this embodiment, the radio transmitter 1414 is connected to transmit the remote unit location 1424 when the voice-activated detector output signal 1430 is active. This specific embodiment of the invention permits the remote unit to be worn or carried by a person and the person's global location will be transmitted via antenna 1428 when a predetermined distress phrase is detected.

In another specific embodiment of the personal alarm system remote unit 1410, the sensor and threshold detector 1416 are included and the threshold detector portion is disabled. The radio transmitter is connected to transmit the sensor output signal (sensor status) 1426 when the remote unit location is transmitted. In yet another embodiment of the personal alarm system remote unit 1410, the threshold detector is enabled and the radio transmitter is connected for transmitting a sensor status 1426 and a remote unit location 1424 when either of the sensor and threshold detector output signal 1426 and the voice-activated detector output signal 1430 is active.

In various specific embodiments, the navigational receiver is compatible with one of a geo-synchronous satellite global navigation system, the infrastructure-based TDOA and RSSI systems, the SATNAV system, and the LORAN system. The preferred embodiment is that the navigational receiver 1412 is compatible with the U.S. GPS system.

Figure 45:
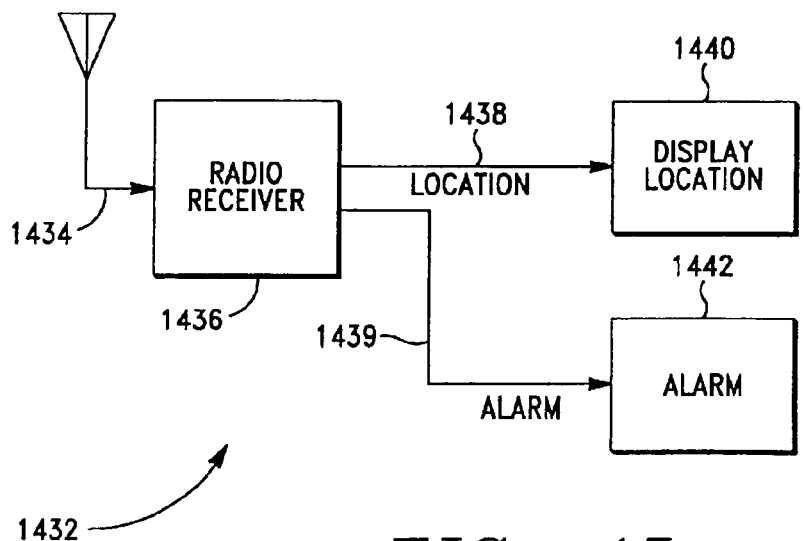
FIG. 45 is a block diagram illustrating a specific embodiment of a base station for use with a remote unit such as shown in FIG. 44.

FIG. 45 is a block diagram illustrating a specific embodiment of a base station for use with a remote unit such as shown in FIG. 44. The base station is designated generally by the reference numeral 1432 and includes an antenna 1434, a radio receiver 1436, a display 1440 for displaying the remote unit location, and an alarm 1442. In normal use, the radio receiver 1436 receives a radio transmission from a remote unit via the antenna 1434. The radio receiver provides two output signals. A first output 1438 provides the global coordinates of the remote unit location for display while a second output 1439 becomes active when a transmission is received from a remote unit. The output 1439 is used to activate the alarm 1442. In another specific embodiment of the base station 1432, the output signal(s) 1438 includes both the remote unit location information and sensor status information.

Figure 46:
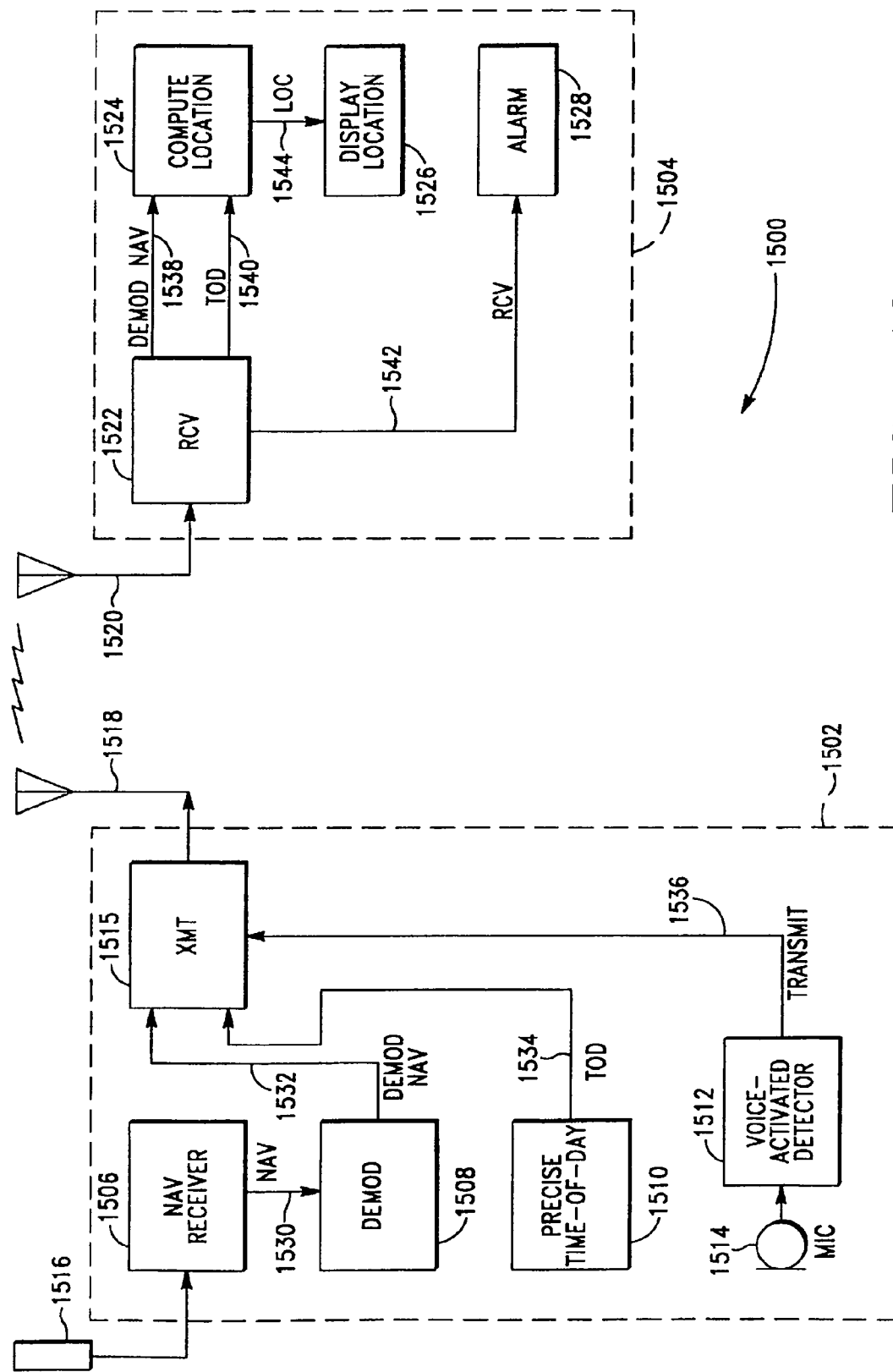
FIG. 46 is a block diagram of a personal alarm system according to one aspect of the present invention.

FIG. 46 is a block diagram of a personal alarm system according to another aspect of the present invention. The personal alarm system is designated generally by the reference numeral 1500 and includes a remote unit 1502 and a base station 1504.

The remote unit 1502 includes a navigational receiver 1506, a demodulator circuit 1508, a precise time-of-day circuit 1510, a voice-activated detector circuit 1512, a microphone 1514, a radio transmitter 1515, a navigational receiver antenna 1516, and a radio transmitter antenna 1518.

The navigational receiver provides modulated navigational information 1530 to the demodulator circuit 1508. The demodulator circuit 1508 "demodulates" the modulated navigational information 1530 and provides demodulated navigational information 1532 to the radio transmitter 1515. The precise time-of-day circuit 1510 provides a precise time-of-day signal 1534 to the radio transmitter.

The microphone 1514 is connected to the voice-activated detector circuit 1512 permitting the detector circuit 1512 to activate an output signal 1536 when a predetermined distress phrase is detected, for example "HELP!"

The radio transmitter 1515 is connected to transmit the demodulated navigational information 1532 and the precise time-of-day information 1534 when the voice-activated output signal 1536 becomes active.

The base station 1504 includes an antenna 1520, a radio receiver 1522 circuits 1524 for computing the remote unit location, a display 1526 and an alarm 1528.

Radio transmissions from the remote unit 1502 are received via the antenna 1520 and converted by the radio receiver into demodulated navigational information 1538, and precise time-of-day information 1540. The circuits 1524 receive the demodulated navigational information and the precise time-of-day information and compute a global location 1544 for the transmitting remote unit 1502. The computed global location (in appropriate coordinates) is displayed on the display 1526. The alarm 1528 is activated by a receiver output signal 1542 when a radio transmission from the remote unit is received.

Figure 47:
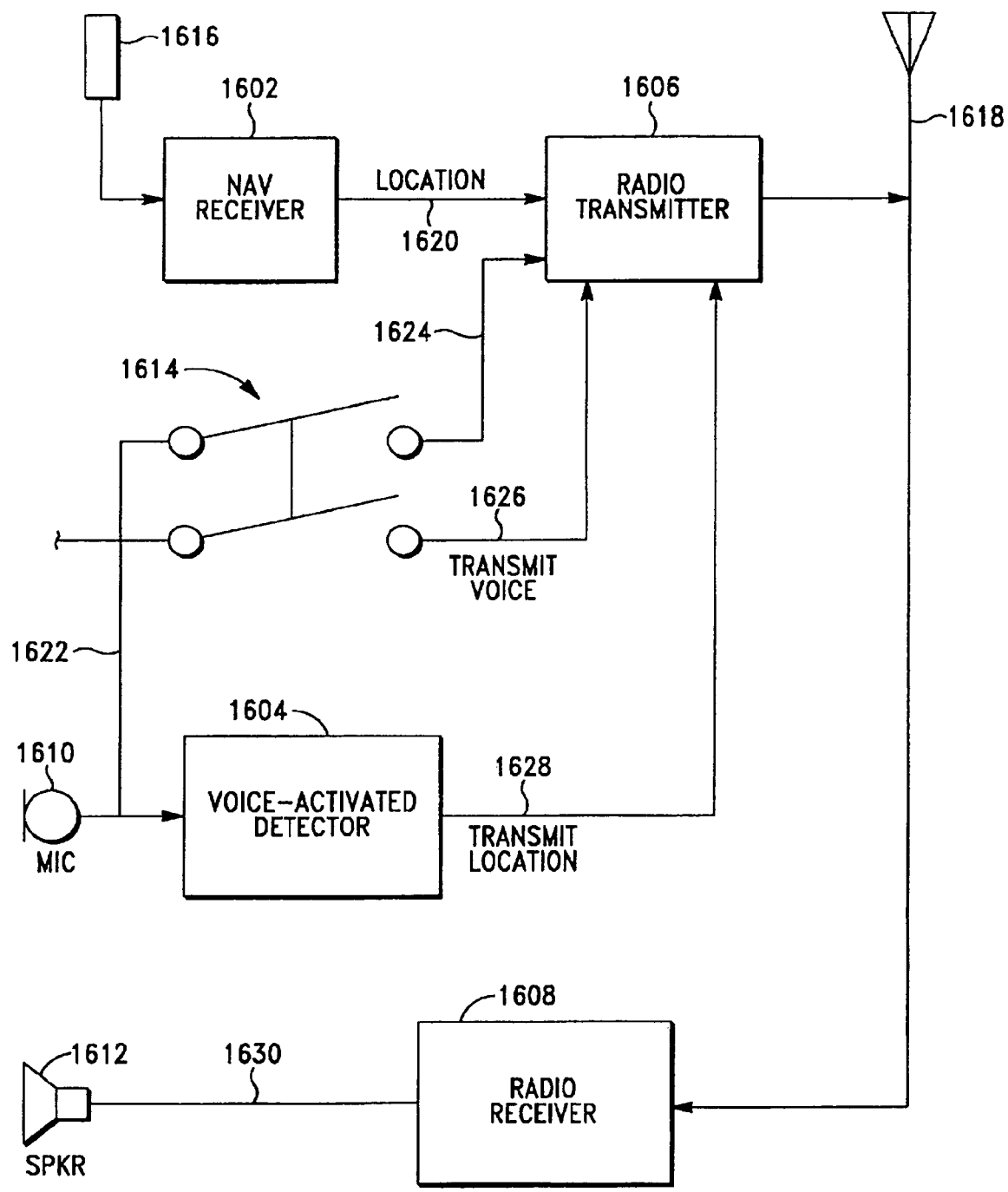
FIG. 47 is a block diagram that illustrates another embodiment of a personal alarm system remote unit.

FIG. 47 is a block diagram that illustrates another embodiment of a personal alarm system remote unit. The remote unit is designated generally by the reference numeral 1600 and includes a navigational antenna 1616, a navigational receiver 1602, a microphone 1610, a voice-activated detector 1604, a radio transmitter 1606 a radio antenna 1618, a radio receiver 1608, and a speaker 1612.

The navigational receiver 1602 receives navigational information via the navigational antenna 1616 and provides a location 1620 of the remote unit in appropriate coordinates.

The microphone 1610 and the voice-activated detector 1604 are connected to provide a Transmit Location signal 1628 that becomes active when the detector 1604 recognizes an audible predetermined distress phrase such as "HELP!" The radio transmitter 1606 is connected with the Transmit Location signal 1628, and with the remote unit location information 1620 so that the location information is transmitted when the signal 1628 becomes active. Thus, in normal use, the remote unit 1600 transmits its own location (in appropriate coordinates) when an audible, predetermined distress phrase is detected. The predetermined distress phrase is preset to a specific language. In another embodiment, the predetermined distress phrase is programmed into a programmable storage unit (not illustrated) that is connected with the voice-activated detector 1604.

The remote unit 1600 includes a switch 1614 that connects the microphone 1610 with the radio transmitter 1606 for transmitting one-half of a two-way radio communication. The switch 1614 also is connected to generate a Transmit Voice signal 1626 that becomes active when the switch 1614 is operated. The radio transmitter 1606 is connected with the Transmit Voice signal 1628 so that when the switch is operated, the microphone is connected for voice transmission in a push-to-talk arrangement (half-duplex mode), and the radio transmitter transmits the voice via radio antenna 1618. The other half of the two-way radio communication is received by the radio antenna 1618, then converted to audible sound by the radio receiver 1608 and the speaker 1612.

FIG. 48 is a partial block diagram that illustrates the use of a wireless phone within a personal alarm system remote unit according to a specific embodiment of the present invention. The personal alarm system remote unit is designated generally by the reference numeral 1700, and includes a wireless phone 1702, a wireless phone antenna 1704, remote unit location information 1706, and a Transmit Location signal 1710.

The wireless phone 1702 typically includes elements necessary for two-way radio communication (full-duplex mode), such as a microphone (1610 of FIG. 47) and a speaker (1612 of FIG. 47).

When the Transmit Location signal 1710 becomes active, the wireless phone 1702 transmits the remote unit location information 1706.

FIG. 49 is a partial block diagram illustrating the wireless phone of FIG. 48 and including a circuit that automatically dials "911" for transmitting the remote unit location. The wireless phone is designated by the reference numeral 1720, while the circuit that automatically dials "911" is designated by the reference numeral 1722. When the Transmit Location signal 1724 becomes active, the circuit 1722 automatically dials the dedicated public safety help telephone number "911" via connection 1726 with the wireless phone 1720. Once the telephone connection with the 911 service is established, the wireless phone 1720 transmits the remote unit location information (1706 of FIG. 48). Recently, additional public safety help telephone numbers have been contemplated and, in some cases, assigned. A person having an ordinary level of skill in the relevant arts will appreciate that (1) the use of these additional telephone numbers is also contemplated by the present invention, and (2) a typical wireless phone includes a keypad permitting a user to place a call in the normal manner, including a call placed to a dedicated public safety help telephone number.

FIG. 50 is a partial block diagram that illustrates the use of a cellular telephone 1730 for transmitting the remote unit location and for two-way radio communication. In the illustrated embodiment, the wireless phone of FIGS. 48, 49 is the cellular telephone 1730. FIG. 51 is a partial block diagram that illustrates the use of a PCS telephone for transmitting the remote unit location and for two-way radio communication. In the illustrated embodiment, the wireless phone of FIGS. 48, 49 is the PCS telephone 1740.

What is claimed is:

1. A personal alarm system, comprising:
   a handheld-sized portable housing which is suitable to be worn or carried about a user's person and including therein a remote unit including a radio transmitter and a navigational receiver, the remote unit providing the absolute latitude and longitude of the remote unit; and
   the navigational receiver having a low power standby mode where with circuit elements are kept active and a normal operating mode, and the alarm system having a switch operable by a user carrying the unit on his or her person to activate switching from the standby mode of the navigational receiver to the normal operating mode; and,
   a transmitter for transmitting absolute latitude and longitude to a remote location periodically and a distress signal as required,
   whereby the personal alarm system may be used by the user to summon help to the user's location.

2. The personal alarm system as set forth in claim 1, further including a sensor for detecting a hazard and circuitry responsive to the sensor for causing the receiver to switch from the standby mode to the normal operating mode upon the detection of a hazard.

3. The personal alarm system as set forth in claim 1, further including a radio receiver and a switch causing the navigational receiver to switch from the standby mode to the normal operating mode upon receipt of a command via a radio link.

4. The personal alarm system as set forth in claim 1, wherein the remote unit is configured to receive a unique signal to cause transmission of remote unit location information.

5. The personal alarm system as set forth in claim 4, wherein the remote unit is a wireless telephone for operation within a cellular telephone network.

6. The personal alarm system as set forth in claim 4, wherein the remote unit is a wireless telephone for operation within a personal communications services telephone network.

7. The personal alarm system as set forth in claim 1, wherein the navigational receiver is adapted to switch between the low power standby mode and the normal operating mode upon command via a radio link.

8. The personal alarm system of claim 1, wherein the navigational receiver includes a GPS receiver.

9. A personal alarm system, comprising:
   a handheld-sized portable housing which is suitable to be worn or carried about a user's person and including therein a remote unit including a radio transmitter and a navigational receiver,
   the remote unit providing the absolute latitude and longitude of the remote unit; and
   the navigational receiver having a low power standby mode and a normal operating mode, and the alarm system having a switch operable by a user carrying the unit on his or her person to activate switching from the standby mode of the navigational receiver to the normal operating mode,
   a transmitter for transmitting absolute latitude and longitude to a remote location periodically and a distress signal as required
   whereby the personal alarm system is configured for the user to summon help to the user's location.

10. The personal alarm system as set forth in claim 9, further including a sensor for detecting a hazard and circuitry responsive to the sensor for causing the receiver to switch from the standby mode to the normal operating mode upon the detection of a hazard.

11. The personal alarm system as set forth in claim 9, further including a radio receiver and a switch causing the navigational receiver to switch from the standby mode to the normal operating mode upon receipt of a command via a radio link.

12. The personal alarm system as set forth in claim 9, wherein the remote unit is configured to receive a unique signal to cause transmission of remote unit location information.

13. The personal alarm system as set forth in claim 12, wherein the remote unit is a wireless telephone for operation within a cellular telephone network.

14. The personal alarm system as set forth in claim 12, wherein the remote unit is a wireless telephone for operation within a personal communications services telephone network.

15. The personal alarm system as set forth in claim 9, wherein the navigational receiver is adapted to switch between the low power standby mode and the normal operating mode upon command via a radio link.

16. The personal alarm system of claim 9, wherein the navigational receiver includes a GPS receiver.

* * * * *

UNITED STATES PATENT AND TRADEMARK OFFICE
CERTIFICATE OF CORRECTION

| | | |
|---|---|---|
| PATENT NO. | : 8,149,112 B2 | Page 1 of 1 |
| APPLICATION NO. | : 11/493935 | |
| DATED | : April 3, 2012 | |
| INVENTOR(S) | : Dan Schlager and William B. Baringer | |

It is certified that error appears in the above-identified patent and that said Letters Patent is hereby corrected as shown below:

On the front page of the patent, under section 73 delete, "Ottawa, CA (US)" and insert therefor
-- Ottawa, ON (CANADA) --.

Signed and Sealed this
Nineteenth Day of June, 2012

David J. Kappos
*Director of the United States Patent and Trademark Office*